(12) United States Patent
Matsuzaki et al.

(10) Patent No.: US 9,419,864 B2
(45) Date of Patent: Aug. 16, 2016

(54) CONTENT DISTRIBUTION SYSTEM, CONTENT MANAGEMENT SERVER, CONTENT-USING DEVICE, AND CONTROL METHOD

(75) Inventors: Natsume Matsuzaki, Osaka (JP); Yuichi Futa, Ishikawa (JP); Yuji Unagami, Osaka (JP); Hideki Matsushima, Osaka (JP); Kouji Miura, Osaka (JP); Shunji Harada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 585 days.

(21) Appl. No.: 13/878,851

(22) PCT Filed: Aug. 22, 2012

(86) PCT No.: PCT/JP2012/005250
§ 371 (c)(1),
(2), (4) Date: Apr. 11, 2013

(87) PCT Pub. No.: WO2013/031140
PCT Pub. Date: Mar. 7, 2013

(65) Prior Publication Data
US 2013/0198361 A1     Aug. 1, 2013

(30) Foreign Application Priority Data

Aug. 26, 2011  (JP) .................................. 2011-184347

(51) Int. Cl.
*G06F 15/173* (2006.01)
*H04L 12/24* (2006.01)
(Continued)

(52) U.S. Cl.
CPC ............... *H04L 41/50* (2013.01); *G06Q 50/01* (2013.01); *H04L 43/0811* (2013.01)

(58) Field of Classification Search
CPC ................................ H04L 41/50; H04L 67/06
See application file for complete search history.

(56) References Cited

U.S. PATENT DOCUMENTS 5,694,543 A * 12/1997 Inoue ............................. 714/4.5
8,219,643 B2   7/2012 Nakano et al.
(Continued)

FOREIGN PATENT DOCUMENTS

| JP | 2004-86441 | 3/2004 |
|---|---|---|
| JP | 2005-250881 | 9/2005 |

(Continued)

OTHER PUBLICATIONS

International Search Report issued Nov. 27, 2012 in corresponding International Application No. PCT/JP2012/005250.

*Primary Examiner* — Moustafa M Meky
*Assistant Examiner* — Sm Z Islam
(74) *Attorney, Agent, or Firm* — Wenderoth, Lind & Ponack, L.L.P.

(57) ABSTRACT

A content management server comprises: a first connection detection unit that detects whether or not the content management server is connected with the content-using device; a content management unit that manages the content according to a result of the detection by the first connection detection unit and holds information on how the content-using device controls the use of the content. A content-using device comprises: a second connection detection unit that detects whether or not the content-using device is connected with the content management server; a second selection unit that specifies a method for controlling the use of the content according to a result of the detection by the second connection detection unit; and a content control unit that controls the use of the content according to the method specified by the second selection unit.

31 Claims, 69 Drawing Sheets

(51) Int. Cl.
*H04L 12/26* (2006.01)
*G06Q 50/00* (2012.01)

(56) References Cited

U.S. PATENT DOCUMENTS

| | | | |
|---|---|---|---|
| 2005/0197965 A1 | 9/2005 | Takabayashi et al. | |
| 2005/0235012 A1* | 10/2005 | Harry | G06F 8/71 |
| 2006/0204003 A1* | 9/2006 | Takata et al. | 380/30 |
| 2007/0198462 A1 | 8/2007 | Ohta et al. | |
| 2007/0280453 A1* | 12/2007 | Kelley et al. | 379/201.01 |
| 2008/0196109 A1* | 8/2008 | Matsuzaki et al. | 726/29 |
| 2012/0017150 A1* | 1/2012 | Pollack | 715/716 |
| 2013/0091253 A1* | 4/2013 | Sasaki | H04L 65/00 709/219 |
| 2013/0311591 A1* | 11/2013 | Zacke | G06Q 30/08 709/206 |

FOREIGN PATENT DOCUMENTS

| | | |
|---|---|---|
| JP | 2006-146744 | 6/2006 |
| JP | 2007-207171 | 8/2007 |
| JP | 4186886 | 11/2008 |
| JP | 2010-67043 | 3/2010 |
| JP | 4463320 | 5/2010 |
| JP | 2011-138209 | 7/2011 |

\* cited by examiner

FIG. 5

| Content-using device list 121 |  |
|---|---|
| Content-using device information | |
| Content-using device name | IP address |
| C1 | 192.168.1.21 |
| C2 | 192.168.1.22 |
| C3 | 192.168.1.23 |

FIG. 6

| Offline device information | |
|---|---|
| Offline device name | Offline detection time |
| C1 | 1/20, 00:00 |
| ... | ... |
| ... | ... |

Offline device list 122

FIG. 8

Content management list 131

| Management information | | Usage device information | |
|---|---|---|---|
| Content ID | Relative validity duration | Content-using device name | Scheduled expiration time |
| Cont1 | 24H | C1 | 1/21, 00:00 |
| | | C2 | --- |
| Cont2 | 48H | C1 | 1/22, 00:00 |
| | | C3 | --- |

FIG. 9

Content management list 131a

| Management information | | Usage device information | |
|---|---|---|---|
| Content ID | Relative validity duration | Content-using device name | Scheduled expiration time |
| Cont1 | 24H | C1 | --- |
| | | C2 | --- |
| Cont2 | 48H | C1 | --- |
| | | C3 | --- |

FIG. 12

Content management list 222

| Content management information | | | |
|---|---|---|---|
| Content ID | Relative validity duration | Content management server name | Scheduled expiration time |
| Cont1 | 24H | S1 | 1/20 23:30 |
| Cont2 | 48H | S1 | 1/21 23:30 |
| Cont3 | 24H | S2 | 1/20 23:30 |

FIG. 13

Content management list 222a

| Content management information | | | |
|---|---|---|---|
| Content ID | Relative validity duration | Content management server name | Scheduled expiration time |
| Cont1 | 24H | S1 | --- |
| Cont2 | 48H | S1 | --- |
| Cont3 | 24H | S2 | --- |

441a
442
Contents Cont1 and Cont 2
in content-using device C1 have been invalidated

FIG. 42

| Content-using device list 621 | |
|---|---|
| Content-using device information | |
| Content-using device name | IP address |
| C1 | 210.160.1.21 |
| C2 | 210.160.1.22 |
| C3 | 210.160.1.23 |

FIG. 43

Online device list 622

| Online device information | |
|---|---|
| Online device name | Final access time |
| C1 | 1/21, 23:00 |
| ... | ... |

FIG. 45

| Management information | | Usage device information | |
|---|---|---|---|
| Content ID | Validity duration | Content-using device name | Scheduled expiration time |
| Cont1 | 24H | C1 | 1/21, 00:00 |
| | | C2 | 1/21, 00:00 |
| Cont2 | 48H | C1 | 1/22, 00:00 |
| | | C3 | 1/22, 00:00 |

634 Content management list 631

FIG. 46

| Management information | | Usage device information | |
|---|---|---|---|
| Content ID | Validity duration | Content-using device name | Scheduled expiration time |
| Cont1 | 24H | C1 | 1/21, 23:00 |
| | | C2 | 1/21, 00:00 |
| Cont2 | 48H | C1 | 1/22, 23:00 |
| | | C3 | 1/22, 00:00 |

Content management list 631a

FIG. 49

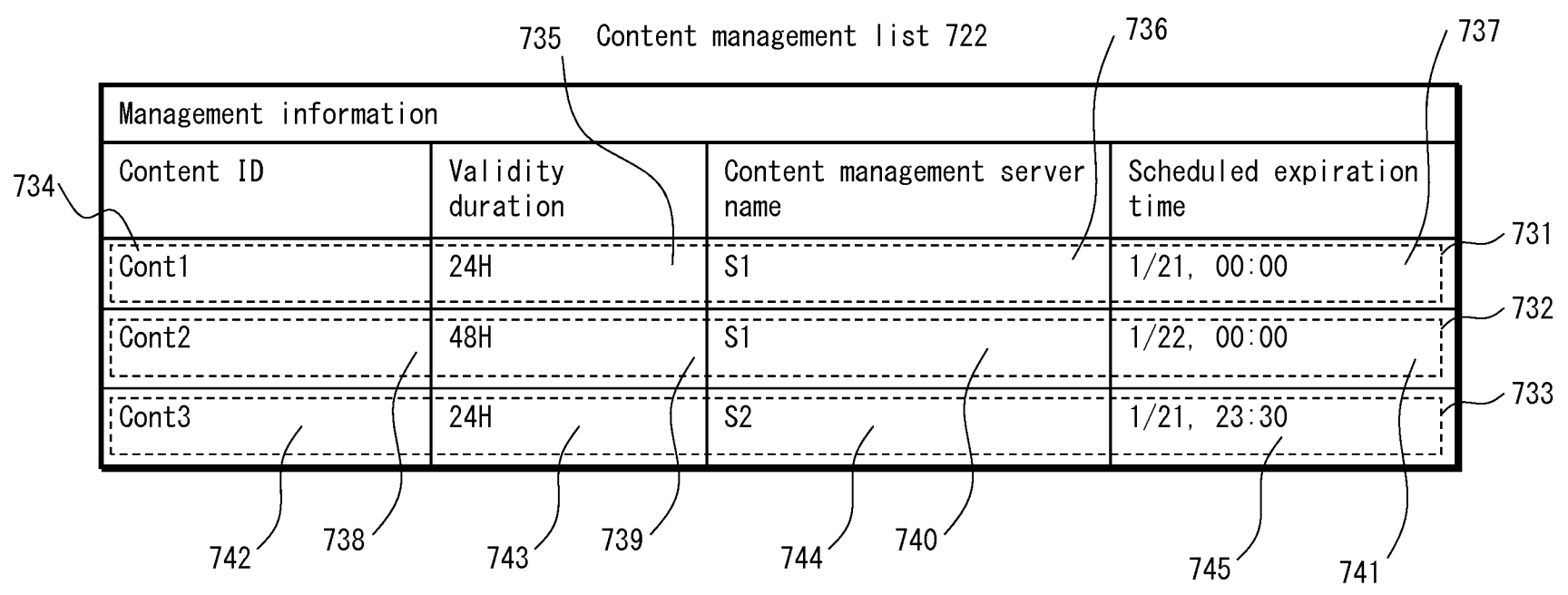

| Management information | | | |
|---|---|---|---|
| Content ID | Validity duration | Content management server name | Scheduled expiration time |
| Cont1 | 24H | S1 | 1/21, 00:00 |
| Cont2 | 48H | S1 | 1/22, 00:00 |
| Cont3 | 24H | S2 | 1/21, 23:30 |

FIG. 50

Content management list 722a

| Management information | | Content management server | |
|---|---|---|---|
| Content ID | Validity duration | Content management server name | Scheduled expiration time |
| Cont1 | 24H | S1 | 1/21, 23:00 |
| Cont2 | 48H | S1 | 1/22, 23:00 |
| Cont3 | 24H | S2 | 1/21, 23:30 |

FIG. 59

Content management list 631b

| Management information | | | |
|---|---|---|---|
| Content ID | Validity duration | Content management server name | Scheduled expiration time |
| Cont1 | 24H | C1 | 1/22, 22:00 |
| | | C2 | 1/21, 00:00 |
| Cont2 | 48H | C1 | 1/23, 22:00 |
| | | C3 | 1/22, 00:00 |

FIG. 60

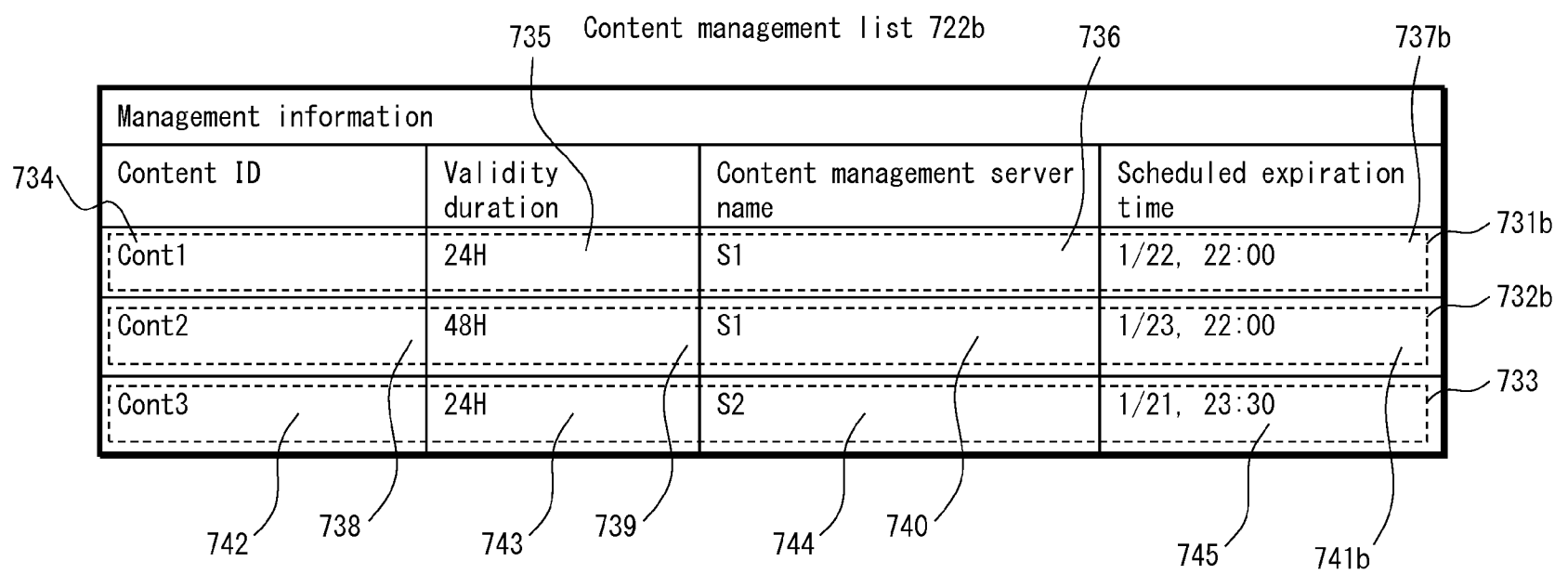

| Management information | | | |
|---|---|---|---|
| Content ID | Validity duration | Content management server name | Scheduled expiration time |
| Cont1 | 24H | S1 | 1/22, 22:00 |
| Cont2 | 48H | S1 | 1/23, 22:00 |
| Cont3 | 24H | S2 | 1/21, 23:30 |

FIG. 69

Content management list 222b

| Management information | | | |
|---|---|---|---|
| Content ID | Validity duration | Content management server name | Scheduled expiration time |
| Cont1 | 24H | S1 | 1/20, 23:30 |
| Cont2 | 48H | S1 | 1/21, 23:30 |
| Cont3 | 24H | S2 | --- |

CONTENT DISTRIBUTION SYSTEM, CONTENT MANAGEMENT SERVER, CONTENT-USING DEVICE, AND CONTROL METHOD

TECHNICAL FIELD

The present invention relates to a technology related to management of a content distributed via a network.

BACKGROUND ART

In recent years, business utilizing personal contents, such as the exchange of photos and video contents over Social Networking Service (SNS) websites, has been becoming more and more popular. In addition, as development of infrastructure supporting such exchange of personal contents progresses, opportunities are increasing where people belonging to a same group exchange with each other personal contents, such as photos taken at a travel destination and video contents taken at a school sports festival or a school play.

For instance, Patent Literature 1 discloses a technology as described in the following. A content management server checks, via a network, whether or not a content-using device is connected with the content management server. When the content-using device is connected with the content management server, the content management server transmits, via the network, a copy deletion command to the content-using device. The content deletion command includes a content ID corresponding to an invalidation-target content. The content-using device receives the copy deletion command from the content management server and executes deletion processing with respect to a copied content corresponding to the content ID included in the copy deletion command. In contrast, when the content-using device is not connected with the content management server, the content management server repeatedly tries to establish a connection with the content-using device until the deletion processing with respect to the copied content is completed. As such, the technology disclosed in Patent Literature 1 prevents the use of an unauthorized copied content.

CITATION LIST

Patent Literature

[Patent Literature 1]
Japanese Patent Publication No. 4186886
[Patent Literature 2]
Japanese Patent Publication No. 4463320
[Patent Literature 3]
Japanese Patent Application Publication No. 2005-250881
[Patent Literature 4]
Japanese Patent Application Publication No. 2011-138209

SUMMARY OF INVENTION

Technical Problem

However, according to the technology disclosed in Patent Literature 1, the content-using device cannot receive the copy deletion command from the content management server when the content-using device is not connected with the content management server. This gives rise to a situation where, although the content management server is instructing the content-using device to delete the copied content, the content-using device cannot actually delete the copied content. In such a case, a user of the content-using device, which is not connected with the content management server, is able to use the copied content while protection is not realized of an original content having been provided by a provider. As such, when employing the technology disclosed in Patent Literature 1, there is an imbalance between the use of a given content by a user and the right of a provider having provided the content.

In view of such a problem, the present invention provides a content distribution server, a content management server, a content-using device, and a control method according to which, regardless of whether or not a content-using device is connected with a content management server, protection of a content provided by a provider is secured while a user utilizing the content is able to use the content with an enhanced degree of convenience.

Solution to Problem

One aspect of the present invention is a content distribution system including: a content management server that manages a content; and a content-using device that uses the content, wherein the content management server comprises: a first connection detection unit that detects whether or not the content management server is connected with the content-using device; a content management unit that manages the content according to a result of the detection by the first connection detection unit and holds information on how the content-using device controls the use of the content, and the content-using device comprises: a second connection detection unit that detects whether or not the content-using device is connected with the content management server; a second selection unit that specifies a method for controlling the use of the content according to a result of the detection by the second connection detection unit; and a content control unit that controls the use of the content according to the method specified by the second selection unit.

Advantageous Effects of the Invention

According to the content distribution system pertaining to one aspect of the present invention, the management of a content in the content distribution system is performed according to a method for controlling the use of the content which is determined according to whether or not the content-using device is connected with the content management server. As such, protection of the content, which has been provided by a provider, is realized while a user utilizing the content is able to use the content with an enhanced degree of convenience.

BRIEF DESCRIPTION OF DRAWINGS

FIG. 5 is a chart indicating one example of a data configuration of a content-using device list 121.

FIG. 6 is a chart indicating one example of a data configuration of an offline device list 122.

FIG. 8 is a chart indicating one example of a data configuration of a content management list 131.

FIG. 9 is a chart indicating one example of a data configuration of a content management list 131a.

FIG. 12 is a chart indicating one example of a data configuration of a content management list 222.

FIG. 13 is a chart indicating one example of a data configuration of a content management list 222a.

FIG. 21 illustrates a configuration of a content distribution system 10a.

FIG. 42 is a chart indicating one example of a data configuration of a content-using device list 621.

FIG. 43 is a chart indicating one example of a data configuration of an online device list 622.

FIG. 45 is a chart indicating one example of a data configuration of a content management list 631.

FIG. 46 is a chart indicating one example of a data configuration of a content management list 631a.

FIG. 49 is a chart indicating one example of a data configuration of a content management list 722.

FIG. 50 is a chart indicating one example of a data configuration of a content management list 722a.

FIG. 56 illustrates a configuration of a content distribution system 30a.

FIG. 58 is the second part of the sequence diagram illustrating the interaction between the content management server 600a and the content-using device 700a.

FIG. 59 is a chart indicating one example of a data configuration of a content management list 631b.

FIG. 60 is a chart indicating one example of a data configuration of a content management list 722b.

FIG. 63 is a sequence diagram illustrating processing in the content distribution system 50 where a relay server 950a transmits a polling command to a content-using device 900a according to an instruction from a content management server 800a.

FIG. 64 is a sequence diagram illustrating processing in the content distribution system 50 where the relay server 950a transmits the polling command to the content management server 800a according to an instruction from the content-using device 900a.

FIG. 65 is a sequence diagram illustrating processing in the content distribution system 50 where the relay server 950a transmits an invalidation instruction to the content-using device 900a according to an instruction from the content management server 800a.

FIG. 66 is a sequence diagram illustrating processing in the content distribution system 50 where the relay server 950a, in response to polling performed by the content-using device 900a, searches for an invalidation instruction and transmits a response to the content-using device 900a.

FIG. 69 is a chart indicating one example of a data configuration of a content management list 222b.

DESCRIPTION OF EMBODIMENTS

Figure 1:
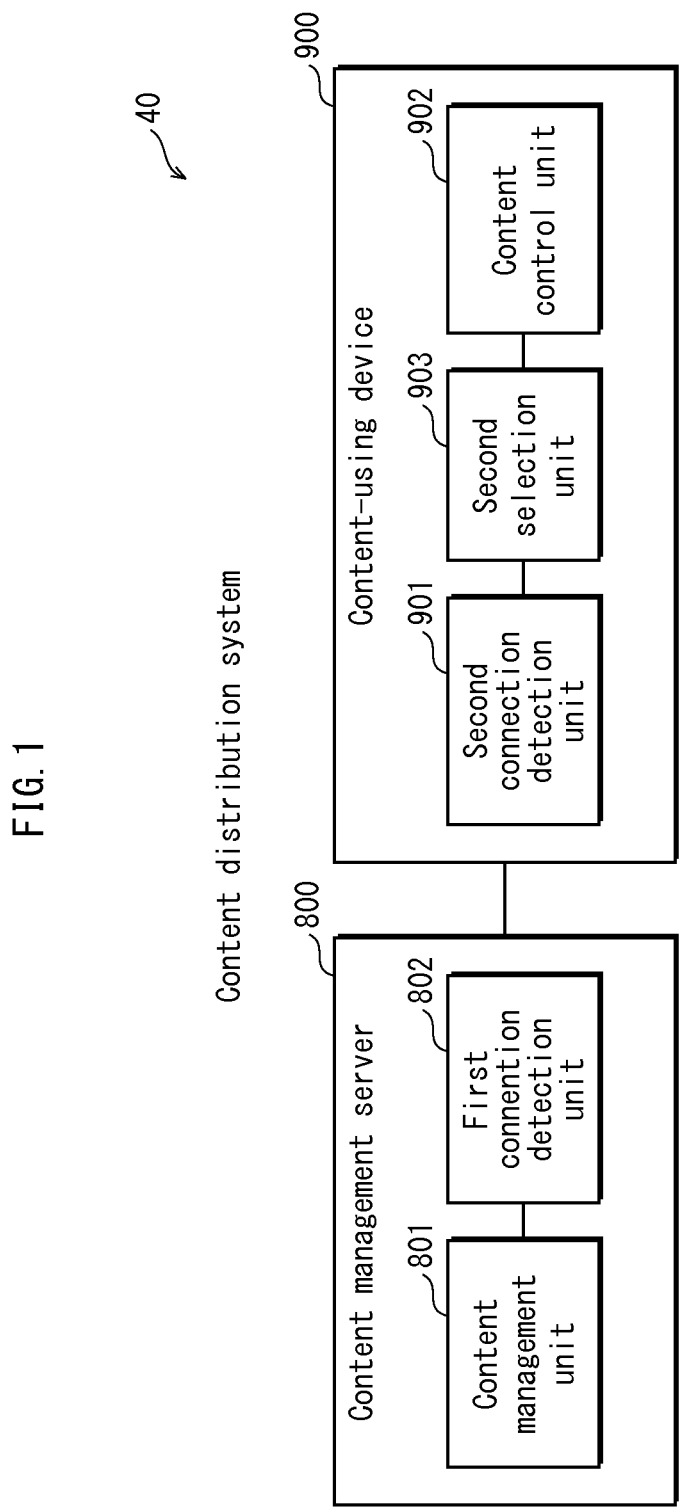
FIG. 1 illustrates an overall configuration of a content distribution system 40 in embodiment 1.

One aspect of the present invention is a content distribution system including: a content management server that manages a content; and a content-using device that uses the content, wherein the content management server comprises: a first connection detection unit that detects whether or not the content management server is connected with the content-using device; a content management unit that manages the content according to a result of the detection by the first connection detection unit and holds information on how the content-using device controls the use of the content, and the content-using device comprises: a second connection detection unit that detects whether or not the content-using device is connected with the content management server; a second selection unit that specifies a method for controlling the use of the content according to a result of the detection by the second connection detection unit; and a content control unit that controls the use of the content according to the method specified by the second selection unit.

According to the content distribution system pertaining to one aspect of the present invention, the management of a content in the content distribution system is performed according to a method for controlling the use of the content which is determined according to whether or not the content-using device is connected with the content management server. As such, protection of the content, which has been provided by a provider, is realized while a user utilizing the content is able to use the content with an enhanced degree of convenience.

In the content distribution system, when the second connection detection unit detects that the content-using device has transitioned from being connected with the content management server to being unconnected with the content management server, the second selection unit may specify, as the method for controlling the use of the content, a method according to a period of validity of the content, and the content control unit may set a specific period of validity with respect to the content and, when the specific period of validity of the content expires, may stop or deny the use of the content, and the first connection detection unit detects that the content management server has transitioned from being connected with the content-using device to being unconnected with the content-using device, the content management unit may manage the content by using the method according to a period of validity of the content and may set a specific period of validity with respect to the content.

According to this structure, the content-using device, when self-detecting the transition from being connected with the content management server to being unconnected with the content management server, selects, as the method for controlling the use of the content, the method according to a period of validity of the content, and further, when the period of validity of the content expires, the content-using device stops or denies the use of the content. This enables a user of the content-using device to use the content during the period of validity of the content. Further, after the period of validity of the content expires, protection of the content having been provided by a provider is ensured. On the other hand, the content management server, when detecting that the content management server has transitioned from being connected with the content-using device to being unconnected with the content-using device, manages the content by using the method according to a period of validity of the content and sets a period of validity with respect to the content. This enables the content management server to manage the content according to a period of validity of the content. As such, the provider of the content is freed from concerns In the content distribution system, when the second connection detection unit detects that the content-using device has transitioned from being unconnected with the content management server to being connected with the content management server, the second selection unit may specify, as the method for controlling the use of the content, a method independent of a period of validity of the content, and the content control unit may cancel a specific period of validity set with respect to the content, and when the first connection detection unit detects that the content management server has transitioned from being connected with the content-using device to being unconnected with the content-using device, the content management unit may manage the content by using the method independent of a period of validity of the content, and may cancel a specific period of validity set with respect to the content.

According to this structure, the content-using device, when self-detecting the transition from being unconnected with the content management server to being connected with the content management server, specifies, as the method for controlling the use of the content, a method independent of a period of validity of the content, and further, cancels the period of validity set with respect to the content. This enables a user to use the content. On the other hand, the content management server, when detecting that the content management server has transitioned from being unconnected with the content-using device to being connected with the content-using device, manages the content by using the method independent of a period of validity of the content, and cancels a period of validity set with respect to the content. In this case, a provider of the content is freed from concerns since the content-using device is connected with the content management server.

In the content distribution system, when the second connection detection unit continuously detects that the content-using device is connected with the content management server, the second selection unit may continuously specify, as the method for controlling the use of the content, a method according to a period of validity of the content, and the content control unit may perform updating of extending a specific period of validity set with respect to the content, and when the first connection detection unit continuously detects that the content management server is connected with the content-using device, the content management unit may continuously manage the content by using the method according to a period of validity of the content and may perform updating of extending a specific period of validity set with respect to the content.

According to this structure, the content-using device, when continuously self-detecting that the content-using device is connected with the content management server, continuously specifies, as the method for controlling the use of the content, the method according to a period of validity of the content, and further, performs updating of extending a period of validity set with respect to the content. This enables a user to continue the use of the content. On the other hand, the content management server, when continuously detecting that the content management server is connected with the content-using device, continuously manages the content by using the method according to a period of validity of the content and performs updating of extending a period of validity set with respect to the content. In this case, the provider of the content is freed from concerns since the content-using device is connected with the content management server.

In the content distribution system, the content management server may further comprise: an invalidation reception unit that receives an invalidation instruction for invalidation of the content; an invalidation instruction transmission unit that transmits the invalidation instruction to the content-using device; and an invalidation response reception unit that receives, from the content-using device, an invalidation response as a response to the invalidation instruction, the content-using device may further comprise: an invalidation instruction reception unit that receives the invalidation instruction from the content management server when the content-using device is connected with the content management server; an invalidation unit that invalidates the content according to the invalidation instruction; and an invalidation response transmission unit that generates an invalidation response when the content has been invalidated and transmits the invalidation response to the content management server, the second selection unit may specify, as the method for controlling the use of the content, a method according to a period of validity of the content when the content-using device is unconnected with the content management server, the content control unit may set a specific period of validity with respect to the content, and the invalidation unit may invalidate the content when the specific period of validity of the content expires.

According to this structure, when the content-using device is unconnected with the content management server, the content control unit specifies, as the method for controlling the use of the content, the method according to a period of validity of the content, sets a specific period of validity with respect to the content, and further, invalidates the content when the specific period of validity of the content expires. This results in protection of the content provided by a provider being ensured after the period of validity of the content expires.

In the content distribution system, the content-using device may further comprise a content deletion unit that deletes the content, the content control unit may further record information indicating deletion of the content when the content deletion unit has deleted the content, the content-using device may further comprise a notification unit that, (i) when the content-using device is connected with the content management server and the content deletion unit has deleted the content, immediately notifies the content management server of the deletion of the content and (ii) when the content-using device is unconnected with the content management server and the content deletion unit has deleted the content, notifies the content management server of the deletion of the content after the content-using device is connected with the content management server, and the content management unit may further record information indicating the deletion of the content.

According to this structure, the content-using device, when connected with the content management server, immediately notifies the content management server that the content has been deleted. On the other hand, the content-using device, when unconnected with the content management server, notifies the content management server that the content has been deleted after detecting the transition from being unconnected with the content management server to being connected with the content management server. This enables the content management server to acknowledge that the content has been self-deleted by the content-using device.

Another aspect of the present invention is a content management server managing a content and providing the content to a content-using device, comprising: a first connection detection unit that detects whether or not the content management server is connected with the content-using device; and a content management unit that manages the content according to a result of the detection by the first connection detection unit and holds information on how the content-using device controls the use of the content.

According to the content management server pertaining to one aspect of the present invention, the management of a content is performed according to a method for controlling the use of the content which is determined according to whether or not the content management server is connected with the content-using device. This results in protection of the content, which has been provided by a provider, being realized while a user utilizing the content is able to use the content with an enhanced degree of convenience.

In the content management server, when the first connection detection unit detects that the content management server has transitioned from being connected with the content-using device to being unconnected with the content-using device, the content management unit may manage the content by using a method according to a period of validity of the content and may set a specific period of validity with respect to the content.

According to this structure, the content management server, when detecting that the content management server has transitioned from being connected with the content-using device to being unconnected with the content-using device, manages the content according to the method according to a period of validity of the content and sets a specific period of validity with respect to the content. This enables the content management server to manage the content according to a period of validity of the content. As such, a provider of the content is freed from concerns.

In the content management server, when the first connection detection unit detects that the content management server has transitioned from being unconnected with the content-using device to being connected with the content-using device, the content management unit may manage the content by using a method independent of a period of validity of the content, and may cancel the specific period of validity set with respect to the content.

According to this structure, the content management server, when detecting that the content management server has transitioned from being unconnected with the content-using device to being connected with the content-using device, manages the content by using the method independent of a period of validity of the content, and cancels the specific period of validity set with respect to the content in the content management server. In this case, a provider of the content is freed from concerns since the content-using device is connected with the content management server.

In the content management server, when the first connection detection unit continuously detects that the content management server is connected with the content-using device, the content management unit may continuously manage the content by using a method according to a period of validity of the content and may perform updating of extending a specific period of validity set with respect to the content.

According to this structure, the content management server, when continuously detecting that the content management server is connected with the content-using device, continuously manages the content by using the method according to a period of validity of the content and performs updating of extending a specific period of validity set with respect to the content. In this case, a provider of the content is freed from concerns since the content-using device is connected with the content management server.

In the content management server, the first connection detection unit may perform polling with respect to the content-using device at a predetermining timing, may detect that the content management server is connected with the content-using device when receiving a polling response from the content-using device in response to the polling, and may detect that the content management server is unconnected with the content-using device when the polling response is not received from the content-using device within a predetermined interval.

According to this structure, the content management server detects whether or not the content management server is connected with the content-using device according to reception or non-reception of a polling response from the content-using device.

In the content management server, the first connection detection unit may determine the predetermined timing according to a period of validity of the content.

According to this structure, the content management server determines the predetermined timing at which polling is performed with respect to the content-using device according to a period of validity of the content. This enables effectively determining the timing at which polling is performed.

In the content management server, the first connection detection unit, when receiving a polling signal from the content-using device at a predetermined timing, may detect that that the content management server is connected with the content-using device, and may transmit a polling response to the content-using device.

According to this structure, the content management server detects whether or not the content management server is connected with the content-using device according to polling performed by the content-using device with respect to the content management server. As such, the content management server need not check whether or not a connection is established between the content management server and the content-using device.

In the content management server, the first connection detection unit may detect that the content management server is connected with the content-using device when receiving a notification from the content-using device that the content-using device is connected with the content management server.

According to this structure, the content management server detects that the content management server is connected with the content-using device when receiving a notification from the content-using device that the content-using device is connected with the content management server. As such, the content management server need not check whether or not a connection is established between the content management server and the content-using device.

The content management server may further comprise: an invalidation reception unit that receives an invalidation instruction for invalidation of the content; an invalidation instruction transmission unit that transmits the invalidation instruction to the content-using device; and an invalidation response reception unit that receives, from the content-using device, an invalidation response as a response to the invalidation instruction.

According to this structure, the content management server transmits an invalidation instruction for invalidation of a content to the content-using device and receives, from the content-using device, an invalidation response as a response to the invalidation instruction. As such, the content management server causes the content-using device to perform invalidation of the content.

The content management server may further comprise a display unit that displays a status of the invalidation of the content performed in accordance with the invalidation instruction by referring to the invalidation response received from the content-using device, wherein the display unit, (i) may display invalidation completion information indicating that the invalidation of the content has been completed by the content-using device, when connected with the content management server, and, (ii) may display a period of validity of the content set in the content-using device, when unconnected with the content management server.

According to this structure, the content management server displays invalidation completion information indicating that the invalidation of the content has been completed by the content-using device, when connected with the content management server. Further, the content management server displays a period of validity of the content set in the content-using device, when unconnected with the content management server. As such, a provider of the content is acknowledged of the status of the invalidation of the content.

The content management server may further comprise a display unit that displays how the management of the content is being performed.

According to this structure, the content management server displays how the management of the content is being performed. As such, a provider of the content is acknowledged of how the management of the content is being performed.

Another aspect of the present invention is a content-using device that uses a content provided from a content management server managing the content, comprising: a second connection detection unit that detects whether or not the content-using device is connected with the content management server; a second selection unit that specifies a method for controlling the use of the content according to a result of the detection by the second connection detection unit; and a content control unit that controls the use of the content according to the method specified by the second selection unit.

According to the content-using device pertaining to one aspect of the present invention, the management of a content is performed according to a method for controlling the use of the content which is determined according to whether or not the content-using device is connected with the content management server. This results in protection of the content, which has been provided by a provider, being realized while a user utilizing the content is able to use the content with an enhanced degree of convenience.

In the content-using device, when the second connection detection unit detects that the content-using device has transitioned from being connected with the content management server to being unconnected with the content management server, the second selection unit may specify, as the method for controlling the use of the content, a method according to a period of validity of the content, and the content control unit may set a specific period of validity with respect to the content and, when the specific period of validity of the content expires, may stop or deny the use of the content.

According to this structure, the content-using device, when self-detecting the transition from being connected with the content management server to being unconnected with the content management server, selects, as the method for controlling the use of the content, the method according to a period of validity of the content. Further, when the period of validity of the content expires, the content-using device stops or denies the use of the content. This enables a user of the content-using device to use the content during the period of validity of the content. Further, after the period of validity of the content expires, protection of the content having been provided by a provider is ensured.

In the content-using device, when the second connection detection unit detects that the content-using device has transitioned from being unconnected with the content management server to being connected with the content management server, the second selection unit may specify, as the method for controlling the use of the content, a method independent of a period of validity of the content, and the content control unit may cancel a specific period of validity set with respect to the content.

According to this structure, the content-using device, when self-detecting the transition from being unconnected with the content management server to being connected with the content management server, specifies, as the method for controlling the use of the content, a method independent of a period of validity of the content, and further, cancels the period of validity set with respect to the content. This enables a user to use the content.

In the content-using device, when the second connection detection unit continuously detects that the content-using device is connected with the content management server, the second selection unit may continuously specify, as the method for controlling the use of the content, a method according to a period of validity of the content, and the content control unit may perform updating of extending a specific period of validity set with respect to the content.

According to this structure, the content-using device, when continuously self-detecting that the content-using device is connected with the content management server, continuously specifies, as the method for controlling the use of the content, the method according to a period of validity of the content, and further, performs updating of extending a period of validity set with respect to the content. As such, a user is able to continue the use of the content.

In the content-using device, the second connection detection unit may detect whether or not the content-using device is connected with the content management server by performing either one of or any combination of: (i) detecting, at a predetermined timing, whether or not a polling signal is received from the content management server at the predetermining timing; (ii) detecting whether or not a communication module provided to the content-using device is activated; (iii) detecting whether or not the content-using device is located within a distance, from an access point, within which radio signals from the content-using device reach the access point; and (iv) detecting whether a user operation is performed with respect to the content-using device for activating or deactivating communication by the content-using device.

According to this structure, the content-using device detects whether or not the content-using device is connected with the content management server in various ways including detecting polling, detecting whether or not a communication module is activated, detecting whether or not the content-using device is located within a distance within which radios signals are reachable, and detecting a user operation performed with respect to the content-using device for activating/deactivating communication.

In the content-using device, the second connection detection unit, when detecting that the content-using device is connected with the content management server, may perform polling with respect to the content management server and may receive a polling response from the content management server as a response to the polling, and the content control unit, when the polling response permits extension of a period of validity set with respect to the content, may perform updating of extending the period of validity.

According to this structure, the content-using device performs polling with respect to the content management server, and when a polling response received as a response to the polling permits extension of a period of validity set with respect to the content, performs updating of extending the period of validity set with respect to the content. As such, a user of the content-using device is able to continue the use of the content.

In the content-using device, the second connection detection unit may determine a timing at which the polling is performed according to the period of validity.

According to this structure, the content-using device determines the predetermined timing at which polling is performed with respect to the content management server according to a period of validity of the content set in the content-using device. This enables effectively determining the timing at which polling is performed.

In the content-using device, the second connection detection unit, when detecting that the content-using device is connected with the content management server, may transmit a notification to the content management server that the content-using device is connected with the content management server, and the second connection detection unit may detect whether or not the content-using device is connected with the content management server by performing either one of or any combination of: (i) detecting, at a predetermined timing, whether or not a polling signal is received from the content management server at the predetermining timing; (ii) detecting whether or not a communication module provided to the content-using device is activated; (iii) detecting whether or not the content-using device is located within a distance, from an access point, within which radio signals from the content-using device reach the access point; and (iv) detecting whether a user operation is performed with respect to the content-using device for activating or deactivating communication by the content-using device.

According to this structure, the content-using device detects whether or not the content-using device is connected with the content management server in various ways including the detection of polling, detecting whether or not a communication module is activated, detecting whether or not the content-using device is located within a distance within which radios signals are reachable, and detecting a user operation performed with respect to the content-using device for activating/deactivating communication, and, when detecting that the content-using device is connected with the content management server, transmits a notification to the content management server that the content-using device is connected with the content management server.

The content-using device may further comprise: an invalidation instruction reception unit that receives an invalidation instruction from the content management server when the content-using device is connected with the content management server; an invalidation unit that invalidates the content according to the invalidation instruction; and an invalidation response transmission unit that generates an invalidation response when the content has been invalidated and transmits the invalidation response to the content management server.

According to this structure, the content-using device receives an invalidation instruction for invalidation of the content from the content management server and invalidates the content. This results in protection of the content being ensured.

The content-using device may further comprise: a display unit that displays a record of the invalidation of the content performed according to the invalidation instruction when the invalidation unit has invalidated the content.

According to this structure, the content-using device displays a record of the invalidation of the content when the invalidation unit has invalidated the content. As such, a user is acknowledged of a record of the invalidation of the content.

The content-using device may further comprise a display unit that displays how the control of the use of the content is being performed by the content control unit.

According to this structure, the content-using device displays how the control of the use of the content is being performed by the content control unit. As such, a user is acknowledged of how the control is being performed.

The content-using device may further comprise: an invalidation instruction reception unit that receives an invalidation instruction from the content management server when the content-using device is connected with the content management server; an invalidation unit that invalidates the content according to the invalidation instruction; an invalidation response transmission unit that generates an invalidation response when the content has been invalidated and transmits the invalidation response to the content management server, wherein the second selection unit may specify, as the method for controlling the use of the content, a method according to a period of validity of the content when the content-using device is unconnected with the content management server, the content control unit may set a specific period of validity with respect to the content, and the invalidation unit may invalidate the content when the specific period of validity of the content expires.

According to this structure, when the content-using device is unconnected with the content management server, the content control unit specifies, as the method for controlling the use of the content, the method according to a period of validity of the content, sets a specific period of validity with respect to the content, and further, invalidates the content when the specific period of validity of the content expires. This results in protection of the content provided by a provider being ensured after the period of validity of the content expires.

The content-using device may further comprise a content deletion unit that deletes the content, wherein the content control unit may further record information indicating deletion of the content when the content deletion unit has deleted the content, the content-using device may further comprise: a notification unit that, (i) when the content-using device is connected with the content management server and the content deletion unit has deleted the content, immediately notifies the content management server of the deletion of the content and, (ii) when the content-using device is unconnected with the content management server and the content deletion unit has deleted the content, notifies the content management server of the deletion of the content after the content-using device is connected with the content management server.

According to this structure, the content-using device, when connected with the content management server, immediately notifies the content management server that the content has been deleted. On the other hand, the content-using device, when unconnected with the content management server, notifies the content management server that the content has been deleted after detecting the transition from being unconnected with the content management server to being connected with the content management server. As such, the content management server is able to acknowledge that the content has been self-deleted by the content-using device.

Another aspect of the present invention is a control method used in a content distribution system including: a content management server that manages a content; and a content-using device that uses the content, comprising: a first connection detection step, by the content management server, of detecting whether or not the content management server is connected with the content-using device; a content management step, by the content management server, of managing the content according to a result of the detection in the first connection detection step and of holding information on how the content-using device controls the use of the content; a second connection detection step, by the content-using device, of detecting whether or not the content-using device is connected with the content management server; a second selection step, by the content-using device, of specifying a method for controlling the use of the content according to a result of the detection in the second connection detection step; and a content control step, by the content-using device, of controlling the use of the content according to the method specified in the second selection step.

According to the control method pertaining to one aspect of the present invention, the management of a content in the content distribution system is performed according to a method for controlling the use of the content which is determined according to whether or not the content-using device is connected with the content management server. This results in protection of the content, which has been provided by a provider, being realized while a user utilizing the content is able to use the content with an enhanced degree of convenience.

Another aspect of the present invention is an integrated circuit that forms a content management server managing a content and providing the content to a content-using device, comprising: a first connection detection unit that detects whether or not the content management server is connected with the content-using device; and a content management unit that manages the content according to a result of the detection by the first connection detection unit and holds information on how the content-using device controls the use of the content.

According to the integrated circuit pertaining to one aspect of the present invention, the management of a content is performed according to a method for controlling the use of the content which is determined according to whether or not the content management server is connected with the content-using device. This results in protection of the content, which has been provided by a provider, being realized while a user utilizing the content is able to use the content with an enhanced degree of convenience.

Another aspect of the present invention is an integrated circuit that forms a content-using device that uses a content provided from a content management server managing the content, comprising: a second connection detection unit that detects whether or not the content-using device is connected with the content management server; a second selection unit that specifies a method for controlling the use of the content according to a result of the detection by the second connection detection unit; and a content control unit that controls the use of the content according to the method specified by the second selection unit.

According to the integrated circuit pertaining to one aspect of the present invention, the management of a content is performed according to a method for controlling the use of the content which is determined according to whether or not the content-using device is connected with the content management server. This results in, protection of the content, which has been provided by a provider, being realized while a user utilizing the content is able to use the content with an enhanced degree of convenience.

1. Embodiment 1

In the following, description is provided on a content distribution system 40 pertaining to embodiment 1 of the present invention, with reference to the accompanying drawings.

(1) Configuration of Content Distribution System 40

FIG. 1 illustrates an overall configuration of the content distribution system 40. The content distribution system 40 includes a content management server 800 and a content-using device 900.

The content management server 800 manages a content. The content-using device 900 uses the content.

The content management server 800 comprises: a first connection detection unit 802; and a content management unit 801. The first connection detection unit 802 detects whether or not the content management server 800 is connected with the content-using device 900. The content management unit 801 manages the content according to a result of the detection by the first connection detection unit 802. The content management unit 801 holds information on how the content-using device 900 controls the use of the content.

The content-using device 900 comprises: a second connection detection unit 901; a second selection unit 903; and a content control unit 902. The second connection detection unit 901 detects whether or not the content-using device 900 is connected with the content management server 800. The second selection unit 903 specifies a method for controlling the use of the content according to a result of the detection by the second connection detection unit 901. The content control unit 902 controls the use of the content according to the method specified by the second selection unit 903.

Conclusion

According to the configuration of the content distribution system 40 pertaining to embodiment 1, the management of a content in the content distribution system 40 is performed according to a method for controlling the use of the content which is determined according to whether or not the content-using device 900 is connected with the content management server 800. As such, protection of the content, which has been provided by a provider, is realized while a user utilizing the content is able to use the content with an enhanced degree of convenience.

(2) When the second connection detection unit 901 detects that the content-using device 900 has transitioned from being connected with the content management server 800 to being unconnected with the content management server 800, the second selection unit 903 may specify, as the method for controlling the use of the content, a method according to a period of validity of the content, and the content control unit 902 may set a specific period of validity with respect to the content and, when the specific period of validity of the content expires, may stop or deny the use of the content.

When the first connection detection unit 802 detects that the content management server 800 has transitioned from being connected with the content-using device 900 to being unconnected with the content-using device 900, the content management unit 801 may manage the content by using the method according to a period of validity of the content and may set a specific period of validity with respect to the content.

(3) When the second connection detection unit 901 detects that the content-using device 900 has transitioned from being unconnected with the content management server 800 to being connected with the content management server 800, the second selection unit 903 may specify, as the method for controlling the use of the content, a method independent of a period of validity of the content, and the content control unit 902 may cancel a specific period of validity set with respect to the content.

When the first connection detection unit 802 detects that the content management server 800 has transitioned from being unconnected with the content-using device 900 to being connected with the content-using device 900, the content management unit 801 may manage the content by using the method independent of a period of validity of the content, and may cancel a specific period of validity set with respect to the content.

(4) When the second connection detection unit 901 continuously detects that the content-using device 900 is connected with the content management server 800, the second selection unit 903 may continuously specify, as the method for controlling the use of the content, a method according to a period of validity of the content, and the content control unit 902 may perform updating of extending a specific period of validity set with respect to the content.

When the first connection detection unit 802 continuously detects that the content management server 800 is connected with the content-using device 900, the content management unit 801 may continuously manage the content by using the method according to a period of validity of the content and may perform updating of extending a specific period of validity set with respect to the content.

(5) The content management server 800 may further comprise: an invalidation reception unit that receives an invalidation instruction for invalidation of the content; an invalidation instruction transmission unit that transmits the invalidation instruction to the content-using device 900; and an invalidation response reception unit that receives, from the content-using device 900, an invalidation response as a response to the invalidation instruction.

The content-using device 900 may further comprise: an invalidation instruction reception unit that receives the invalidation instruction from the content management server 800 when the content-using device 900 is connected with the content management server 800; an invalidation unit that invalidates the content according to the invalidation instruction; and an invalidation response transmission unit that generates an invalidation response when the content has been invalidated and transmits the invalidation response to the content management server 800.

The second selection unit 903 may specify, as the method for controlling the use of the content, a method according to a period of validity of the content when the content-using device 900 is unconnected with the content management server 800, the content control unit 902 may set a specific period of validity with respect to the content, and the invalidation unit may invalidate the content when the specific period of validity of the content expires.

(6) The content-using device 900 may further comprise a content deletion unit that deletes the content.

The content control unit 902 may further record information indicating deletion of the content when the content deletion unit has deleted the content.

The content-using device 900 may further comprise a notification unit that, (i) when the content-using device 900 is connected with the content management server 800 and the content deletion unit has deleted the content, immediately notifies the content management server 800 of the deletion of the content and (ii) when the content-using device 900 is unconnected with the content management server 800 and the content deletion unit has deleted the content, notifies the content management server 800 of the deletion of the content after the content-using device 900 is connected with the content management server 800.

The content management unit 801 may further record the deletion of the content.

(7) One aspect of the present invention is the content management server 800 managing a content and providing the content to the content-using device 900. As illustrated in FIG. 1, the content management server 800 comprises: the first connection detection unit 802 that detects whether or not the content management server 800 is connected with the content-using device 900; and the content management unit 801 that manages the content according to a result of the detection by the first connection detection unit 802 and holds information on how the content-using device 900 controls the use of the content.

(8) When the first connection detection unit 802 detects that the content management server 800 has transitioned from being connected with the content-using device 900 to being unconnected with the content-using device 900, the content management unit 801 may manage the content by using a method according to a period of validity of the content and may set a specific period of validity with respect to the content.

(9) When the first connection detection unit 802 detects that the content management server 800 has transitioned from being unconnected with the content-using device 900 to being connected with the content-using device 900, the content management unit 801 may manage the content by using a method independent of a period of validity of the content, and may cancel a specific period of validity set with respect to the content.

(10) When the first connection detection unit 802 continuously detects that the content management server 800 is connected with the content-using device 900, the content management unit 801 may continuously manage the content by using the method according to a period of validity of the content and may perform updating of extending a specific period of validity set with respect to the content.

(11) The first connection detection unit 802 may perform polling with respect to the content-using device 900 at a predetermining timing, may detect that the content management server 800 is connected with the content-using device 900 when receiving a polling response from the content-using device 900 in response to the polling, and may detect that the content management server 800 is unconnected with the content-using device 900 when the polling response is not received from the content-using device 900 within a predetermined interval.

(12) The first connection detection unit 802 may determine the predetermined timing according to a period of validity of the content.

(13) The first connection detection unit 802, when receiving a polling signal from the content-using device 900 at a predetermined timing, may detect that the content management server 800 is connected with the content-using device 900, and may transmit a polling response to the content-using device 900.

(14) The first connection detection unit 802 may detect that the content management server 800 is connected with the content-using device 900 when receiving a notification from the content-using device 900 that the content-using device 900 is connected with the content management server 800.

(15) The content management server 800 may further comprise: an invalidation reception unit that receives an invalidation instruction for invalidation of the content; an invalidation instruction transmission unit that transmits the invalidation instruction to the content-using device 900; and an invalidation response reception unit that receives, from the content-using device 900, an invalidation response as a response to the invalidation instruction.

(16) The content management server 800 may further comprise a display unit that displays a status of the invalidation of the content performed according to the invalidation instruction by referring to the invalidation response received from the content-using device 900. The display unit, (i) may display invalidation completion information indicating that the invalidation of the content has been completed by the content-using device 900, when connected with the content management server 800, and, (ii) may display a period of validity of the content set in the content-using device 900, when unconnected with the content management server 800.

(17) The content management server 800 may further comprise a display unit that displays how the management of the content is being performed.

(18) One aspect of the present invention is the content-using device 900 that uses a content provided from the content management server 800 managing the content.

As illustrated in FIG. 1, the content-using device 900 comprises: the second connection detection unit 901 that detects whether or not the content-using device 900 is connected with the content management server 800; the second selection unit 903 that specifies a method for controlling the use of the content according to a result of the detection by the second connection detection unit 901; and the content control unit 902 that controls the use of the content according to the method specified by the second selection unit 903.

(19) When the second connection detection unit 901 detects that the content-using device 900 has transitioned from being connected with the content management server 800 to being unconnected with the content management server 800, the second selection unit 903 specifies, as a method for controlling the use of the content, a method according to a period of validity of the content, and the content control unit 902 may set a specific period of validity with respect to the content and, when the specific period of validity of the content expires, may stop or deny the use of the content.

(20) When the second connection detection unit 901 detects that the content-using device 900 has transitioned from being unconnected with the content management server 800 to being connected with the content management server 800, the second selection unit 903 may specify, as the method for controlling the use of the content, a method independent of a period of validity of the content, and the content control unit 902 may cancel a specific period of validity set with respect to the content.

(21) When the second connection detection unit 901 continuously detects that the content-using device 900 is connected with the content management server 800, the second selection unit 903 may continuously specify, as the method for controlling the use of the content, a method according to a period of validity of the content, and the content control unit 902 may perform updating of extending a specific period of validity set with respect to the content.

(22) The second connection detection unit 901 may detect whether or not the content-using device 900 is connected with the content management server 800 by performing either one of or any combination of: (i) detecting, at a predetermined timing, whether or not a polling signal is received from the content management server 800 at the predetermining timing; (ii) detecting whether or not a communication module provided to the content-using device 900 is activated; (iii) detecting whether or not the content-using device 900 is located within a distance, from an access point, within which radio signals from the content-using device 900 reach the access point; and (iv) detecting whether a user operation is performed with respect to the content-using device 900 for activating or deactivating communication by the content-using device 900.

(23) The second connection detection unit 901, when detecting that the content-using device 900 is connected with the content management server 800, may perform polling with respect to the content management server 800 and may receive a polling response from the content management server 800 as a response to the polling.

The content control unit 902, when the polling response permits extension of a period of validity set with respect to the content, may perform updating of extending the period of validity.

(24) The second connection detection unit 901 may determine a timing at which the polling is performed according to the period of validity.

(25) The second connection detection unit 901, when detecting that the content-using device 900 is connected with the content management server 800, may transmit a notification to the content management server 800 that the content-using device 900 is connected with the content management server 800.

The second connection detection unit 901 may detect whether or not the content-using device 900 is connected with the content management server 800 by performing either one of or any combination of: (i) detecting, at a predetermined timing, whether or not a polling signal is received from the content management server 800 at the predetermining timing; (ii) detecting whether or not a communication module provided to the content-using device 900 is activated; (iii) detecting whether or not the content-using device 900 is located within a distance, from an access point, within which radio signals from the content-using device 900 reach the access point; and (iv) detecting whether a user operation is performed with respect to the content-using device 900 for activating or deactivating communication by the content-using device 900.

(26) The content-using device 900 may further comprise: an invalidation instruction reception unit that receives an invalidation instruction from the content management server 800 when the content-using device 900 is connected with the content management server 800; an invalidation unit that invalidates the content according to the invalidation instruction; and an invalidation response transmission unit that generates an invalidation response when the content has been invalidated and transmits the invalidation response to the content management server 800.

(27) The content-using device 900 may further comprise: a display unit that displays a record of the invalidation of the content performed according to the invalidation instruction when the invalidation unit has invalidated the content.

(28) The content-using device 900 may further comprise a display unit that displays how the control of the use of the content is being performed by the content control unit 902.

(29) The content-using device 900 may further comprise: an invalidation instruction reception unit that receives the invalidation instruction from the content management server 800 when the content-using device 900 is connected with the content management server 800; an invalidation unit that invalidates the content according to the invalidation instruction; and an invalidation response transmission unit that generates an invalidation response when the content has been invalidated and transmits the invalidation response to the content management server 800.

The second selection unit 903 may specify, as the method for controlling the use of the content, a method according to a period of validity of the content when the content-using device 900 is unconnected with the content management server 800, the content control unit 902 may set a specific period of validity with respect to the content.

The invalidation unit may invalidate the content when the specific period of validity of the content expires.

(30) The content-using device 900 may further comprise a content deletion unit that deletes the content.

The content control unit 902 may further record information indicating deletion of the content when the content deletion unit has deleted the content.

The content-using device 900 may further comprise a notification unit that, (i) when the content-using device 900 is connected with the content management server 800 and the content deletion unit has deleted the content, immediately notifies the content management server 800 of the deletion of the content and (ii) when the content-using device 900 is unconnected with the content management server 800 and the content deletion unit has deleted the content, notifies the content management server 800 of the deletion of the content after the content-using device 900 is connected with the content management server 800.

(31) One aspect of the present invention is control method used in the content distribution system 40 including: the content management server 800 that manages a content; and the content-using device 900 that uses the content.

The control method comprises: a first connection detection step, by the content management server 800, of detecting whether or not the content management server 800 is connected with the content-using device 900; a content management step, by the content management server 800, of managing the content according to a result of the detection in the first connection detection step and of holding information on how the content-using device 900 controls the use of the content; a second connection detection step, by the content-using device 900, of detecting whether or not the content-using device 900 is connected with the content management server 800; a second selection step, by the content-using device 900, of specifying a method for controlling the use of the content according to a result of the detection in the second connection detection step; and a content control step, by the content-using device 900, of controlling the use of the content according to the method specified in the second selection step.

(32) One aspect of the present invention is an integrated circuit that forms the content management server 800 managing a content and providing the content to the content-using device 900.

The integrated circuit comprises: a first connection detection unit that detects whether or not the content management server 800 is connected with the content-using device 900; and a content management unit that manages the content according to a result of the detection by the first connection detection unit and holds information on how the content-using device 900 controls the use of the content.

(33) One aspect of the present invention is an integrated circuit that forms the content-using device 900 that uses a content provided from the content management server 800 managing the content.

The integrated circuit comprises: a second connection detection unit that detects whether or not the content-using device 900 is connected with the content management server 800; a second selection unit that specifies a method for controlling the use of the content according to a result of the detection by the second connection detection unit; and a content control unit that controls the use of the content according to the method specified by the second selection unit.

2. Embodiment 2

In the following, description is provided on a content distribution system 10 pertaining to embodiment 2 of the present invention, with reference to the accompanying drawings.

2.1 Configuration of Content Distribution System 10

Figure 2:
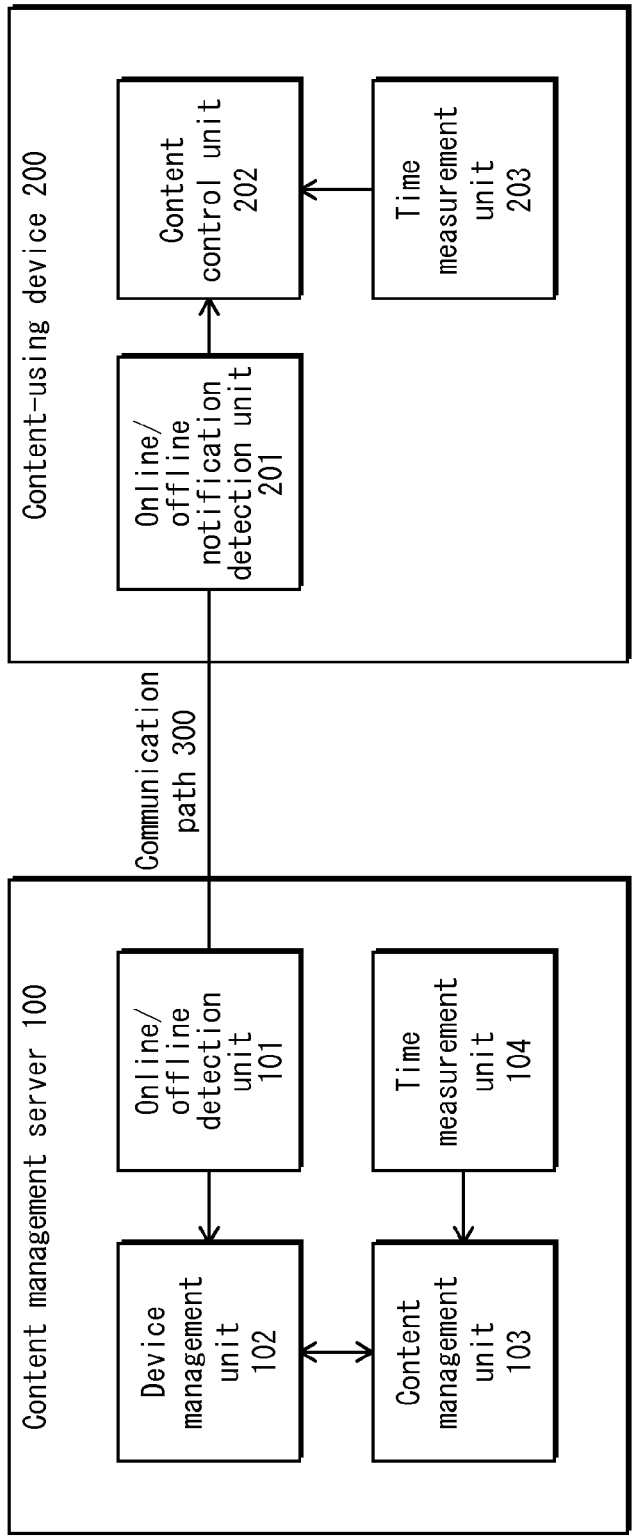
FIG. 2 illustrates an overall configuration of a content distribution system 10 in embodiment 2, including a configuration of a content management server 100 and a configuration of a content-using device 200.

FIG. 2 illustrates an overall configuration of the content distribution system 10. The content distribution system 10 includes: a content management server 100; a content-using device 200; and a communication path 300 between the content management server 100 and the content-using device 200. The communication path 300 may be an IP communication network or a non-IP communication network, may be a wireline communication network or a wireless communication network, and may include one or more communication devices such as a router interposed between the content management server 100 and the content-using device 200. The content distribution system 10 may include two or more content management servers and two or more content-using devices. When multiple content management servers and multiple content-using devices are included in the content distribution system 10, the content management servers and the content-using devices may be interconnected via a network.

2.2 Configuration of Content Management Server 100

FIG. 2 also illustrates a configuration of the content management server 100. The content management server 100 includes: an online/offline detection unit 101; a device management unit 102; a content management unit 103; and a time measurement unit 104.

Commonly, the content management server 100 is implemented as an embedded device such as a PC and a video recorder. An embedded device such as a PC and a video recorder includes: a CPU; a memory; a secondary storage device; and a network interface. In the content management server 100, when implemented as such an embedded device, the online/offline detection unit 101 is implemented as a combination of the network interface, the CPU, and a program that operates on the CPU. Similarly, the device management unit 102 is implemented as a combination of the CPU, the memory, and a program that operates on the CPU. Similarly, the content management unit 103 is implemented as a combination of the CPU, the secondary storage device, and a program that operates on the CPU, and the time measurement unit 104 is commonly implemented as a combination of hardware such as a timer and software for controlling the hardware. However, as a matter of course, the content management server 100 pertaining to the present embodiment is not limited to being implemented in such a manner.

2.2.1 Online/Offline Detection Unit 101

Figure 3:
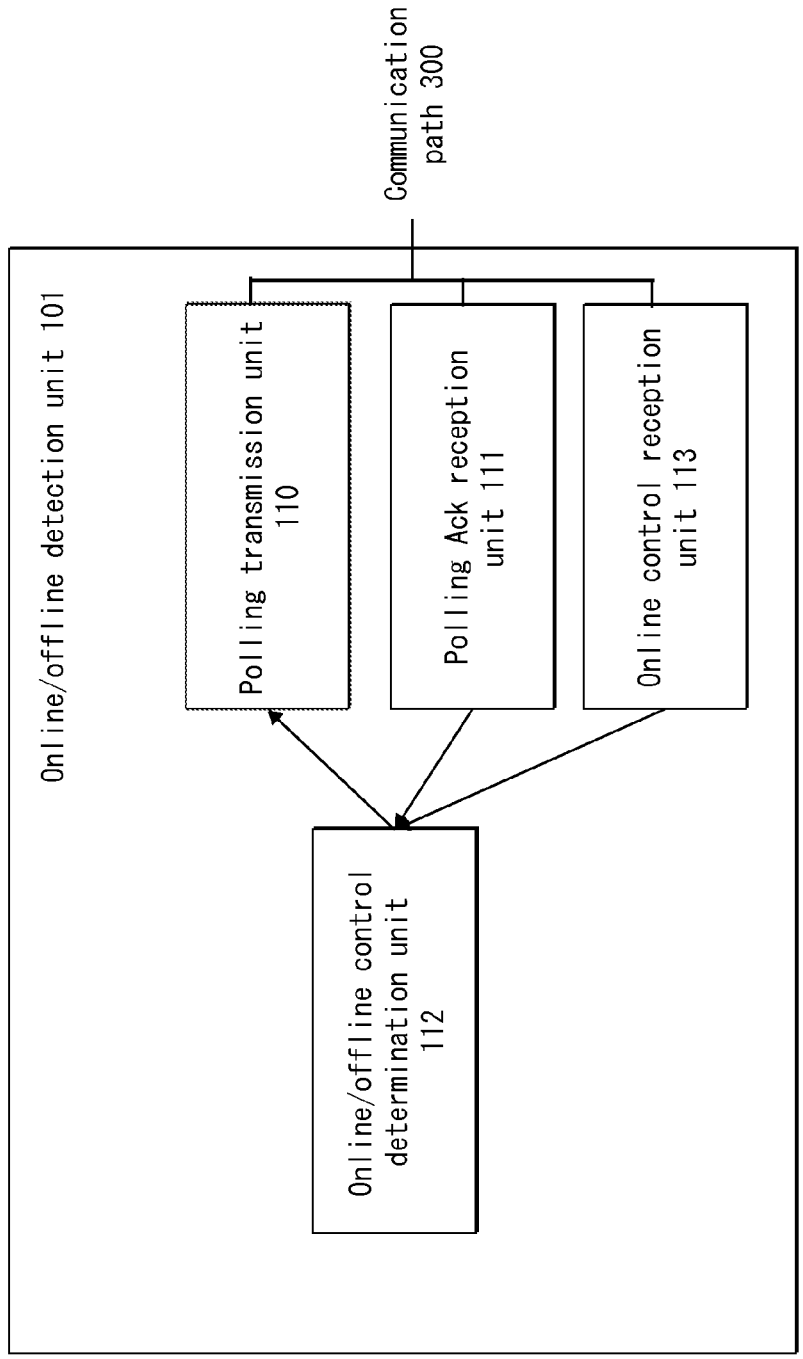
FIG. 3 illustrates a configuration of an online/offline detection unit 101.

FIG. 3 illustrates a configuration of the online/offline detection unit 101. The online/offline detection unit 101 detects that a device (a content-using device) has transitioned from a state of being connected with the content management server 100 (hereinafter a content-using device, when in such a state, is referred to as being "online" or as an "online content-using device") to a state of being unconnected with the content management server 100 (hereinafter a content-using device, when in such a state, is referred to as being "offline" or as an "offline content-using device"). The online/offline detection unit 101 also detects that the content-using device has transitioned from offline to online. More specifically, the online/offline detection unit 101 includes: a polling transmission unit 110; an online/offline control determination unit 112; a polling Ack reception unit 111; and an online control reception unit 113.

The following provides specific description on how the online/offline detection unit 101 detects whether the content-using device is online or offline.

First, the online/offline control determination unit 112 notifies the polling transmission unit 110 of an address of the content-using device. The polling transmission unit 110 receives the address and transmits a polling command to the address via the communication path 300. For instance, the transmission of the polling command is realized by ping in an IP network. Ping is a software for testing the reachability of a target node on an IP network. When utilizing ping, an Internet Control Message Protocol (ICMP) "echo request" packet is transmitted to a target node. Further, the reachability of the target node is confirmed by an "echo reply" being returned from the target node as a response packet (a polling Ack). With regards to the polling performed by the polling transmission unit 110, the polling transmission unit 110 performs the polling at regular intervals by being instructed by the online/offline control determination unit 112. For instance, the polling is performed at hourly intervals.

The polling Ack reception unit 111 receives a polling Ack returned from the target node (i.e., the polling-target content-using device) as a response to the polling command. When the polling Ack reception unit 111 receives the polling Ack, the online/offline control determination unit 112 determines that the target node is online. In contrast, when the polling Ack reception unit 111 does not receive the polling Ack even after elapse of a predetermined interval following the transmission of the polling command (i.e., in cases of "timeout"), the online/offline control determination unit 112 determines that the target node is offline. The online/offline detection unit 101 transmits, at regular intervals, a polling command to each content-using device to which a content possessed by the content management server 100 has been distributed. By performing the polling in such a manner, the online/offline detection unit 101 detects whether each content-using device is online or offline. Further, the online/offline detection unit 101 notifies the device management unit 102 of a result of the detection, along with a detection time point at which the detection has been performed.

As described above, in an IP network for instance, a given device is determined as being online when, by utilizing ping, an "echo request" (i.e., a polling command) is transmitted to the device and an "echo reply" (i.e., a polling Ack (response)) corresponding to the "echo request" is returned from the device in response. In contrast, a given device is determined as being offline when, an "echo reply" (i.e., a polling Ack (response)) corresponding to an "echo request" having been transmitted to the device is not returned from the device.

The online control reception unit 113 also receives a notification signal from a content-using device that self-detects a transition from offline to online. Hereinafter, the notification signal transmitted and received in such a case may also be referred to as an "online control signal". When the online control reception unit 113 receives an online control signal from a content-using device 200, the content management server 100 determines that the content-using device 200 is online.

Once determining that the content-using device 200 is offline, the content management server 100 stops performing online/offline detection, which involves performing the polling at regular intervals, with respect to the content-using device 200.

2.2.2 Device Management Unit 102

Figure 4:
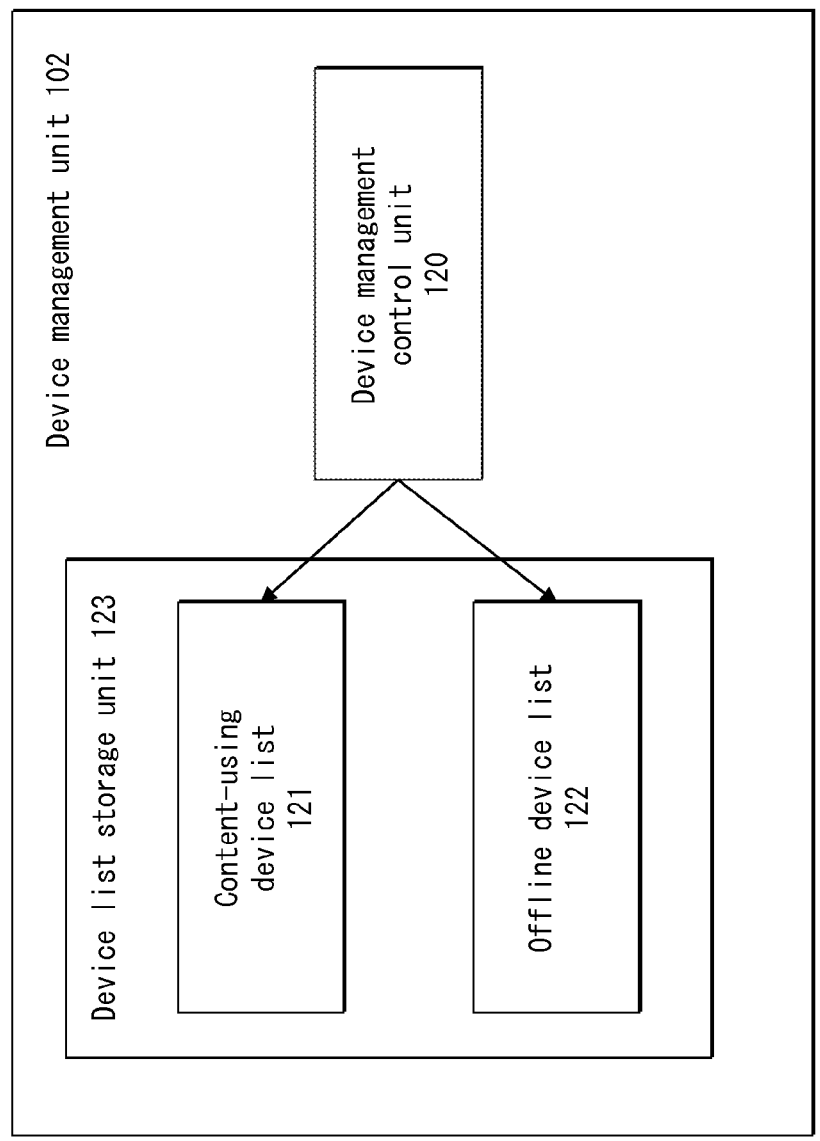
FIG. 4 illustrates a configuration of a device management unit 102.

FIG. 4 illustrates a configuration of the device management unit 102. The device management unit 102 includes: a device management control unit 120; and a device list storage unit 123. The device list storage unit 123 holds a content-using device list 121 and an offline device list 122.

The device management control unit 120 controls the writing, the reading out, and the deleting of content-using device information with respect to the content-using device list 121. The device management control unit 120 also controls the writing, the reading out, and the deleting of offline device information with respect to the offline device list 122. In addition, when, for instance, receiving an invalidation instruction for invalidating playback of a content, the device management control unit 120 reads out, from the content-using device list 121, an IP address indicating a connection destination of a content-using device corresponding to the invalidation instruction. Further, when it is detected that a content-using device has transitioned from online to offline as a result of the online/offline detection, the device management control unit 120 adds, to the offline device list 122, offline device information corresponding to the content-using device. Offline device information corresponding to a given content-using device includes a device name of the content-using device, etc. On the other hand, when it is detected that a content-using device has transitioned from offline to online as a result of the online/offline detection, the device management control unit 120 deletes, from the offline device list 122, offline device information corresponding to the content-using device, which includes a device name of the content-using device, etc.

FIG. 5 is a chart indicating one example of a data configuration of the content-using device list 121.

The content-using device list 121 is provided with areas for storing multiple content-using device information pieces. Each content-using device information piece includes, in an associated state, a content-using device name and an IP address indicating a connection destination of the content-using device. A content-using device name is identification information identifying a content-using device. As such, when a plurality of content-using device names are included in the content-using device list 121, the content-using device names respectively indicate a plurality of content-using devices that receives a content from the content management server 100. Further, in this example, a connection destination of a content-using device is indicated by employing an IP address indicating a location on an IP network at which the content-using device is located.

In the content-using device list 121 illustrated in FIG. 5, a content-using device identified by "C1" in a content-using device name field 124 is located on the IP network at a location indicated by "192.168.1.21" in an IP address field 125. For instance, when instructing the content-using device identified by the content-using device name "C1" to invalidate playback, an invalidation instruction command is transmitted to the IP address "192.168.1.21" indicated in the IP address field 125. The same applies to content-using devices identified by content-using device names "C2" and "C3". Here, in the content-using device list 121 illustrated in FIG. 5, a private address such as "192.168.*.*" is used to indicate an IP address. However, a global address may be used to indicate an IP address. Further, although indication of IP addresses in the content-using device list 121 illustrated in FIG. 5 is based on Internet Protocol Version 4 (IPv4), alternatively, IP addresses may be indicated based on Internet Protocol Version 6 (IPv6). In addition, taking into consideration the possibility of an address of a content-using device being changed, a domain name may be used instead of an IP address. Alternatively, also taking into consideration the possibility of an IP address of a content-using device being changed, configuration may be made such that an inquiry is made to a server managing IP addresses.

Note that, in the present disclosure, a content-using device identified by a content-using device name of "C1" may be simply referred to as a content-using device "C1". The same applies to content management servers.

FIG. 6 is a chart indicating one example of a data configuration of the offline device list 122.

The offline device list 122 is provided with areas for storing multiple offline device information pieces. Each offline device information piece includes an offline device name and an offline detection time. An offline device name identifies a content-using device that has been determined by the online/offline detection unit 101 as being offline. An offline detection time indicates a time point at which the corresponding content-using device has been determined as being offline by the online/offline detection unit 101.

The offline device list 122 illustrated in FIG. 6 indicates that a content-using device identified by "C1" in an offline device name field 126 has been determined as being offline at "1/20, 00:00" in an offline detection time field 127. Here, "1/20, 00:00" in the offline detection time field 127 indicates 00:00, January 20$^{th}$. In the following, the same format is used for indications of time.

2.2.3 Content Management Unit 103

Figure 7:
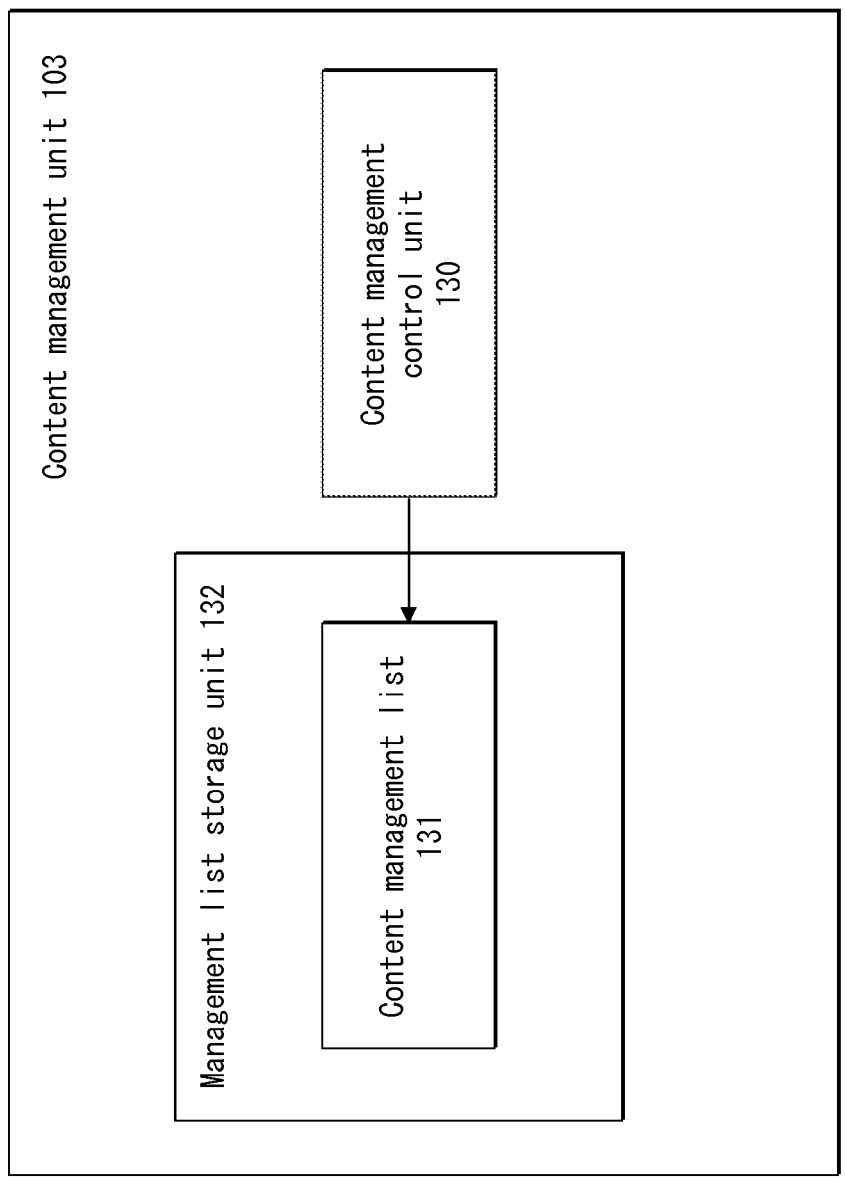
FIG. 7 illustrates a configuration of a content management unit 103.

FIG. 7 illustrates a configuration of the content management unit 103. The content management unit 103 includes: a content management control unit 130; and a management list storage unit 132. The management list storage unit 132 holds a content management list 131.

The content management control unit 130 controls the writing, the reading out, and the deleting of management information with respect to the content management list 131. For instance, in accordance with results of the online/offline detection, the content management control unit 130 sets, in the content management list 131, a scheduled expiration time as a time point at which a period of validity of a content expires.

FIG. 8 is a chart indicating one example of a data configuration of the content management list 131.

The content management list 131 is provided with areas for storing multiple management information pieces. Each management information piece includes: one content ID; one relative validity duration; and either zero, one, or multiple usage device information pieces. That is, a management information piece includes either: (i) a combination of one content ID and one relative validity duration; (ii) a combination of one content ID, one relative validity duration, and one usage device information piece; or (iii) a combination of one content ID, one relative validity duration, and multiple usage device information pieces.

A management information piece including a combination of one content ID and one relative validity duration indicates an initial state of the management information. When a management information piece indicates an initial state, the content management server 100 has not provided a content to any content-using device. A management information piece including a combination of one content ID, one relative validity duration, and one usage device information piece indicates that the content management server 100 has provided a content to only one content-using device. A management information piece including a combination of one content ID, one relative validity duration, and multiple usage device information pieces indicates that the content management server 100 has provided a content to the same number of content-using devices as the number of usage device information pieces included.

Each usage device information piece includes one content-using device name or a combination of one content-using device name and one scheduled expiration time. That is, a usage device information piece may only include one content-using device name or may include a combination of one content-using device name and one scheduled expiration time. When a usage device information piece only includes one content-using device name, a scheduled expiration time is not set with respect to the content-using device identified by the content-using device name. When a usage device information piece includes a combination of one content-using device name and one scheduled expiration time, a scheduled expiration time is set with respect to the content-using device identified by the content-using device name.

A content ID uniquely identifies a corresponding content. A relative validity duration indicates a relative duration during which use, by an offline content-using device, of a content identified by the corresponding content ID is permitted. Such a relative duration as described above is referred to as a relative validity duration.

A content-using device name is a name identifying a content-using device. A scheduled expiration time is included in a usage device information piece when a content-using device identified by the corresponding content-using device name is offline, and indicates a time point at which a period of validity of the content expires. Here, the content is referred to as being valid when use of the content by the offline content-using device is permitted.

The content management list 131 illustrated in FIG. 8 indicates that "24H", as indicated in a relative validity duration field 134, is set as a relative validity duration of a content identified by "Cont 1" in a content ID field 133. Here, "24H" indicates a time period of twenty-four hours. The content management list 131 illustrated in FIG. 8 also indicates that the content "Cont1" is being used by two content-using devices each indicated by "C1" in a content-using device name field 135 and "C2" in a content-using device name field 136.

The content management list 131 illustrated in FIG. 8 indicates that "1/21, 00:00", as indicated in a scheduled expiration time field 137, is set as a scheduled expiration time with respect to the content-using device indicated by "C1" in the content-using device name field 135. As such, the content-using device "C1" is currently offline and the period of validity of the content "Cont1" with respect to the content-using device "C1" expires at 00:00, January $21^{st}$. Here, while a content is valid with respect to a given content-using device, the content using device is permitted to use the content. This time point at which the validity of the content "Cont1" expires is calculated by adding "24H" indicated in the relative validity duration field 134 to "1/20, 00:00" indicated in the offline detection time field 127 illustrated in FIG. 6. The indication of "1/21, 00:00" in the scheduled expiration time field 137 indicates that the period of validity of the content "Cont1" with respect to the content-using device "C1" expires at this time point, if not sooner.

Scheduled Expiration Time=Offline Detection Time+
Relative Validity Duration

The content management list 131 illustrated in FIG. 8 indicates that a scheduled expiration time is not set with respect to the content-using device indicated by "C2" in the content-using device name field 136. As such, the content-using device "C2" is currently online and a specific period of validity of the content "Cont1" with respect to the content-using device "C2" is not set. In the content management list 131 illustrated in FIG. 8, an indication of "---" is provided in a scheduled expiration time field 138, which indicates that a scheduled expiration time is not set.

The content management list 131 illustrated in FIG. 8 indicates that "48H", as indicated in a relative validity duration field 140, is set as a relative validity duration of a content identified by "Cont2" in a content ID field 139. The content management list 131 illustrated in FIG. 8 also indicates that the content "Cont2" is being used by two content-using devices each indicated by "C1" in a content-using device name field 141 and "C3" in a content-using device name field 142. Here, "48H" indicates a time period of forty-eight hours. The content-using device "C1" is currently offline, and "1/21, 00:00", as indicated in a scheduled expiration time field 143, is set as a scheduled expiration time with respect to the content-using device "C1". The content-using device "C3" is currently online.

FIG. 9 is a chart indicating one example of a data configuration of a content management list 131a, which is another example of the content management list 131. In specific, the content management list 131a indicates a state of the content management list 131 after the content-using device "C1", which is offline in the content management list 131 illustrated in FIG. 8, has transitioned from offline to online. The content management list 131a indicates that each of the content-using devices "C1", "C2", and "C3" is currently online. Further, the content management list 131a indicates that a scheduled expiration time is not set with respect to any of the content-using devices "C1", "C2", and "C3".

2.2.4 Time Measurement Unit 104

The time measurement unit 104 measures and outputs a current time.

2.3 Content-Using Device 200

FIG. 2 illustrates a configuration of the content-using device 200. The content-using device 200 includes: an online/ offline notification detection unit 201; a content control unit 202; and a time measurement unit 203.

The content-using device 200 is commonly implemented as an embedded device such as a PC and a mobile phone. An embedded device such as a PC and a mobile phone includes a CPU, a memory, a secondary storage device, and a network interface. In the content-using device 200, when implemented as such an embedded device, the online/offline notification detection unit 201 is implemented as a combination of the network interface, the CPU, and a program that operates on the CPU. Similarly, the content control unit 202 is implemented as a combination of the CPU, the secondary storage device, and a program that operates on the CPU. Further, the time measurement unit 203 is commonly implemented as a combination of hardware such as a timer and software for controlling the hardware. However, as a matter of course, the content-using device 200 pertaining to the present embodiment is not limited to being implemented in such a manner.

2.3.1 Online/Offline Notification Detection Unit 201

Figure 10:
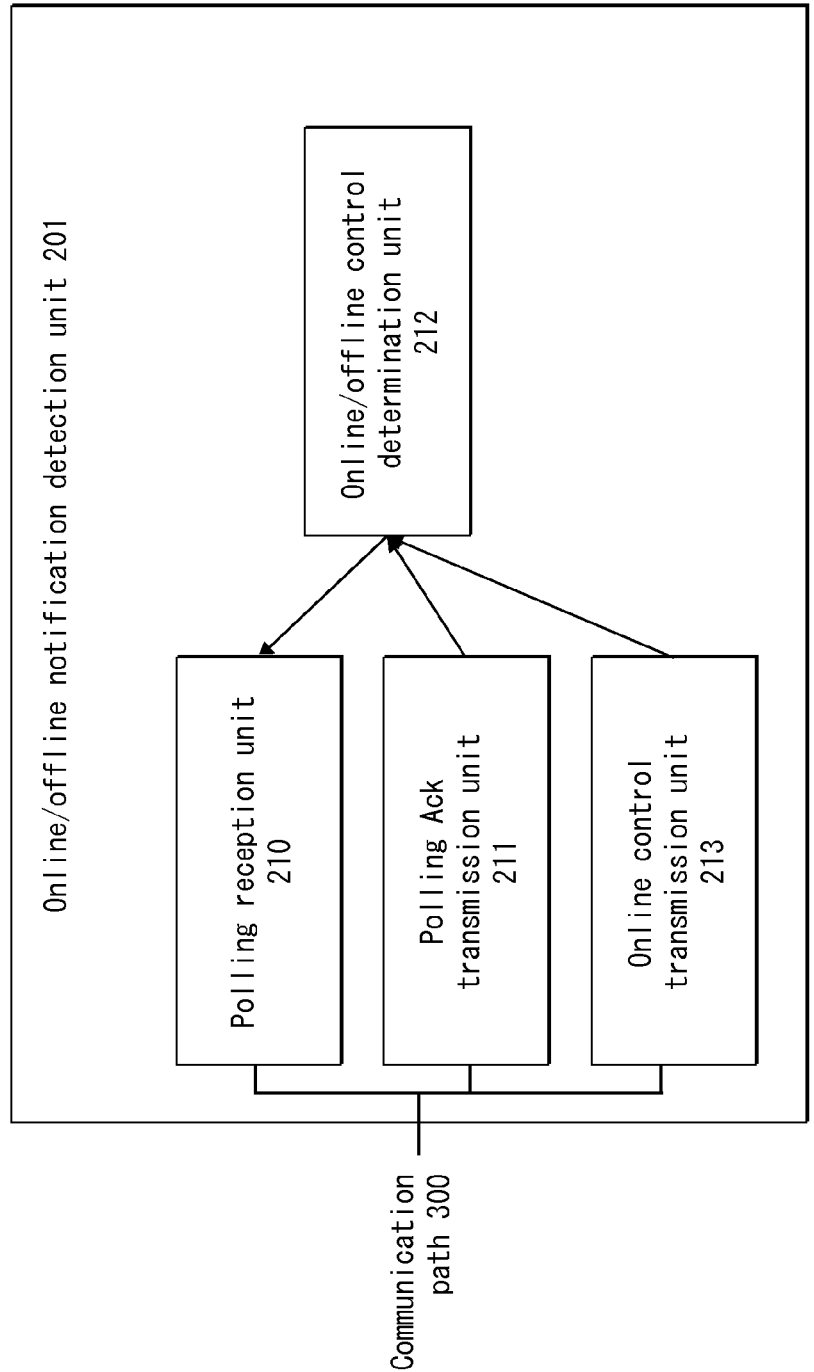
FIG. 10 illustrates a configuration of an online/offline detection unit 201.

FIG. 10 illustrates a configuration of the online/offline notification detection unit 201. The online/offline notification detection unit 201 includes: a polling reception unit 210; a polling Ack transmission unit 211; an online control transmission unit 213, and an online/offline control determination unit 212.

When the content-using device 200 is online, the polling reception unit 210 receives a polling command from the content management server 100.

Within a predetermined interval from the reception of the polling command, the polling Ack transmission unit 211 generates a polling Ack indicating that the content-using device 200 is online. The polling Ack transmission unit 211 transmits the polling Ack to the content management server 100. Here, the predetermined interval is, for instance, one-hundred milliseconds. Alternatively, the predetermined interval may be two-hundred milliseconds, three-hundred milliseconds, etc.

The online/offline control determination unit 212 determines whether the content-using device 200 is online or offline. That is, the online/offline control detection determination unit 212 detects a transition of the content-using device 200 from online to offline. Similarly, the online/offline control detection determination unit 212 also detects a transition of the content-using device from offline to online.

For instance, the online/offline control determination unit 212 may perform the determination as described above based on whether or not a polling command is received from the content management server 100. In specific, the online/offline control determination unit 212 determines that the content-using device 200 is online when a polling command is received from the content management server 100, while the online/offline control determination unit 212 determines that the content-using device 200 is offline when a polling command is not received from the content management server 100.

Alternatively, the online/offline control determination unit 212 may determine that the content-using device 200 is online when a communication module in the content-using device 200 is activated. In such a case, the online/offline control determination unit 212 determines that the content-using device 200 is offline when the communication module is deactivated.

Further, when wireless communication is performed with the content management server 100, the online/offline control determination unit 212 may perform the determination as described in the following. The online/offline control determination unit 212 determines that the content-using device 200 is online when the content-using device 200 is located within a distance from an access point within which radio signals transmitted from the content-using device 200 reach the access point. Further, the online/offline control determination unit 212 determines that the content-using device 200 is offline when the content-using device 200 is not located within a distance from an access point within which radio signals transmitted from the content-using device 200 reach the access point. That is, the online/offline control determination unit 212 determines that the content-using device 200 is offline when radio signals transmitted from the content-using device 200 do not reach an access point.

The online/offline control determination unit 212, at a time point when a transition from offline to online is detected, notifies the online control transmission unit 213 of a result of the detection. When receiving the detection result from the online/offline control determination unit 212, the online control transmission unit 213 transmits the detection result, which indicates that the content-using device 200 has transitioned from offline to online, to the content management server 100.

2.3.2 Content Control Unit 202

Figure 11:
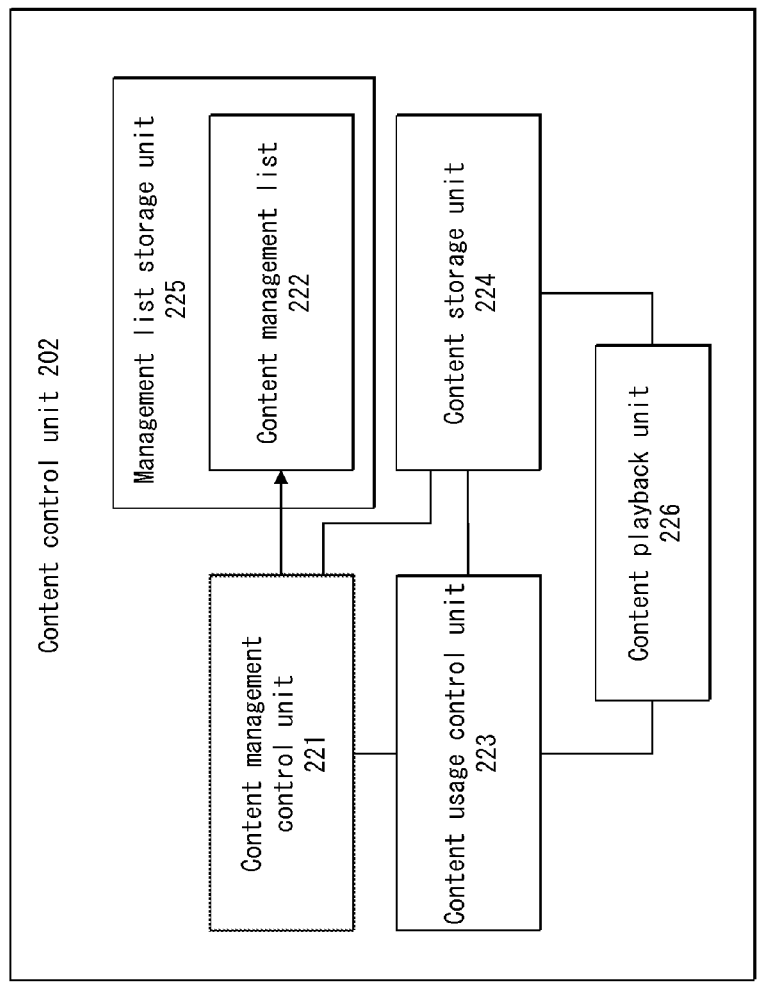
FIG. 11 illustrates a configuration of a content control unit 202.

FIG. 11 illustrates a configuration of the content control unit 202. The content control unit 202 includes: a content management control unit 221; a management list storage unit 225; a content usage control unit 223; a content storage unit 224; and a content playback unit 226.

The management list storage unit 225 holds a content management list 222.

The content storage unit 224 stores a content. The content has been provided from the content management server 100.

The content management control unit 221 manages the content stored in the content-using device 200 by using the content management list 222, detailed description of which is provided in the following.

The content usage control unit 223, by being controlled by the content management control unit 221, determines whether or not the content-using device 200 has a right to use the content. When the content-using device 200 has the right to use the content, and further, is permitted to use the content, the content usage control unit 223 causes the content playback unit 226 to play back the corresponding content stored in the content storage unit 224. Further, when the content-using device 200 is offline, the content usage control unit 223 reads out, from the content management list 222, a content management information piece including a content ID identifying the content. Subsequently, the content usage control unit 223 extracts a scheduled expiration time from the content management information piece read out, and determines whether or not a period of validity as indicated by the scheduled expiration time, has expired. When the period of validity indicated by the scheduled expiration time has already expired, the content usage control unit 223 stops the use of the content. When the period of validity indicated by the scheduled expiration time has not expired, the content usage control unit 223 permits the use of the content.

The content playback unit 226, by being controlled by the content usage control unit 223, reads out the content stored in the content storage unit 224 and plays back the content read out.

FIG. 12 is a chart indicating one example of a data configuration of the content management list 222.

The content management list 222 is provided with areas for storing multiple content management information pieces. Each content management information piece includes either: (i) a combination of one content ID, one relative validity duration, one content management server name, and one scheduled expiration time; or (ii) a combination of one content ID, one relative validity duration, and one content management server name. As such, a content management information piece may include or may not include a scheduled expiration time.

A content ID is identification information identifying a content. A relative validity duration associated with a corresponding content ID indicates a relative period during which use, by the content-using device 200 in offline state, of the content identified by the corresponding content ID is permitted. A content management server name associated with a corresponding content ID identifies a content management server from which the content identified by the corresponding content ID has been transmitted. A scheduled expiration time associated with a corresponding content ID indicates a time point at which validity of use, by the content-using device 200 in offline state, of the content identified by the corresponding content ID expires. A scheduled expiration time is calculated when the content-using device 200 transitions from online to offline by adding a corresponding relative validity duration to the time point at which the content-using device 200 has transitioned from online to offline.

Scheduled Expiration Time=Time Point at which
Content-using Device Transitioned from Online
to Offline+Relative Validity Period When the period of validity indicated by the scheduled expiration time has already passed at the point when the content-using device 200 transitions from online to offline, the use, by the content-using device 200 in offline state, of the content identified by the corresponding content ID is prohibited.

For instance, the content management list 222 in FIG. 12 includes a content management information piece 266, a content management information piece 267, and a content management information piece 268.

The content management information piece 266 includes: "Cont1" in a content ID field 251; "24H" in a relative validity duration field 252; "S1" in a content management server name field 253; and "1/20, 23:30" in an scheduled expiration time field 254. The content management information piece 266 indicates that the content identified by "Cont1" in the content ID field 251 has been supplied from the content management server identified by "S1" in the content management server name field 253. The content-using device 200 is currently offline. "1/20, 23:30", as indicated in the scheduled expiration time field 254, is set as the time point at which the validity of the content identified by "Cont1" in the content ID field 251 expires. Here, the indication of "1/20, 23:30" in the scheduled expiration time field 254 indicates that the period of validity of the content "Cont1" expires at 23:30, January 20$^{th}$. "1/20, 23:30" in the scheduled expiration time field 254 is calculated by adding "24H" in the corresponding relative validity duration field 252 to the time point at which the content-using device 200 has transitioned from online to offline.

The content management information piece 267 includes: "Cont2" in a content ID field 255; "48H" in a relative validity duration field 256; "S1" in a content management server name field 257; and "1/21, 23:30" in a scheduled expiration time field 258. The content management information piece 267 indicates that the content identified by "Cont2" in the content ID field 255 has been supplied from the content management server identified by "S1" in the content management server name field 257, similar as the content "Cont1". Here, the indication of "1/21, 23:30" in the scheduled expiration time field 258 indicates that the period of validity of the content "Cont2" expires at 23:30, January 21$^{st}$. "1/21, 23:30" in the scheduled expiration time field 258 is calculated by adding "48H" in the corresponding relative validity duration field 256 to the time point at which the content-using device 200 has transitioned from online to offline.

The content management information piece 268 includes: "Cont3" in a content ID field 259; "24H" in a relative validity duration field 260; "S2" in a content management server name field 261; and "1/20, 23:30" in a scheduled expiration time field 262. The content management information piece 268 indicates that the content identified by "Cont3" in the content ID field 259 has been supplied from the content management server identified by "S2" in the content management server name field 261.

FIG. 13 is a chart indicating one example of a data configuration of a content management list 222a, which is another example of the content management list 222. For instance, the content management list 222a in FIG. 13 includes a content management information piece 266a, a content management information piece 267a, and a content management information piece 268a. The content management list 222a differs from the content management list 222 illustrated in FIG. 12 in that the content management information pieces 266a, 267a, and 268a included therein indicate that the content-using device 200 is currently online.

Each of the content management information pieces 266a, 267a, and 268a does not include a scheduled expiration time. That is, as indicated by the content management information pieces 266a, 267a, and 268a, a scheduled expiration time is not set with respect to each of contents identified by "Cont1" in the content ID field 251, "Cont2" in the content ID field 255, and "Cont3" in the content ID field 259. As such, a specific period of validity is not set with respect to each of such contents, and therefore, the content-using device 200, which is currently online, is permitted to use such contents for an unlimited period of time.

2.3.3 Time Measurement Unit 203

The time measurement unit 203 measures and outputs the current time.

2.4 Operations of Content Distribution System 10 (Part 1)

In the following, description is provided on operations of the content distribution system 10.

Figure 14:
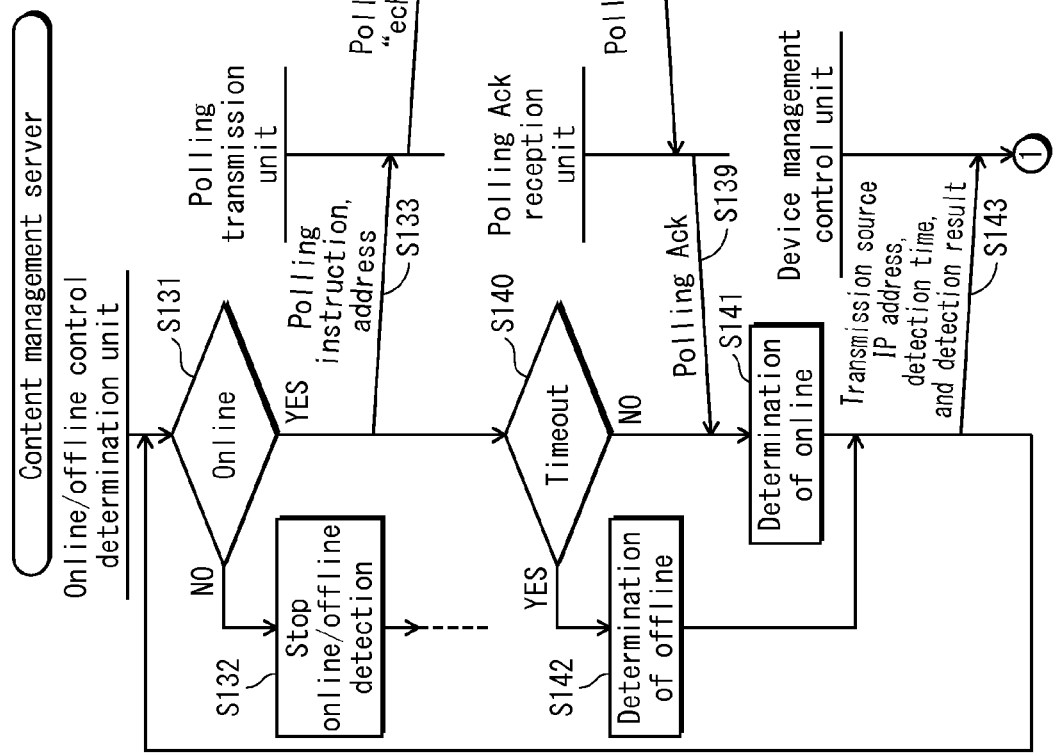
FIG. 14 is the first part of a sequence diagram illustrating operations of the content distribution system 10, a following part of which illustrated in FIG. 15.
Figure 15:
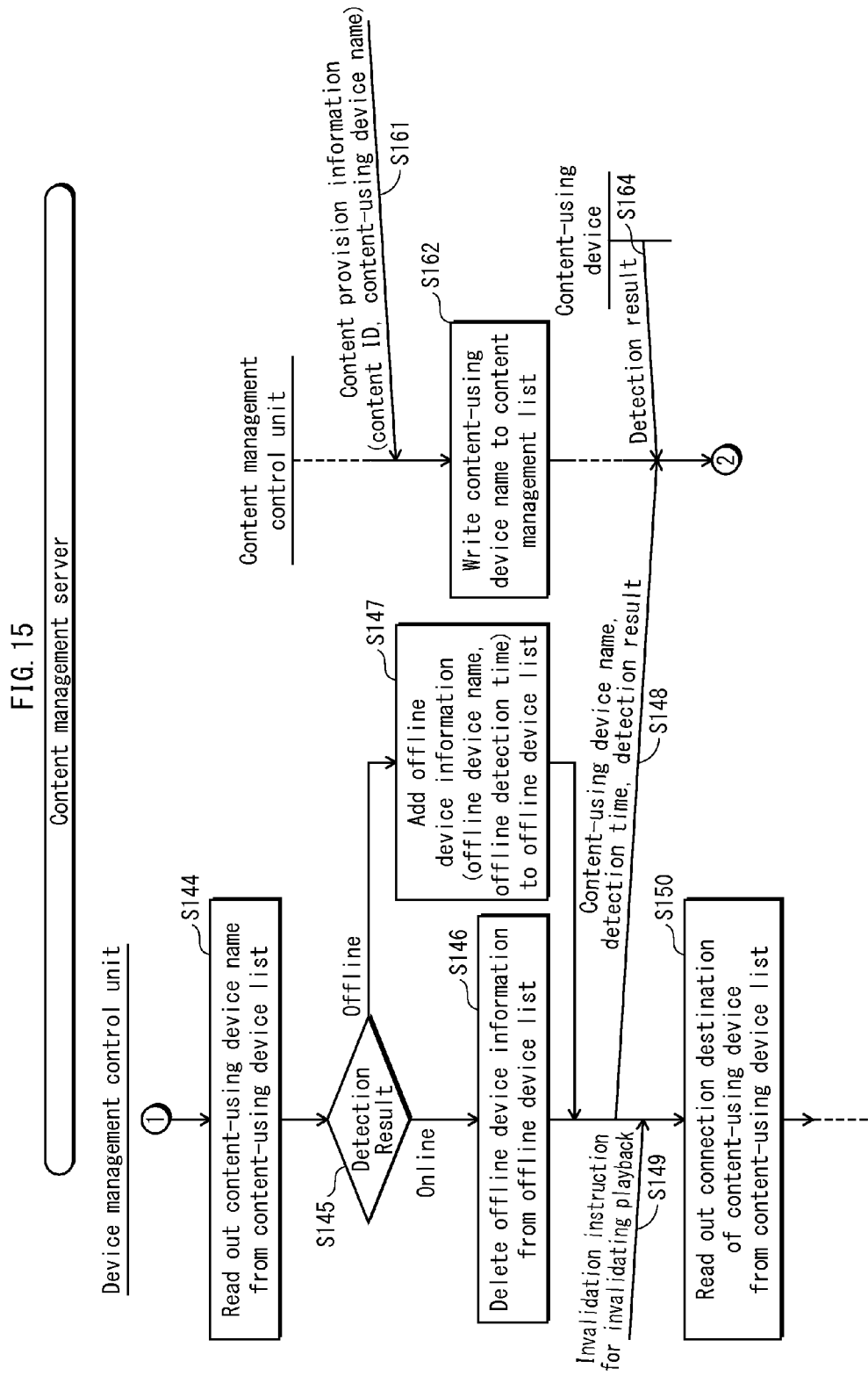
FIG. 15 is the second part of the sequence diagram illustrating the operations of the content distribution system 10, a following part of which illustrated in FIG. 16.
Figure 16:
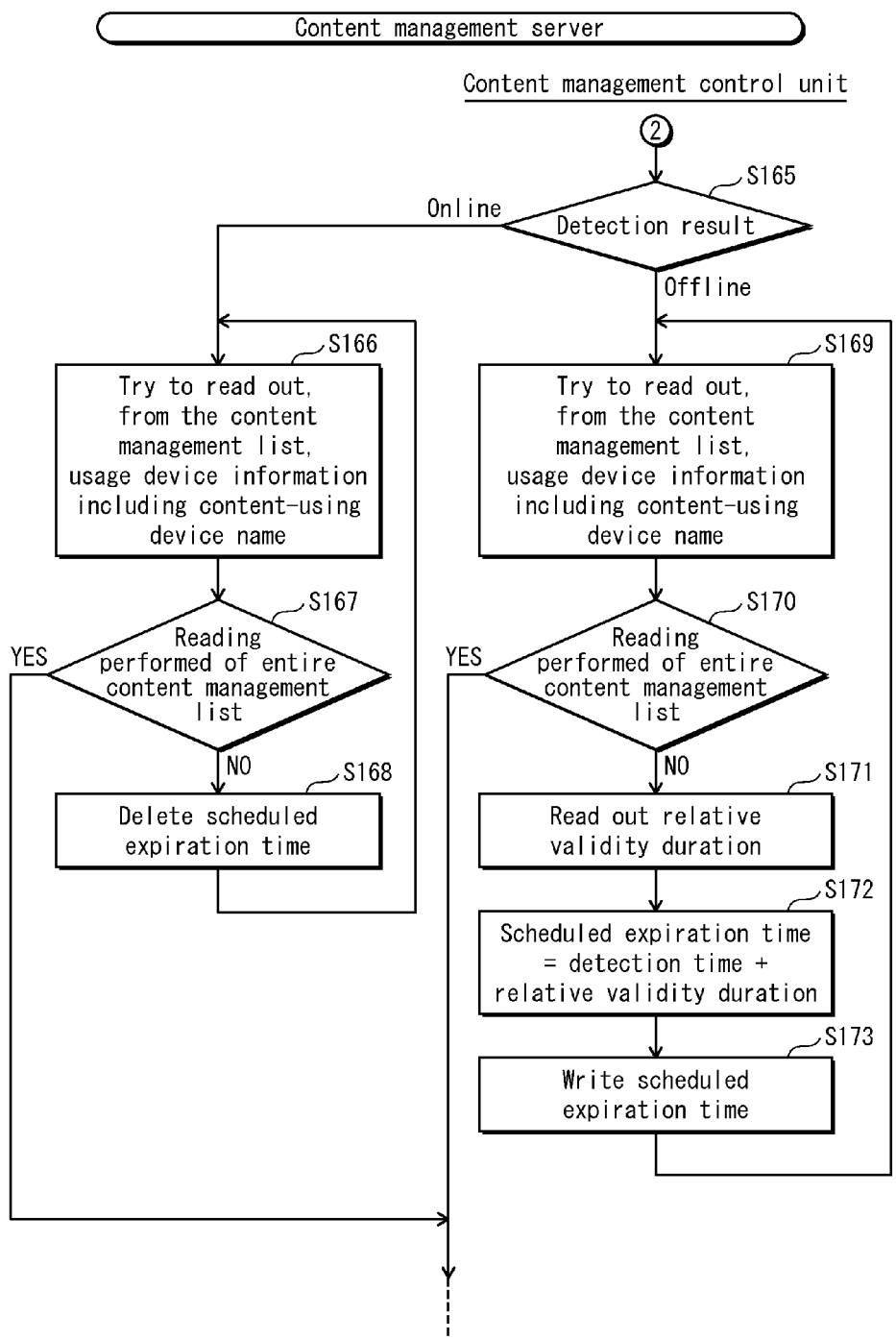
FIG. 16 is the third part of the sequence diagram illustrating the operations of the content distribution system 10.

(1) Here, description is provided on operations of the content distribution system 10 when the content management server 100 detects whether the content-using device 200 is online or offline, with reference to sequence diagrams illustrated in FIGS. 14 through 16.

Once the online/offline control determination unit 112 determines that the content-using device 200 is offline ("NO" in Step S131), content management server 100 stops performing the detection of whether the content-using device is online or offline (Step S132).

When determining that the content-using device 200 is online ("YES" in Step S131), the online/offline control determination unit 112 outputs, to the polling transmission unit 110, an address and an instruction instructing the polling transmission unit 110 to perform polling (Step S133). When receiving the address and the polling instruction, the polling transmission unit 110 transmits a polling command to the content-using device 200 (Step S134).

The polling reception unit 210 receives the polling command (Step S134). The polling reception unit 210 outputs the polling command received to the online/offline control determination unit 212 (Step S135). The polling reception unit 210 also outputs the polling command to the polling Ack transmission unit 211 (Step S136). The polling Ack transmission unit 211 generates a polling Ack (Step S137), and transmits the polling Ack to the content management server 100 (Step S138).

The polling Ack reception unit 111 receives the polling Ack (Step S138). When receiving the polling Ack, the polling Ack reception unit 111 outputs the polling Ack to the online/offline control determination unit 112 (Step S139).

The online/offline control determination unit 112, when receiving the polling Ack within a predetermined interval after outputting the polling instruction ("NO" in Step S140), determines that the content-using device 200 is online (Step S141). That is, the online/offline control determination unit 112 determines that the content-using device 200 is online when no timeout occurs. Here, the predetermined interval is, for instance, one second. Alternatively, the predetermined interval may be five-hundred milliseconds, six-hundred milliseconds, seven-hundred milliseconds, etc.

In contrast, the online/offline control determination unit 112, when receiving the polling Ack after the predetermined interval has elapsed from the output of the polling instruction or when not receiving a polling Ack ("YES" in Step S140), determines that the content-using device 200 is offline (Step S142). That is, the online/offline control determination unit 112 determines that the content-using device 200 is offline when timeout occurs.

Subsequently, the online/offline control determination unit 112 outputs, to the device management control unit 120, a transmission source IP address, a detection time, and a detection result (Step S143).

The device management control unit 120 receives, from the online/offline control determination unit 112, the transmission source IP address, the detection time, and the detection result (Step S143).

Subsequently, the device management control unit 120 reads out, from the content-using device list 121, a content-using device name corresponding to the transmission source IP address received (Step S144).

The device management control unit 120 determines whether the detection result indicates online or offline (Step S145).

When the detection result indicates online ("Online" in Step S145), the device management control unit 120 deletes, from the offline device list 122, an offline device information piece including the same offline device name as the content-using device name read out from the content-using device list 121 (Step S146).

When the detection result indicates offline ("Offline" in Step S145), the device management control unit 120 generates an offline device information piece. The offline device information generated includes the content-using device name read out as an offline device name and includes the detection time received as an offline detection time. Subsequently, the device management control unit 120 adds the offline device information piece generated to the offline device list 122 (Step S147).

Subsequently, the device management control unit 120 outputs, to the content management control unit 130, the content-using device name read out, the detection time received, and the detection result received (Step S148).

In addition to the above, the device management control unit 120, when receiving an invalidation instruction for invalidating playback of a content (Step S149), reads out, from the content-using device list 121, an IP address of a connection-destination content-using device (Step S150).

When the device management control unit 120 outputs the content-using device name, the detection time, and the detection result, the content management control unit 130 receives the content-using device name, the detection time, and the detection result from the device management control unit 120 (Step S148).

In addition to receiving such information from the device management control unit 120, the content management control unit 130 receives content provision information from the content-using device 200 (Step S161). The content provision information includes a content ID and a content-using device name.

When receiving the content provision information, the content management control unit 130 generates a usage device information piece including the content-using device name included in the content provision information. Subsequently, the content management control unit 130 reads out, from the content management list 131, a management information piece indicated by the content ID included in the content provision information. Subsequently, the content management control unit 130 writes and adds, to the management information read out, the usage device information piece generated (Step S162).

As already described above, the content management control unit 130 receives, from the device management control unit 120, the content-using device name, the detection time, and the detection result (Step S148). In addition, the content management control unit 130 receives, from the content-using device 200, a result of a self-detection performed by the content-using device 200 of whether the content-using device 200 is online or offline (Step S164).

The content management control unit 130 determines whether the detection result received indicates online or offline (Step S165).

When determining that the detection result received indicates online ("Online" in Step S165), the content management control unit 130 tries to read out, from the content management list 131, a usage device information piece including a content-using device name corresponding to the content-using device 200 (Step S166).

When the reading out of the usage device information piece is completed without reading being performed of the entire content management list 131 ("NO" in Step S167), the content management control unit 130 deletes an scheduled expiration time included in the usage device information piece (Step S168). Following this, the content management control unit 130 returns to Step S166.

When the reading out of the usage device information piece is not completed even when reading has been performed of the entire content management list 131 ("YES" in Step S167), the content management control unit 130 proceeds to the subsequent step.

On the other hand, when determining that the detection result received indicates offline ("Offline" in Step S165), the content management control unit 130 tries to read out, from the content management list 131, a usage device information piece including a content-using device name corresponding to the content-using device 200 (Step S169).

When the reading out of the usage device information piece is completed without reading being performed of the entire content management list 131 ("NO" in Step S170), the content management control unit 130 reads out, from the content management list 131, a relative validity duration corresponding to a content ID. Then, the content management control unit 130 performs the calculation of: scheduled expiration time=detection time+relative validity duration (Step S172). Subsequently, the content management control unit 130 writes, to the content management list 131, the scheduled expiration time so calculated in association with the content-using device name corresponding to the content-using device 200 (Step S173). Following this, the content management control unit 130 returns to Step S169.

When the reading out of the usage device information piece is not completed even when reading has been performed of the entire content management list 131 ("YES" in Step S170), the content management control unit 130 proceeds to the subsequent step.

Figure 17:
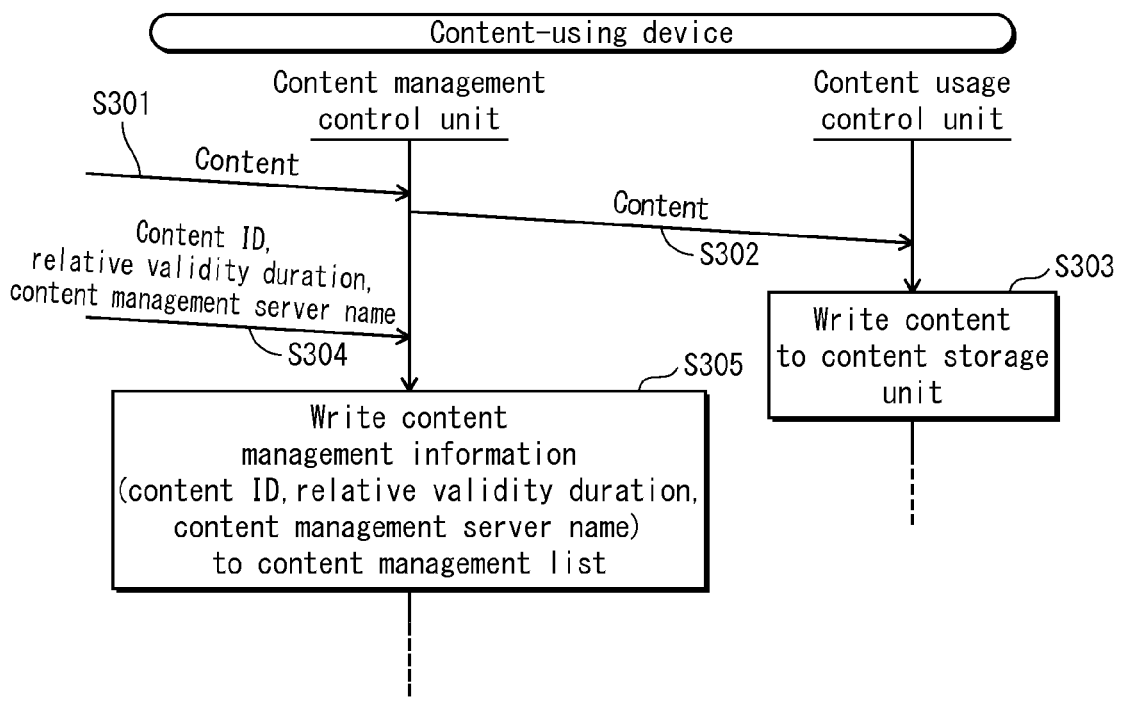
FIG. 17 is the first part of a sequence diagram illustrating operations of the content-using device 200.

(2) Here, description is provided on operations of the content distribution system 10 when the content-using device 200 receives a content from the content management server 100, with reference to the sequence diagram illustrated in FIG. 17.

The content management control unit 221 receives a content from the content management server 100 (Step S301). Subsequently, the content management control unit 221 outputs the content received to the content usage control unit 223 (Step S302).

The content usage control unit 223 receives the content (Step S302), and writes the content received to the content storage unit 224 (Step S303).

The content management control unit 221 receives, from the content management server 100, a content ID, a relative validity duration, and a content management server name (Step S304). Subsequently, the content management control unit 221 writes a content management information piece to the content management list 222 (Step S305). Here, the content management information piece includes the content ID, the relative validity duration, and the content management server name received.

Figure 18:
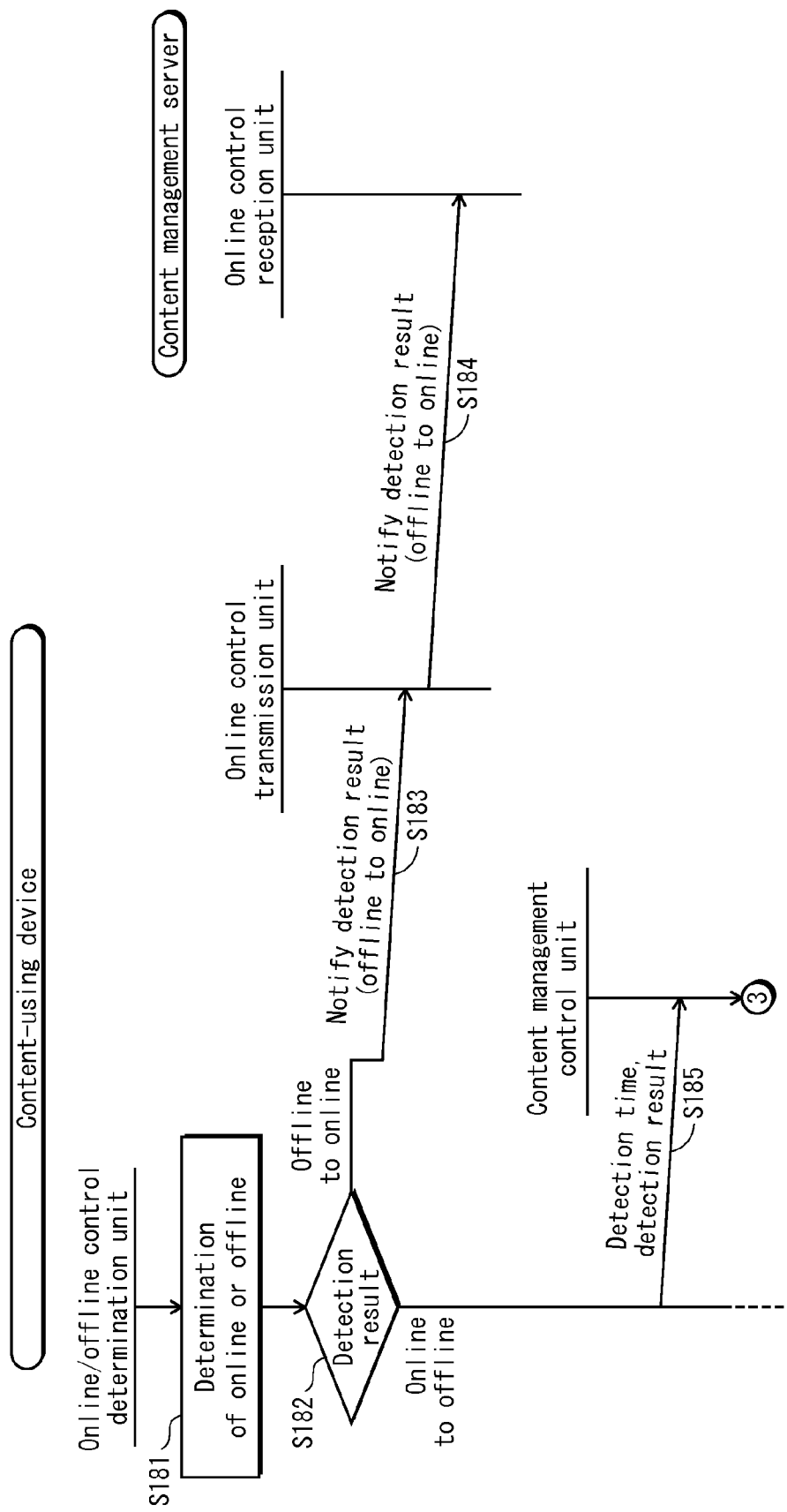
FIG. 18 is the fourth part of the sequence diagram illustrating the operations of the content distribution system 10, a following part of which illustrated in FIG. 19.
Figure 19:
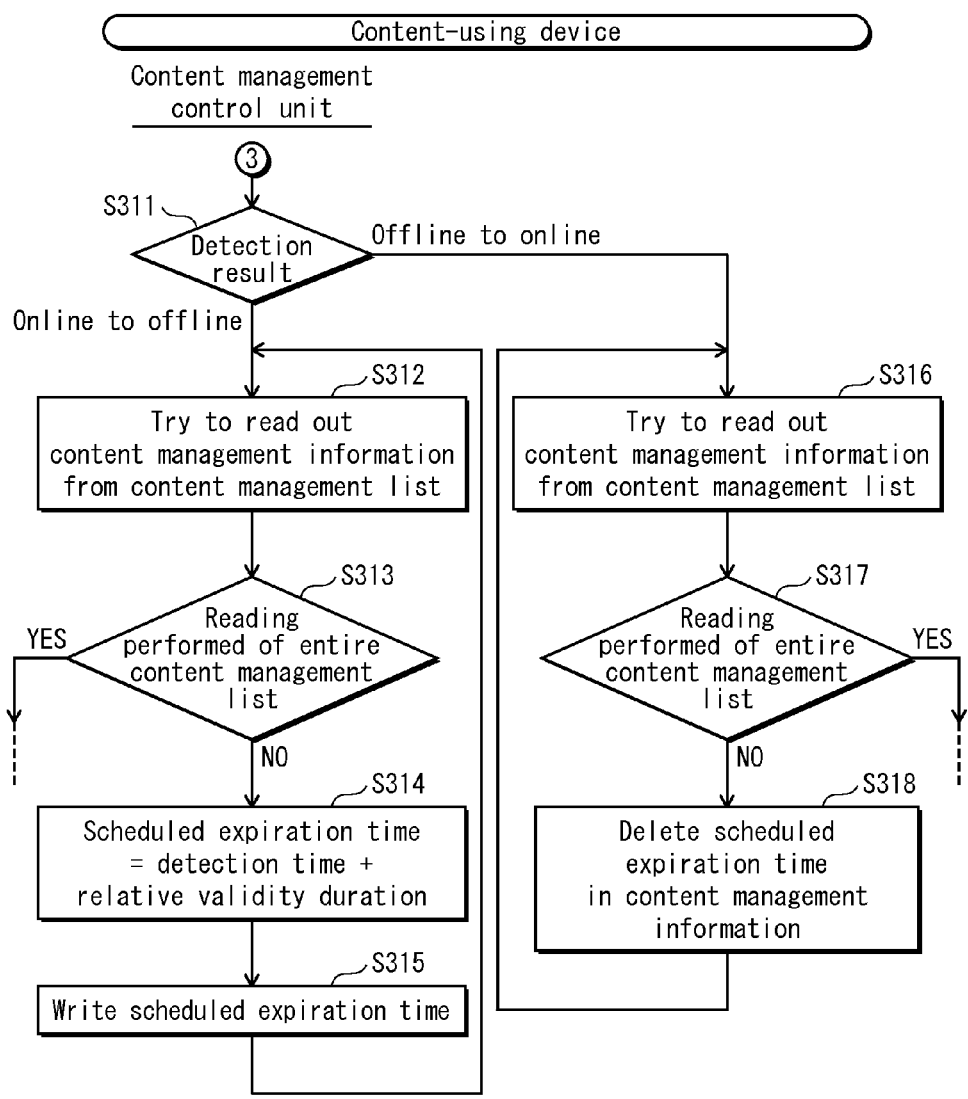
FIG. 19 is the fifth part of the sequence diagram illustrating the operations of the content distribution system 10.

(3) Here, description is provided on operations of the content-using device 200 in a case where the content-using device 200 performs self-detection of whether the content-using device 200 is online or offline, with reference to the sequence diagrams illustrated in FIGS. 18 and 19.

The online/offline control determination unit 212 of the content-using device 200 determines whether the content-using device 200 is online or offline (Step S181).

When a result of the detection indicates a transition from offline to online ("Offline to Online" in Step S182), the online/offline control determination unit 212 outputs the detection result to the online control transmission unit 213 (Step S183). The online control transmission unit 213 transmits the detection result to the content management server 100 (Step S184).

On the other hand, when the detection result indicates a transition from online to offline ("Online to Offline" in Step S182), the online/offline control determination unit 212 outputs the detection result and a detection time at which the detection has been made to the content management control unit 221 (Step S185).

The content management control unit 221 receives the detection time and the detection result (Step S185). Subsequently, the content management control unit 221 determines whether the detection result received indicates a transition from online to offline or a transition from offline to online (Step S311).

When the detection result indicates a transition from online to offline ("Online to Offline" in Step S311), the content management control unit 221 tries to read out, from the content management list 222, a content management information piece (Step S312).

When the reading out of the content management information piece is completed without reading being performed of the entire content management list 222 ("NO" in Step S313), the content management control unit 221 performs the calculation of: scheduled expiration time=detection time+relative validity duration (Step S314). Subsequently, the content management control unit 221 writes, to the content management list 222, the scheduled expiration time calculated (Step S315). Following this, processing proceeds to Step S312.

When the reading out of the content management information piece is not completed even when reading has been performed of the entire content management list 222 ("YES" in Step S313), the content management control unit 221 proceeds to the subsequent step.

When the detection result indicates a transition from offline to online ("Offline to Online" in Step S311), the content management control unit 221 tries to read out, from the content management list 222, a content management information piece (Step S316).

When the reading out of the content management information piece is completed without reading being performed of the entire content management list 222 ("NO" in Step S317), the content management control unit 221 deletes a scheduled expiration time in the content management information piece (Step S318). Following this, processing proceeds to Step S316.

When the reading out of the content management information piece is not completed even when reading has been performed of the entire content management list 222 ("YES" in Step S317), the content management control unit 221 proceeds to the subsequent step.

Figure 20:
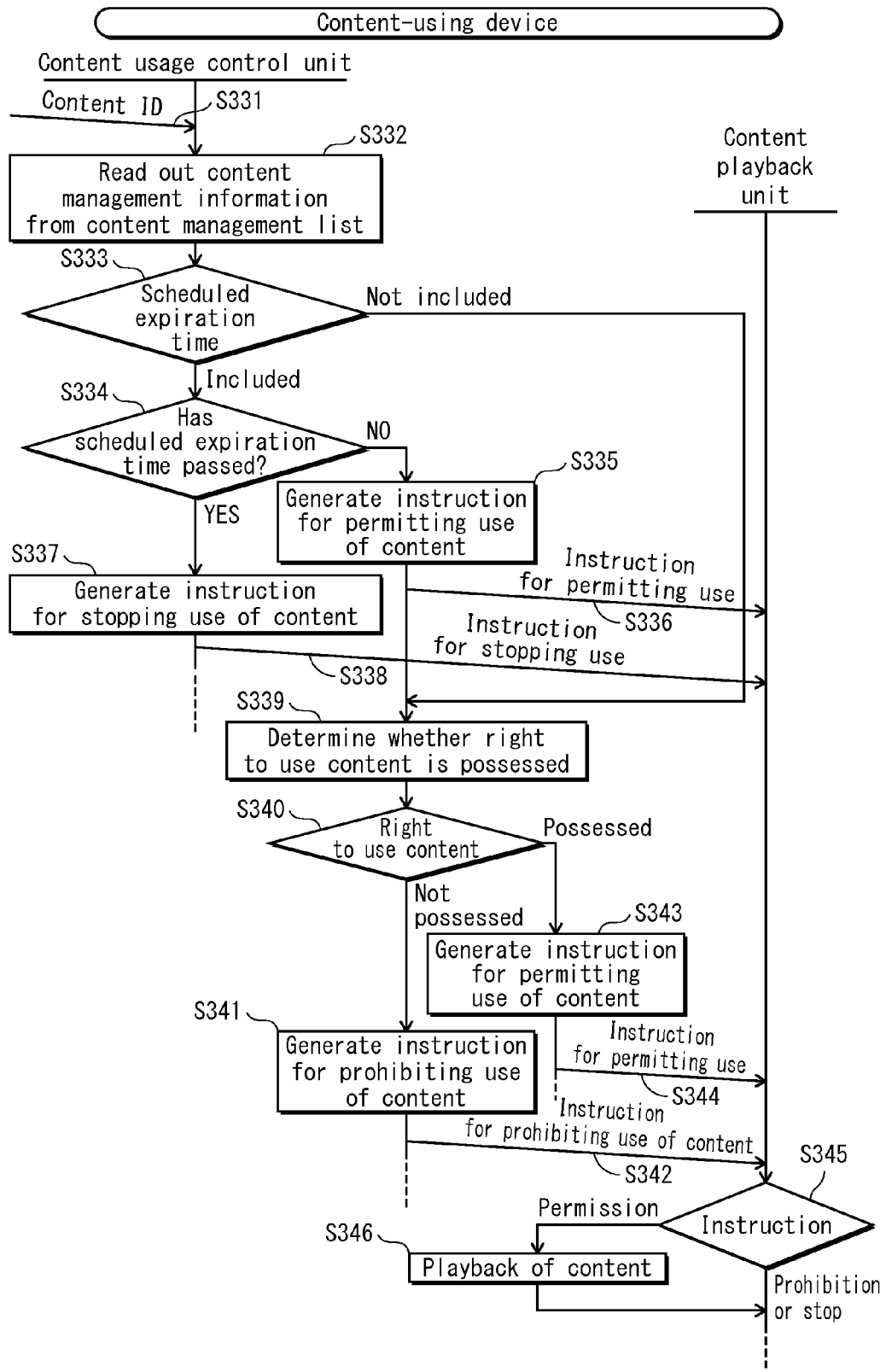
FIG. 20 is the second part of the sequence diagram illustrating the operations of the content-using device 200.

(4) Here, description is provided on operations of the content-using device 200 when the content-using device 200 uses a content, with reference to the sequence diagram illustrated in FIG. 20.

The content usage control unit 223 receives a content ID corresponding to the content received from the content management server 100 (Step S331). Subsequently, the content usage control unit 223 reads out, from the content management list 222, a content management information piece including the content ID received (Step S332).

Subsequently, the content usage control unit 223 determines whether or not the content management information piece read out includes a scheduled expiration time (Step S333).

When the content management information piece read out includes a scheduled expiration time ("Included" in Step S333), the content usage control unit 223 determines whether the scheduled expiration time has already passed (Step S334). When the scheduled expiration time has already passed ("YES" in Step S334), the content usage control unit 223 generates an instruction for stopping the use of the content (Step S337). Subsequently, the content usage control unit 223 outputs the instruction for stopping the use of the content to the content playback unit 226 (Step S338).

When the scheduled expiration time has not passed yet ("NO" in Step S334), the content usage control unit 223 generates an instruction for permitting the use of the content (Step S335). Subsequently, the content usage control unit 223 outputs the instruction for permitting the use of the content to the content playback unit 226 (Step S336).

The content usage control unit 223 also determines whether the content-using device 200 has the right to use the content (Step S339). When determining that the content-using device 200 does not have the right to use the content ("Not possessed" in Step S340), the content usage control unit 223 generates an instruction for prohibiting the use of the content (Step S341). Further, the content usage control unit 223 outputs the instruction for prohibiting the use of the content to the content playback unit 226 (Step S342). When determining that the content-using device 200 has the right to use the given content ("Possessed" in Step S340), the content usage control unit 223 generates an instruction for permitting the use of the content (Step S343). Subsequently, the content usage control unit 223 outputs the instruction for permitting the use of the content to the content playback unit 226 (Step S344).

The content playback unit 226 determines whether the instruction received from the content usage control unit 223 is an instruction for permitting the use of the content, an instruction for prohibiting the use of the content, or an instruction for stopping the use of the content (Step S345). When an instruction for permitting the use of the content has been received ("Permission" in Step S345), the content playback unit 226 plays back the content (Step S346). When an instruction for prohibiting or stopping the use of the content has been received ("Prohibition or stop" in Step S345), the content playback unit 226 does not play back the content.

2.5 One Example of Configuration of Content Distribution System 10

Figure 21:
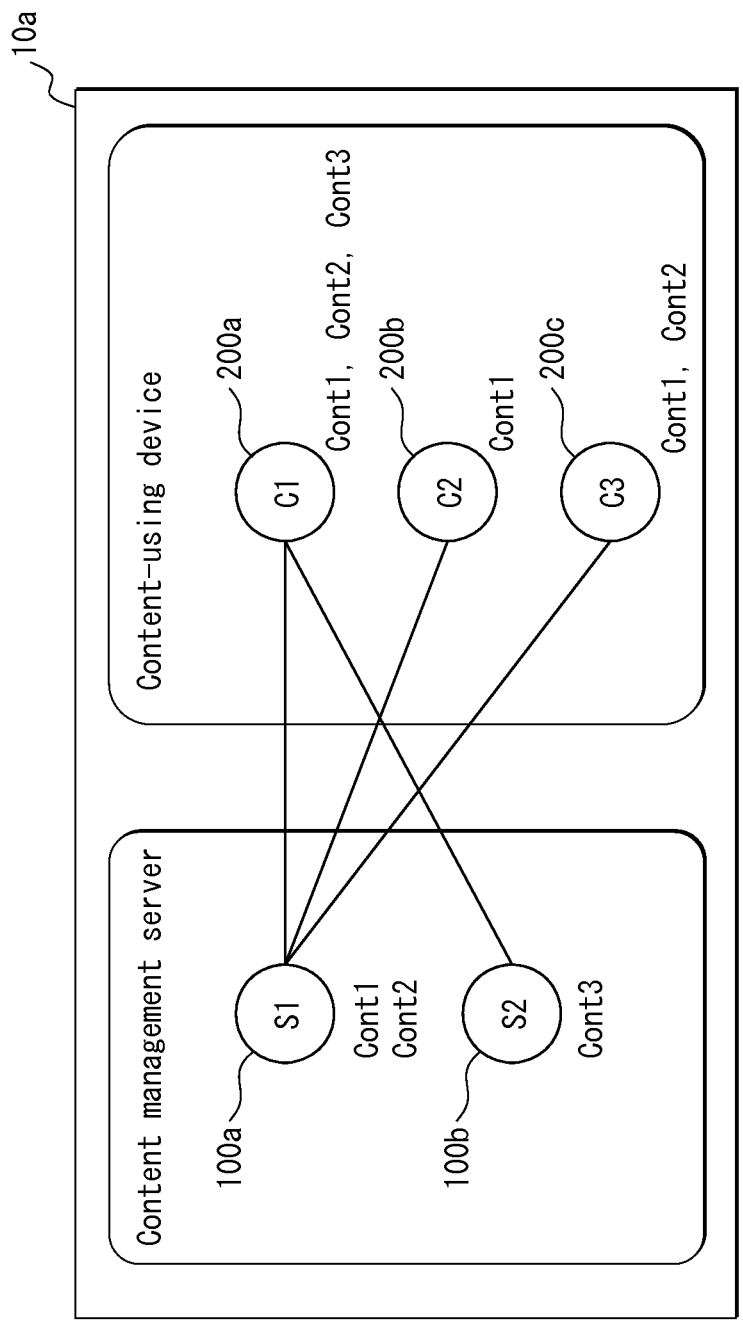

FIG. 21 is a diagram illustrating a configuration of a content distribution system 10a, which is one example of the content distribution system 10 for providing an explanation of operations of the content distribution system 10.

In this example, the content distribution system 10a includes two content management servers and three content-using devices. More specifically, the content distribution system 10a includes: a content management server 100a (also referred to as a "content management server S1"); a content management server 100b (also referred to as a "content management server S2"); a content-using device 200a (also referred to as a "content-using device C1"); a content-using device 200b (also referred to as a "content-using device C2"); and a content-using device 200c (also referred to as a "content-using device C3").

FIG. 21 illustrates how contents are shared between the content management servers and the content-using devices. Further, FIG. 21 also illustrates connections between the content management servers and the content-using devices.

The content management server 100a provides a content identified by a content name "Cont1" and a content identified by a content name "Cont2". The content management server 100b provides a content identified by a content name "Cont3".

The content-using device 200a is provided, by the content management server 100a, with the contents "Cont1" and "Cont2". The content-using device 200a is also provided, by the content management server 100b, with the content "Cont3".

The content-using device 200b is provided, by the content management server 100a, with the content "Cont1".

The content-using device 200c is provided, by the content management server 100a, with the contents "Cont1" and "Cont2".

As such, the contents "Cont1" and "Cont2" are shared between the content management server 100a and the content-using device 200a. That is, the contents "Cont1" and "Cont2" possessed by the content management server 100a are provided for use to the content-using device 200a. Similarly, the content "Cont1" is shared between the content management server 100a and the content-using device 200b. That is, the content "Cont1" possessed by the content management server 100a is provided for use to the content-using device 200b. Further, the contents "Cont1" and "Cont2" are shared between the content management server 100a and the content-using device 200c. That is, the contents "Cont1" and "Cont2" possessed by the content management server 100a are provided for use to the content-using device 200c.

In addition to the above, the content "Cont3" is shared between the content management server 100b and the content-using device 200a. That is, the content "Cont3" possessed by the content management server 100b is provided for use to the content-using device 200a.

Here, the content possessed by the content management server 100b is not used by the content-using device 200b. That is, as illustrated in FIG. 21, the content management server 100b and the content-using device 200b are not connected with each other.

2.6 Operations of Content Distribution System 10 (Part 2)

In the following, description is provided on operations of the content distribution system 10, with reference to the sequence diagram illustrated in FIG. 22.

Note that the following description focuses on the interaction between the content management server 100a and the content-using device 200a, based on the configuration illustrated in FIG. 21.

Figure 22:
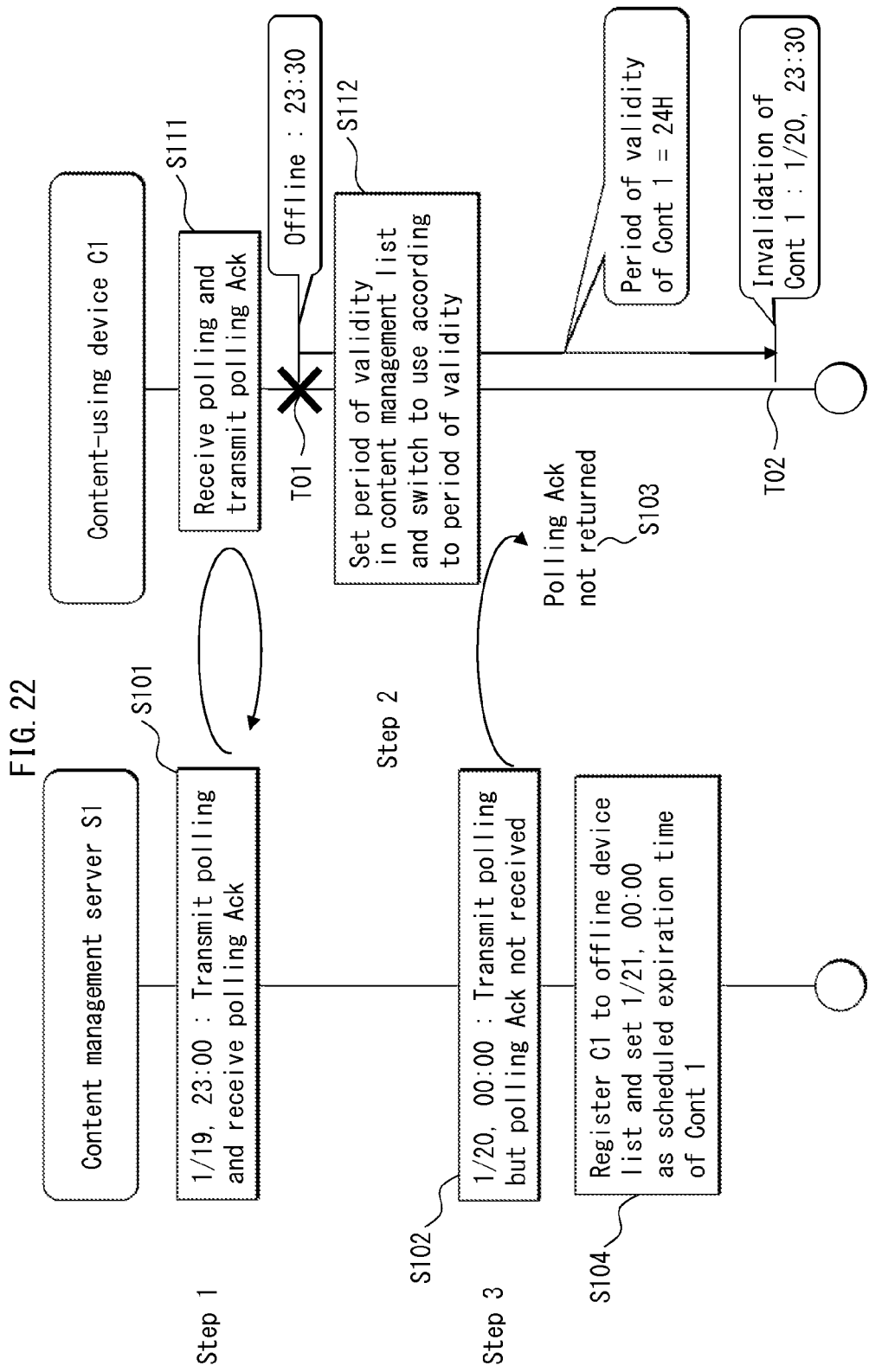
FIG. 22 is a sequence diagram illustrating interaction between a content management server 100a and a content-using device 200a in a case where the content-using device 200a transitions from online to offline during the interaction.

FIG. 22 is a diagram illustrating the interaction between the content management server 100a and the content-using device 200a in a case where the content-using device 200a transitions from online to offline during the interaction. Note that the content management server 100a transmits a polling command to each of the content-using devices connected therewith at hourly intervals. By performing polling in such a manner, the content management server 100a checks whether or not each of the content-using devices is online.

Step 1) At 23:00, January $19^{th}$, the content management server 100a transmits a polling command to the content-using device 200a (Step S101). The content-using device 200a, which is online at this point, receives the polling command from the content management server 100a. Within a predetermined interval from the reception of the polling command, the content-using device 200a transmits a polling Ack to the content management server 100a (Step S111). The content management server 100a receives the polling Ack and thereby confirms that the content-using device 200a is online (Step S101).

At this point, the content-using device list 121 in the content management server 100a includes, for each of content-using devices 200a, 200b, and 200c connected with the content management server 100a, a content-using device name and an IP address in an associated state, as illustrated in FIG. 5. On the other hand, no information is registered to the offline device list 122 at this point.

Further, as indicated by the content management list 131a illustrated in FIG. 9, the content "Cont1" is being used by the content-using devices 200a and 200b at this point. Similarly, as indicated by the content management list 131a illustrated in FIG. 9, the content "Cont2" is being used by the content-using devices 200a and 200c at this point. Further, since each of the content-using devices 200a, 200b, and 200c is online at this point, the content management list 131a includes an indication of "---" in the corresponding scheduled expiration time field. The indication of "---" in a scheduled expiration time field indicates that a scheduled expiration time is not set. In addition, the content management list 222a as illustrated in FIG. 13 indicates the content management list held by the content-using device 200a at this point. Since the content-using device 200a is online at this point, each of the content management information pieces included in the content management list 222a does not include a scheduled expiration time. More specifically, the content management list 222a indicates that the content-using device 200a is using the contents "Cont1" and "Cont2" possessed by the content management server 100a and the content "Cont3" possessed by the content management server 100b. Further, the content-using device 100a is permitted to use each of such contents for an unlimited period of time.

Step 2) At 23:30, January 19th (time point T01), the content-using device 200a transitions from online to offline. This is due to, for instance, the content-using device 200a having moved to a location where radio signals cannot reach or the content-using device 200a having deactivated a communication module therein. The content-using device 200a self-detects the transition from online to offline, or that is, the online/offline control determination unit 212 detects the transition from online to offline, and notifies the content control unit 202 of the transition from online to offline. The content control unit 202 performs updating of the content management list held by the content-using device 200a (Step S112). For instance, the content control unit 202 performs the updating such that the content management list 222a in FIG. 13, which corresponds to before the transition from online to offline, is replaced with the content management list 222 in FIG. 12.

In specific, in the content management list 222 in FIG. 12, the content management information piece 266 including "Cont1" in the content ID field 251 is updated such that "1/20, 23:30", which indicates 23:30, January 20th, is set to the scheduled expiration time field 254. "1/20, 23:30" is calculated by adding "24H" in the relative validity duration field 252 to 23:30, January 19th, which is the time point at which the content-using device 200a transitioned from online to offline. Similarly, in the content management list 222, the content management information piece 267 including "Cont2" in the content ID field 255 is updated such that "1/21, 23:30", which indicates 23:30, January 21st, is set to the scheduled expiration time field 258. "1/21, 23:30" is calculated by adding "48H" in the relative validity duration field 256 to the time point at which the content-using device 200a transitioned from online to offline. In addition, in the content management list 222, the content management information piece 268 including "Cont3" in the content ID field 259 is updated such that "1/20, 23:30" is set to the scheduled expiration time field 262. "1/20, 23:30" is calculated by adding "24H" in the relative validity duration field 260 to the time point at which the content-using device 200a transitioned from online to offline.

The content usage control unit 223 controls the use of the contents "Cont1", "Cont2", and "Cont3" by referring to the scheduled expiration times set in the content management list 222. For instance, the content usage control unit 223, while monitoring the current time, controls the use of the content identified by the content ID "Cont1" such that the use of the content "Cont1" is stopped when the scheduled expiration time "1/20, 23:30" (time point T02) is reached. Here, the stopping of the use of a given content refers to either (i) canceling the display of the content or (ii) canceling the display of the content, and further, deleting the content having been expanded on the RAM from the RAM, in response to a timer interrupt notification indicating that the scheduled expiration time has been reached.

In the following, description is provided on other types of control that may be performed when stopping the use of a given content at a point when the corresponding scheduled expiration time being reached. For instance, when a user is viewing the given content at the point when the scheduled expiration time is reached, the user may feel disappointed if the display of the content is suddenly cancelled and disappears. As such, control may be performed such that the use of the content currently under progress is continued and the stopping of the use of the content is performed when a page subsequent to the currently-displayed page is displayed or when an application currently being launched is launched once again. Further, so as to enhance user-friendliness, a notification may be made to the user that a period of validity of the content has expired after the use of the content is actually stopped. Alternatively, the stopping of the use of the content may be performed at the same time as notifying the user of the expiration of the period of validity of the content.

Step 3) At 00:00, January 20th, the content management server 100a transmits a polling command to each of the content-using devices connected therewith (Step S102). However, a polling Ack is not returned from the content-using device 200a, which is offline at this point (Step S103). In response to this, the content management server 100a registers, to the offline device list 122 (illustrated in FIG. 6), the device name "C1" of the content-using device 200a as an offline device name in addition to a detection time ("1/20, 00:00") at which the content-using device 200a has been detected as being offline (Step S104). Further, the content management control unit 130 of the content management server 100a searches the content management list 131 for a device name "C1" having been registered to the offline device list 122 as an offline device name. Subsequently, the content management control unit 130 sets, in the content management list 131, a scheduled expiration time to each content being provided to a content-using device identified by the device name "C1". The contents being provided to the content-using device identified by the device name "C1" are specified as a result of the above-described search in the content management list 131. In this example, the content management server 100a is providing contents "Cont1" and "Cont2" to the content-using device identified by the device name "C1". More specifically, in the content management list 131, "1/21, 00:00" is set as the scheduled expiration time of the content "Cont1". "1/21, 00:00" is calculated by adding the corresponding relative validity duration to the offline detection time. Similarly, in the content management list 131, "1/22, 00:00" is set as the scheduled expiration time of the content "Cont2". "1/22, 00:00" is calculated by adding "48H", which is the corresponding relative validity duration, to the offline detection time. Here, it should be noted that "1/21, 00:00" set as the scheduled expiration time of the content "Cont1" is actually thirty minutes later than the time point "1/20, 23:30", at which the validity of the content "Cont1" with respect to the content-using device 200a expires. However, at the same time, it should be noted that the content "Cont1" is invalidated by the content-using device 200a by this time point, if not sooner. That is, "1/21, 00:00" set as the scheduled expiration time of the content "Cont1" in the content management list 131 indicates that playback of the content "Cont1" cannot be performed at least from this time point onward.

2.6 Operations of Content Distribution System 10 (Part 3)

Figure 23:
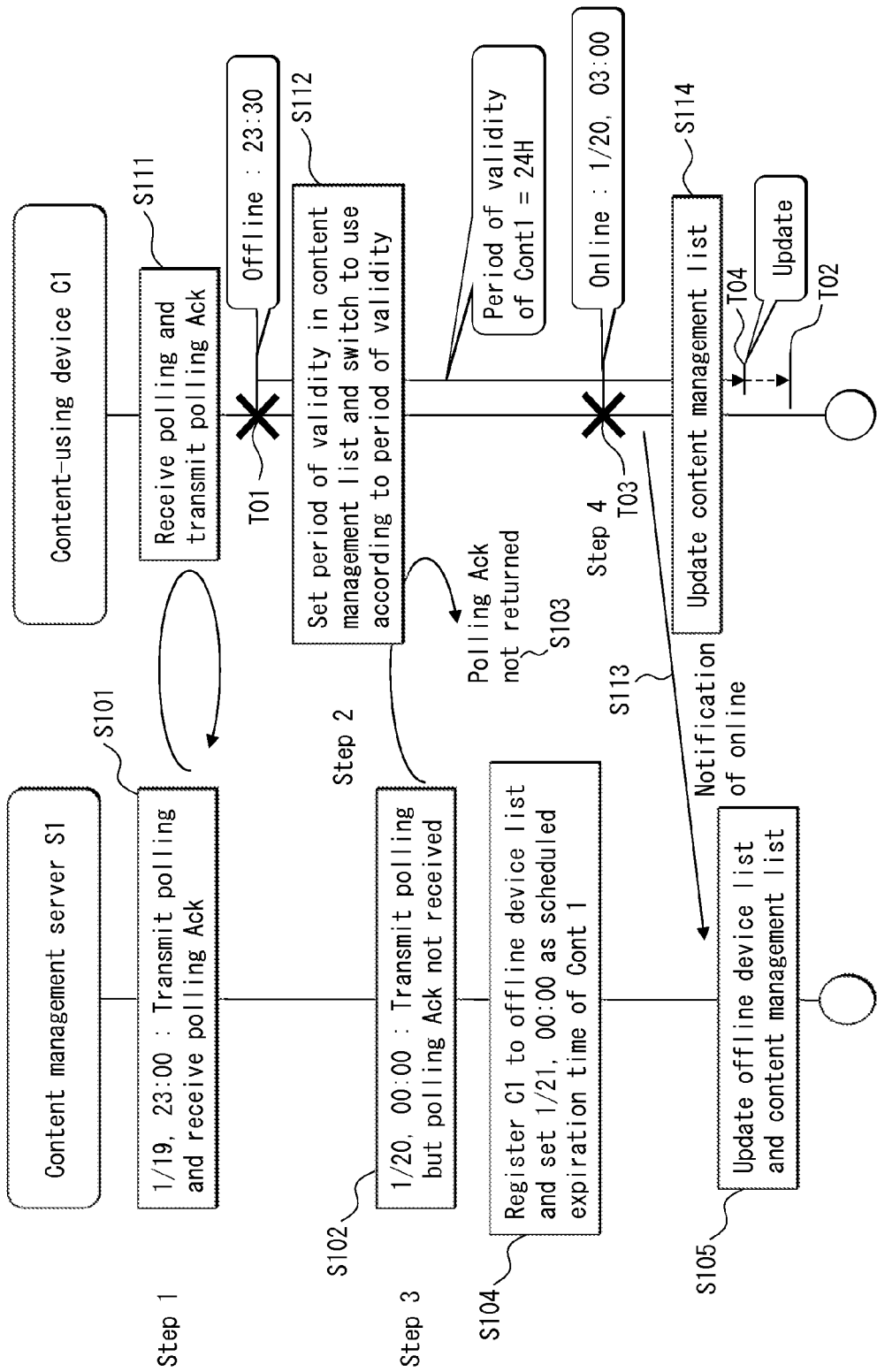
FIG. 23 is a sequence diagram illustrating interaction between the content management server 100a and the content-using device 200a in a case where, during the interaction, the content-using device 200a first transitions from online to offline and then returns to online once again.

In the following, description is provided on operations of the content distribution system 10, with reference to the sequence diagram illustrated in FIG. 23.

In the operations of the content distribution system 10 illustrated in FIG. 22, the content-using device 200a transitions from online to offline at 23:30, January 19th. FIG. 23 illustrates operations of the content distribution system 10 following this point. More specifically, FIG. 23 illustrates operations of the content distribution system 10 in a case where, after 23:30, January 19th, the content-using device 200a becomes online with respect to the content management server 100a once again at 03:00, January 20th.

Step 4) At 03:00, January 20th (time point T03), the content-using device 200a self-detects a transition from offline to online. At this point, the user of the content-using device 200a activates a communication module in the content-using device 200a or moves the content-using device 200a to a location where radio signals can reach the content-using device 200a. Due to this, content-using device 200a transitions from offline to online. The content-using device 200a, via the online control transmission unit 213, notifies the content management server 100a of the transition from offline to online (Step S113). At the same time, the content-using device 200a, at time point T04, sets an infinity value to each scheduled expiration time in the content management list 222. When an infinity value is set to a scheduled expiration time, the scheduled expiration time indicates that a specific period of validity is not set with respect to the corresponding content. As such, the content is made available for use whenever desired and for an unlimited period of time. In other words, at time point T04, the content-using device 200a deletes each scheduled expiration time in the content management list 222, and thereby makes the corresponding contents usable at any time following time point T04 while the content-using device 200a (Step S114).

In the meantime, the content management server 100a receives, via the online control reception unit 113, the notification from the content-using device 200a indicating that the content-using device 200a is online (Step S113). Subsequently, the content management server 100a deletes, from the offline device list 122, an offline device information piece including an offline device name "C1". In addition, the content management server 100a also deletes, from a management information piece including a content-using device name "C1" in the content management list 131, scheduled expiration times of the contents "Cont1" and "Cont2". As a result, the content management list 131 is updated so as to indicate that the content-using device 200a is online. More specifically, the content management server 100a updates the content management list 131 illustrated in FIG. 8 by deleting the scheduled expiration times in the scheduled expiration time fields 137 and 143. As a result of the updating, the content management list 131a illustrated in FIG. 9 is obtained (Step S105).

2.7. Effects Achieved by Embodiment 2

In embodiment 2, the content management server performs polling with respect to the content-using device at regular intervals, and thereby performs detection of whether the content-using device is online or offline. Due to this, the content-using device is able to perform control based on a period of validity of a content after actually having transitioned from online to offline. As such, a user is able to use the content with the maximum degree of convenience.

Also, in embodiment 2, the content-using device automatically detects (self-detects) transition from online to offline, and when detecting the transition from online to offline, switches to performing management of a content based on a period of validity of the content. On the other hand, the content-using device, when detecting a transition from offline to online, is able to stop performing management of the content based on the period of validity of the content.

In the meantime, the content management server detects whether the content-using device is online or offline according to whether or not a polling Ack is received from the content-using device as a response to a polling command. Further, the content management server, when the content-using device transitions from offline to online, is able to detect the transition from offline to online by receiving a notification from the content-using device indicating that the content-using device is online. As such, the content management server is able to perform the management of the content in the same way as the management of the content is performed by the content-using device.

As description has been provided above, opportunities are increasing where photos and video contents are exchanged as development of infrastructure supporting such exchange of personal contents progresses. However, at the same time, a user who owns and provides a content to others is concerned that the content he/she has provided may be used in an undesirable or unintended manner at a distribution destination, which includes unauthorized copying or leaking of the content. So as to address such a concern, there is a demand for a structure that enables the user, according to his/her intention, invalidate the content having been provided to a distribution destination and thereby disable the playback of the content at the distribution destination.

In the content distribution system 10, the management of a content is performed according to a method for controlling the use of the content which is determined according to whether or not the content-using device is connected with the content management server. As such, protection of the content, which has been provided by a provider, is realized while a user utilizing the content is able to use the content with an enhanced degree of convenience. As such, users are able to provide the content to others free of such concerns as described above.

3. Embodiment 3

In the following, description is provided on a content distribution system 20 pertaining to another embodiment of the present invention, with reference to the accompanying drawings.

3.1 Overall Configuration of Content Distribution System 20

Figure 24:
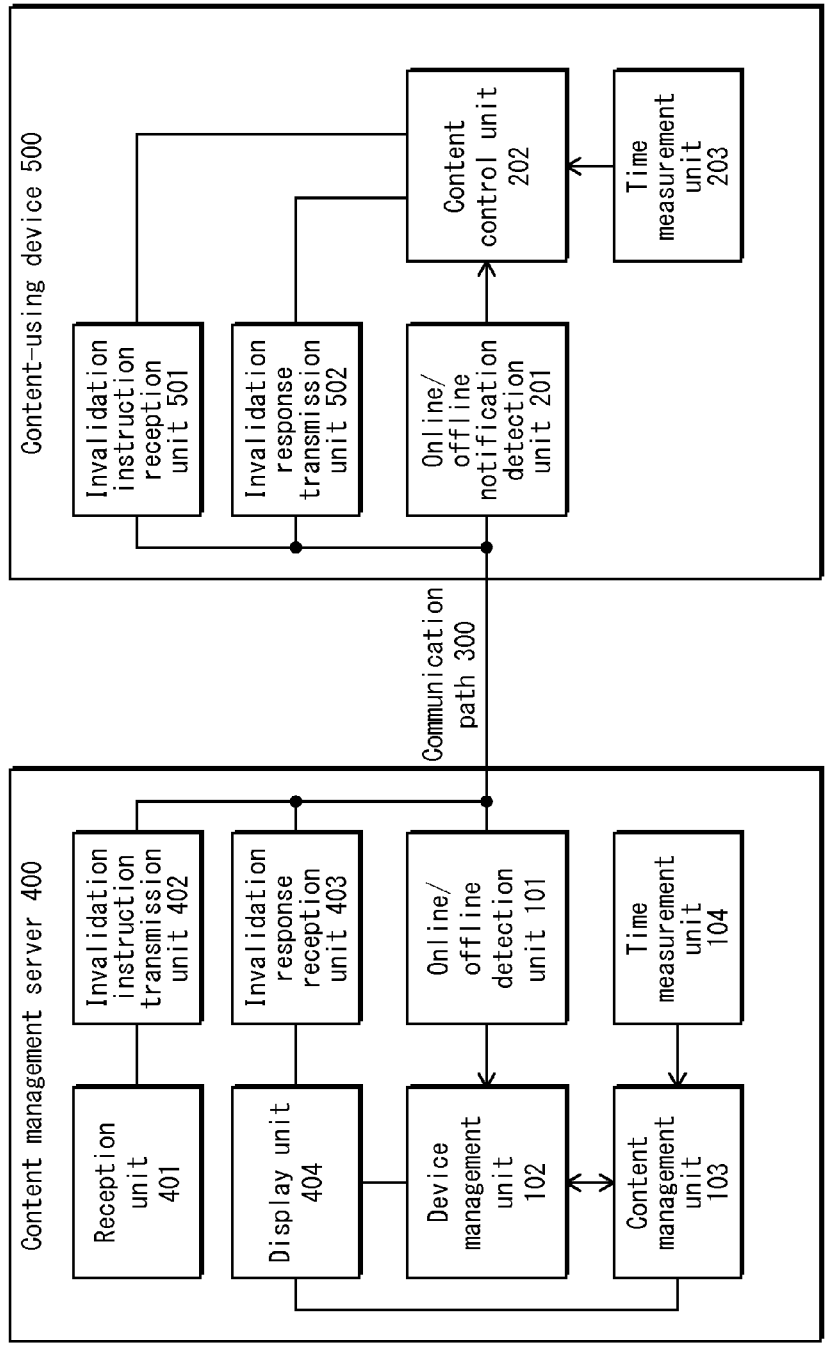
FIG. 24 illustrates an overall configuration of a content distribution system 20 in embodiment 2, including a configuration of a content management server 400 and a configuration of a content-using device 500.

FIG. 24 illustrates an overall configuration of the content distribution system 20. The content distribution system 20 includes: a content management server 400; a content-using device 500; and the communication path 300 between the content management server 400 and the content-using device 500.

Note that in embodiment 3, constituent elements provided with the same reference signs as in embodiment 2 indicate the same constituent elements as those in embodiment 2.

Further, similar as in embodiment 2, the content distribution system 20 may include two or more content management servers and two or more content-using devices. When multiple content management servers and multiple content-using devices are included in the content distribution system 20, the content management servers and the content-using devices may be interconnected via a network.

3.2 Configuration of Content Management Server 400

FIG. 24 also illustrates a configuration of the content management server 400. The content management server 400 includes: a reception unit 401; an invalidation instruction transmission unit 402; an invalidation response reception unit 403; and a display unit 404, in addition to the constituent elements included in the content management server 100 pertaining to embodiment 2. Since the constituent elements of the content management server 400, other than those presented above, are similar to those in embodiment 2, description is provided in the following while focusing on the constituent elements differing between embodiments 2 and 3.

The reception unit 401 receives a user instruction for invalidating the use of a content by a content-using device, or that is, receives an invalidation instruction. In the following, one example is provided of how the reception unit 401 receives an invalidation instruction.

Figure 25:
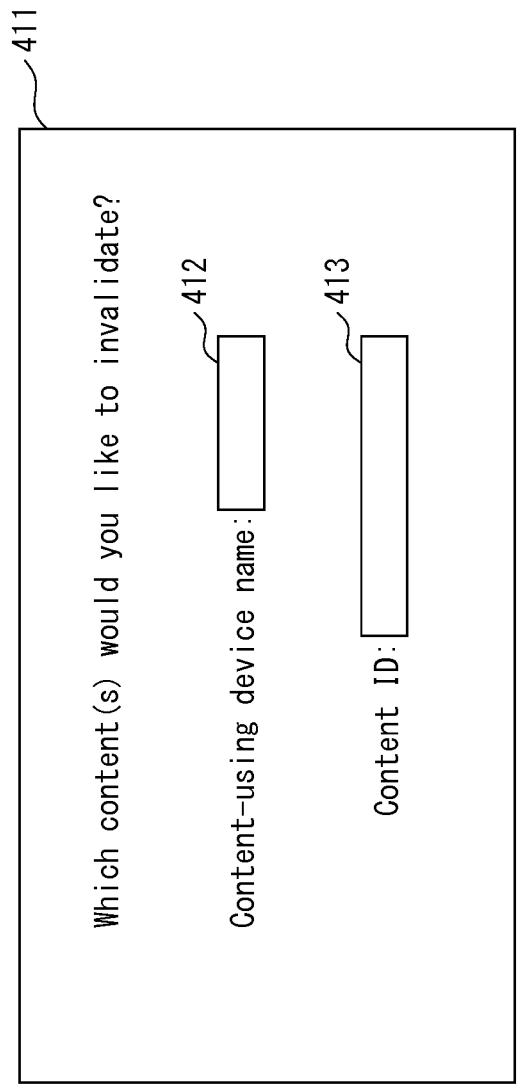
FIG. 25 illustrates a screen 411 displayed by a display unit 404.

The display unit 404 displays, for instance, a screen 411 as illustrated in FIG. 25. The screen 411 has an input field 412 and an input field 413. The input field 412 is for receiving input of a content-using device name from a user, and the input field 413 is for receiving input of a content ID from the user. The user inputs a content-using device name and a content ID with respect to the input field 412 and the input field 413, respectively. The reception unit 401 receives, as an invalidation instruction, the content-using device name and the content ID having been input. Subsequently, the reception unit 401 outputs, as the invalidation instruction, the content-using device name and the content ID having been input to the invalidation instruction transmission unit 402.

FIGS. 26 through 29 each indicate an example of input made with respect to the screen 411 by the user.

FIG. 26A illustrates a screen 411a. In the screen 411a, "C1" is input to an input field 412a, and "*" is input to an input field 413a. "C1" in the input field 412a indicates that the user has specified a content-using device identified by a content-using device name "C1". In addition, "*" in the input field 413a indicates that the user has specified, as invalidation-target contents, all contents having been provided from the content management server 400 to the content-using device specified in the input field 412a. That is, the screen 411a indicates that the user has specified the content-using device "C1" and has issued an instruction for invalidating all contents in the content-using device "C1" that have been provided by the content management server 400.

Figure 27:
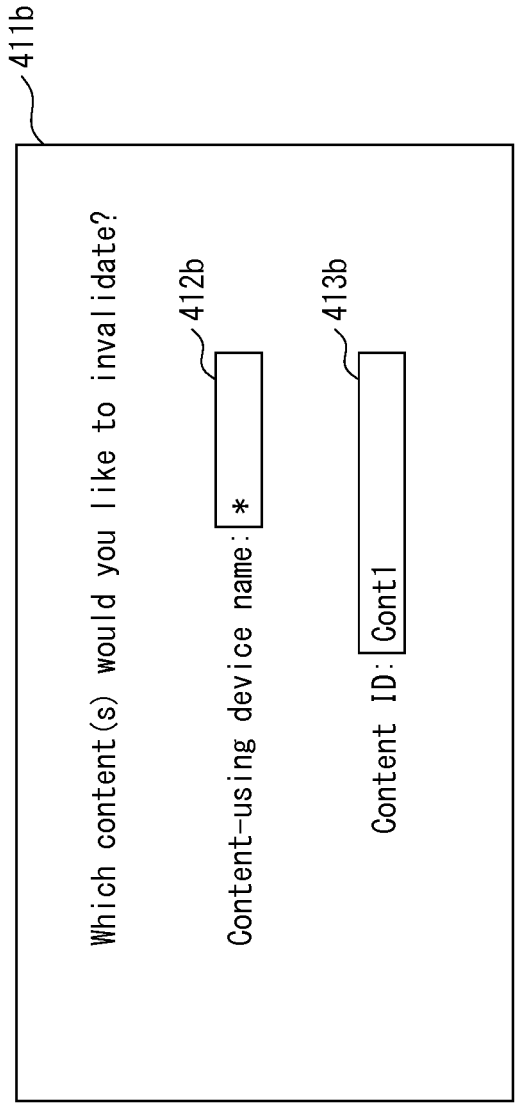
FIG. 27 illustrates a screen 411b displayed by the display unit 404.

FIG. 27 illustrates a screen 411b. In the screen 411b, "*" is input to an input field 412b, and "Cont1" is input to an input field 413b. "*" in the input field 412b indicates that the user has specified all content-using devices, rather than a specific one of the content-using devices. "Cont1" in the input field 413b indicates that the user has specified, as an invalidation-target content, a content "Cont1" provided by the content management server 400. That is, the screen 411b indicates that the user has specified the content identified by the content ID "Cont1" and has issued an instruction for invalidating the content identified by "Cont1" in each of the content-using devices to which the content "Cont1" has been provided.

Figure 28:
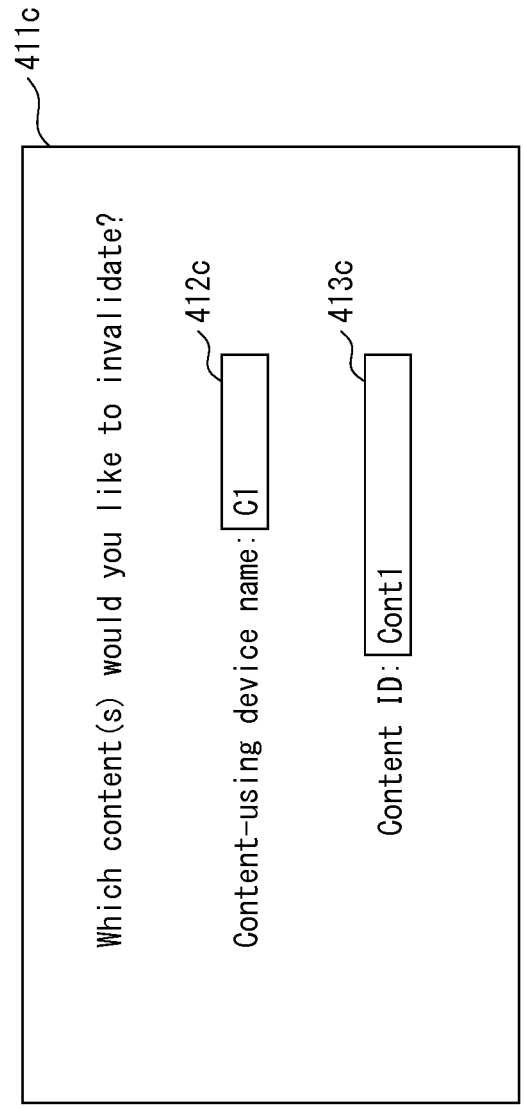
FIG. 28 illustrates a screen 411c displayed by the display unit 404.

FIG. 28 illustrates a screen 411c. In the screen 411c, "C1" is input to an input field 412c, and "Cont1" is input to an input field 413c. "C1" in the field 412c indicates that the user has specified the content-using device "C1". In addition, "Cont1" in the input field 413c indicates that the user has specified, as an invalidation-target content, a content identified by "Cont1" having been provided from the content management server 400 to the content-using device specified in the input field 412c. That is, the screen 411c indicates that the user has issued an instruction for invalidating the content identified by "Cont1" in the content-using device "C1" to which the content "Cont1" has been provided from the content management server 400.

The device management control unit 120 reads out, from the content-using device list 121, an IP address corresponding to a content-using device name specified in the invalidation instruction. Subsequently, the invalidation instruction transmission unit 402 transmits the invalidation instruction to the IP address having read out, or that is, to the content-using specified in the invalidation instruction.

Figure 26:
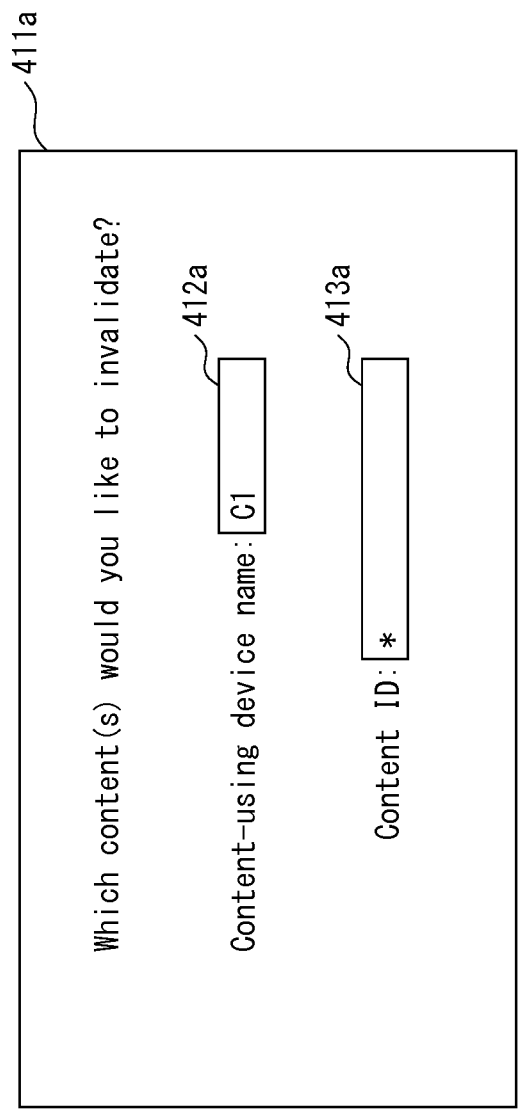
FIG. 26 illustrates a screen 411a displayed by the display unit 404.

For instance, as illustrated in FIG. 26, when input is received of a content-using device name "C1" and a content ID "*", the device management control unit 120 reads out, from the content-using device list 121, an IP address "192.168.1.21" stored in association with the content-using device name "C1". Subsequently, the invalidation instruction transmission unit 402 transmits the invalidation instruction to the IP address "192.168.1.21". In this case, the content-using device "C1" at the IP address "192.168.1.21" is instructed to invalidate all contents held thereby (i.e., the contents "Cont1" and "Cont2").

On the other hand, when input is received of a content-using device name "*" and a content ID "Cont1" as illustrated in FIG. 27, the content management control unit 130 reads out, from the content management list 131, a management information piece including the content ID "Cont1". Subsequently, the content management control unit 130 extracts, from the management information piece read out, all content-using device names included therein. Successively, the device management control unit 120 reads out, from the content-using device list 121, an IP address stored in association with each content-using device name extracted. The invalidation instruction transmission unit 402 transmits the invalidation instruction to each of the IP addresses read out. In this case, each of the content-using devices corresponding to the IP addresses is instructed to invalidate the content identified by the content ID "Cont1". In the example illustrated in FIG. 27, the content management control unit 130 extracts, from the content management list 131, content-using device names "C1" and "C2". Further, the device management control unit 120 reads out, from the content-using device list 121, the IP addresses "192.168.1.21" and "192.168.1.22". Subsequently, the invalidation instruction is transmitted to each of the IP addresses "192.168.1.21" and "192.168.1.22".

Further, when input is received of a content-using device name "C1" and a content ID "Cont1" as illustrated in FIG. 28, the content management control unit 120 reads out, from the content management list 131, an IP address "192.168.1.21" stored in association with the content-using device name "C1". Subsequently, the invalidation instruction transmission unit 402 transmits the invalidation instruction to the IP address "192.168.1.21" read out. In this case, the content-using device corresponding to the IP address "192.168.1.21" is instructed to invalidate the content identified by the content ID "Cont1".

Note that upon transmission of the invalidation instruction, the invalidation instruction transmission unit 402 may check whether the content-using device to which the invalidation instruction is to be transmitted is online or offline by using the offline device list 122. In such a case, the invalidation instruction transmission unit 402 may perform control such that the invalidation instruction is not transmitted to content-using devices that are offline. Alternatively, the invalidation instruction transmission unit 402 may transmit the invalidation instruction to content-using devices that are offline, in addition to those that are online, in a similar manner as described above. By configuring the invalidation instruction transmission unit 402 to transmit the invalidation instruction to a content-using device even when the content-using device is offline, invalidation processing can be performed promptly even when a content-using device registered as being offline in the offline device list 122 has actually transitioned from offline to online immediately before the transmission of the invalidation instruction.

The invalidation response reception unit 403 receives an invalidation response from a content-using device to which the invalidation instruction has been transmitted. When an invalidation response is not returned from a content-using device even though the content management server 400 has recognized the content-using device as being online, the device management control unit 120 registers the content-using device to the offline device list 122. In specific, as description has been provided in embodiment 2, the device management control unit 120 registers an offline device information piece corresponding to the content-using device to the offline device list 122. Further, in such a case, the content management control unit 130 registers, to the content management list 131, a scheduled expiration time with respect to the content-using device.

In contrast, when an invalidation response is returned from a content-using device that has been recognized by the content management server 400 as being offline, the device management control unit 120 unregisters the content-using device from the offline device list 122. In specific, the device management control unit 120 deletes an offline device information piece corresponding to the content-using device from the offline device list 122. Further, in such a case, the content management control unit 130 deletes a scheduled expiration time set with respect to the content-using device from the content management list 131.

The display unit 404 receives the invalidation response and displays invalidation results. FIGS. 29 through 32 each illustrate an example of a screen displayed by the display unit 404.

(Screen 441*a*)

Figure 29:
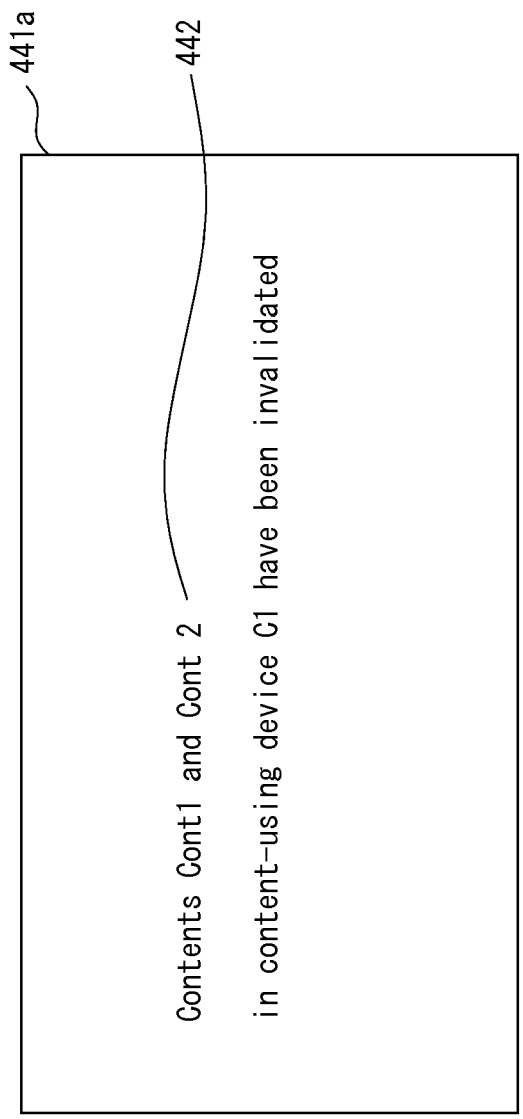
FIG. 29 illustrates a screen 441a displayed by the display unit 404.

A screen 441*a* as illustrated in FIG. 29 is displayed when the invalidation instruction as illustrated in FIG. 26, which is for invalidating all contents held by the content-using device "C1", has been transmitted. The screen 441*a* includes a message 442. The message 442 indicates that the content-using device "C1" is online and (that the contents identified by the respective content names "Cont1" and "Cont2" have been immediately invalidated.

(Screen 441*b*)

Figure 30:
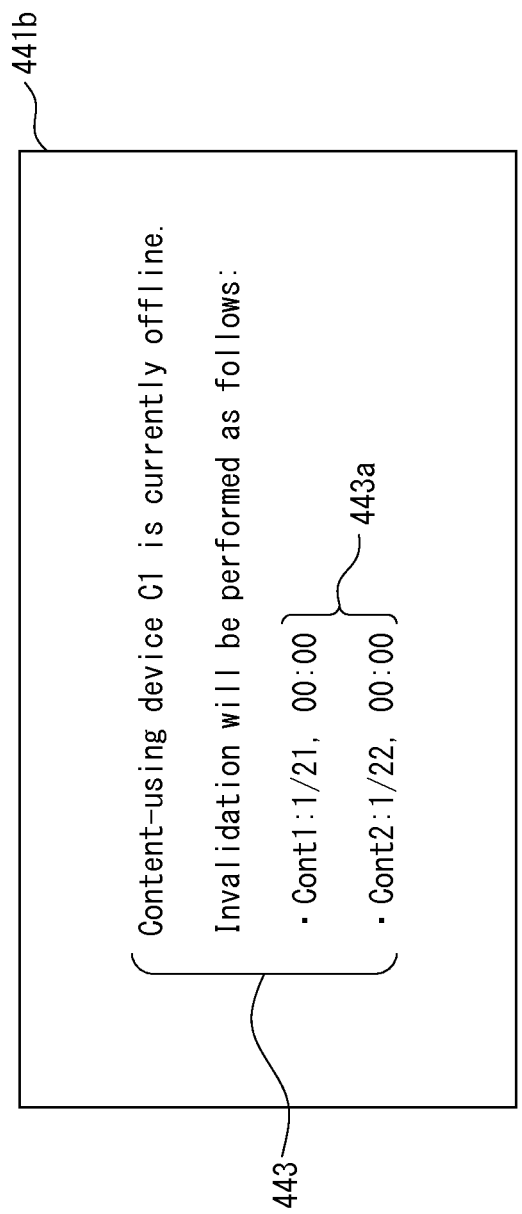
FIG. 30 illustrates a screen 441b displayed by the display unit 404.

A screen 441*b* as illustrated in FIG. 30 is displayed when the invalidation instruction as illustrated in FIG. 26, for invalidating all contents held by the content-using device "C1", has been transmitted, and further, when the content-using device "C1" is offline. The screen 441*b* includes a message 443 indicating that the content-using device "C1" is currently offline. In this case, the content management list 131 illustrated in FIG. 8 is referred to, and a scheduled expiration time set with respect to each content being used by the content-using device "C1" is read out. That is, the scheduled expiration times corresponding to the contents identified by the content names of "Cont1" and "Cont2" are read out. As such, the message 443 includes, in association with content names, scheduled expiration times 443*a* read out.

(Screen 441*c*)

Figure 31:
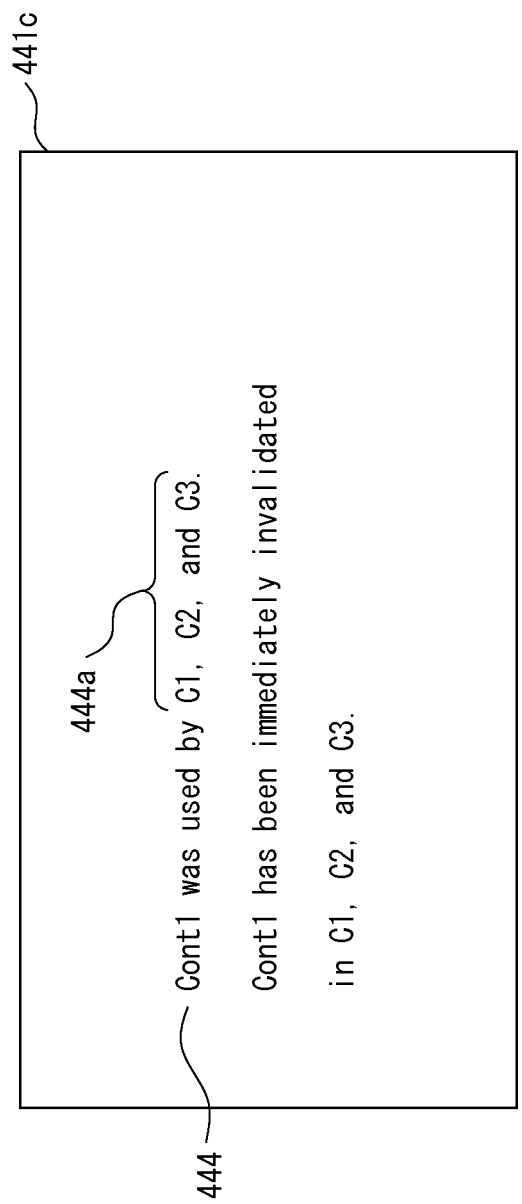
FIG. 31 illustrates a screen 441c displayed by the display unit 404.

A screen 441*c* as illustrated in FIG. 31 is displayed when both of the following conditions (i) and (ii) are satisfied.

(i) As illustrated in FIG. 27, an invalidation instruction is issued for invalidating the content identified by the content name "Cont1" in each content-using device.

(ii) Each content-using device is online.

The screen 441*c* includes a message 444 indicating that the invalidation-target content has been invalidated. In addition, the message 444 includes content-using device names 444*a* indicating the content-using devices that have been using the corresponding content. The content-using device names indicating the content-using devices that have been using the corresponding content are acquired by referring to the content management list 131.

(Screen 441*d*)

Figure 32:
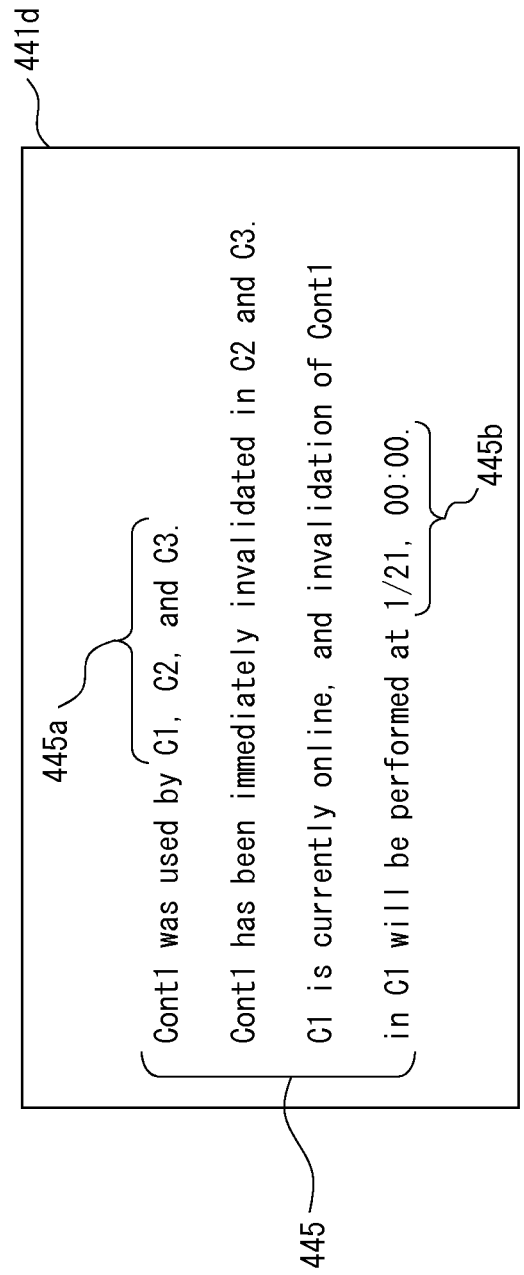
FIG. 32 illustrates a screen 441d displayed by the display unit 404.

A screen 441*d* as illustrated in FIG. 32 is displayed when both of the following conditions (i) and (ii) are satisfied.

(i) As illustrated in FIG. 27, an invalidation instruction is issued for invalidating the content identified by the content name "Cont1" in each content-using device.

(ii) Only the content-using device "C1" is offline and the rest of the content-using devices are online.

The screen 441*d* includes a message 445 indicating that the corresponding content has been invalidated in the content-using devices that are online. In addition, the message 445 also includes a time point 445*b* indicating a time point at which the corresponding content is scheduled to be invalidated in the content-using device that is offline. Further, the message 445 includes content-using device names 445*a* indicating the content-using devices that have been using the corresponding content. The content-using device names of the content-using devices that have been using the corresponding content are acquired by referring to the content management list 131. Further, the time point at which the corresponding content is scheduled to be invalidated in the content-using device that is offline is acquired by referring to a scheduled expiration time set in the content management list 131 with respect to the content-using device that is offline.

In the above, the display unit 404 receives the invalidation response and displays the invalidation results. However, the present embodiment is not limited to this. That is, a modification may be made as follows.

After having transmitted the invalidation instruction to a content-using device and before receiving the invalidation response from the content-using device, the device management control unit 120 may refer to the offline device list 122. The device management control unit 120 thus determines whether or not the device name of the content-using device is included in the offline device list 122. When the device name of the content-using device is not included in the offline device list 122, the device management control unit 120 determines that the content-using device is online. When the content-using device to which the invalidation instruction has been transmitted is online, the display unit 404 displays a message indicating that invalidation will be immediately performed by the content-using device.

Alternatively, after having transmitted the invalidation instruction to a content-using device and before receiving the invalidation response from the content-using device, the content management control unit 130 may refer to the content management list 131. The content management control unit 130 thus determines whether or not a scheduled expiration time is set with respect to the content-using device. When a scheduled expiration time is set with respect to the content-using device, the content management control unit 130 determines that the content-using device is offline. When the content-using device to which the invalidation instruction has been transmitted is offline, the display unit 404 displays a scheduled expiration time set with respect to the content-using device.

In addition, (i) when, in response to the invalidation response transmitted to a content-using device, the invalidation response is received from the content-using device or (ii) when, in response to the invalidation response transmitted to a content-using device, an invalidation response is not received within a predetermined interval from the content-using device, and further, such a response to the invalidation instruction having been transmitted contradicts with the state managed by the content management server 400, the offline device list 122 or the content management list 131 may be updated. In addition, the invalidation results displayed may be updated. The following describes specific examples of the above-described cases of contradiction.

(A) when an Invalidation Response is Received

When the invalidation response is received from a content-using device whose name is included in the offline device list 122 as an offline device name, the reception of the invalidation response contradicts with the corresponding offline device information piece stored in the offline device list 122.

Further, when the invalidation response is received from a content-using device whose name is included in the content management list 131 as a content-using device name but when a scheduled expiration time is stored in association with the content-using device name, the reception of the invalidation response contradicts with the corresponding management information piece stored in the content management list 131.

(B) when an Invalidation Response is not Received within a Predetermined Interval When the invalidation response is not received from a content-using device whose name is not included in the offline device list 122 as an offline device name, the non-reception of the invalidation response contradicts with the corresponding offline device information piece stored in the offline device list 122.

When the invalidation response is not received from a content-using device whose name is included in the content management list 131 as a content-using device name but when a scheduled expiration time is not stored in association with the content-using device name, the non-reception of the invalidation response contradicts with the corresponding management information piece stored in the content management list 131.

For instance, when the invalidation response is not returned from a content-using device in a case where the content-using device is recognized by the content management server 400 as being online and display is being performed that the invalidation by the content-using device is to be performed immediately, it can be assumed that the content-using device has transitioned from online to offline at or immediately before the timing at which the determination is made that the invalidation instruction has not been returned thereto. In such a case, the device management control unit 120 registers the content-using device to the offline device list 122 by adding an offline device information piece corresponding to the content-using device. Further, in such a case, the content management control unit 130 performs, in the content management list 131, setting of a scheduled expiration time and the like with respect to content-using device. In addition, the display unit 404 displays the scheduled expiration time set with respect to the content-using device.

In contrast, when the invalidation response is received from a content-using device in a case where the content-using device is recognized by the content management server 400 as being offline and display is being performed of a period of validity set with respect to the content-using device, it can be assumed that the given content-using device has transitioned from offline to online at or immediately before the timing at which the invalidation response has been returned thereto. In such a case, the device management control unit 120 deletes, from the offline device list 122, an offline device information piece including the name of the content-using device. Further, in such a case, the content management control unit 130 deletes, from the content management list 131, a scheduled expiration time corresponding to the content-using device. In addition, the display unit 404 displays a message indicating that the invalidation by the content-using device has been performed immediately.

3.3 Configuration of Content-Using Device 500

FIG. 24 illustrates a configuration of a content-using device 500. The content-using device 500 includes: an invalidation instruction reception unit 501; and an invalidation response transmission unit 502, in addition to the constituent elements included in the content-using device 200 pertaining to embodiment 2. Since the constituent elements of the content-using device 500, other than those presented above, are similar to those in embodiment 2, description is provided in the following while focusing on the constituent elements differing between embodiments 2 and 3.

The invalidation instruction reception unit 501 receives an invalidation instruction from the content management server 400 and outputs the invalidation instruction received to the content management control unit 221.

The content management control unit 221 receives the invalidation instruction from the invalidation instruction reception unit 501. When receiving the invalidation instruction, the content management control unit 221 extracts a content ID from the invalidation instruction and reads out, from the content management list 222, a content management information piece including the content ID extracted. Subsequently, the content management control unit 221 invalidates a content identified by the content ID included in the content management information piece read out.

Here, the content management control unit reads out, from the content management list 222, a content management information piece including the content ID extracted from the invalidation instruction so as to check whether or not a content identified by the content ID included in the invalidation instruction is held by the content-using device 500.

The content management control unit 221 invalidates the content by deleting the content in the content storage unit 224. When the invalidation of the content is completed, the content management control unit 221 generates an invalidation response indicating that the invalidation of the content has been completed, and outputs the invalidation response generated to the invalidation response transmission unit 502.

Here, it should be noted that the invalidation of an invalidation-target content is not limited to being performed in the above-described manner. That is, the invalidation of an invalidation-target content may be performed as described in the following.

When the invalidation-target content is encrypted, the content management control unit 221 may perform the invalidation of the content by deleting a key used for decrypting the content.

Alternatively, the content management control unit 221 may output, to the content usage control unit 223, the invalidation instruction along with the content ID identifying the invalidation-target content. The content usage control unit 223, when receiving the invalidation instruction along with the content ID, may prohibit the use of the content identified by the content ID received. The invalidation of an invalidation-target content may be performed in such a manner. In such a case, the content usage control unit 223 may be implemented as a combination of an application program for controlling the use of a content and a processor that operates according to instructions provided from the application program.

Note that, when the use of a content is suddenly stopped by an invalidation instruction pertaining to the content being received while viewing of the content is in progress, the user viewing the content may feel disappointed.

As such, control in such a case may be performed such that the use (viewing) of the content currently under progress is continued and the stopping of the use of the content is performed when a page subsequent to the currently-displayed page in the content is displayed.

For instance, when the invalidation-target content is a musical content (i.e., a song) and an invalidation instruction for invalidating the song is received while the song is being played back, playback may be continued until the end of the song. Subsequently, following the termination of the playback of the song, the invalidation of the song may be performed.

For instance, when the invalidation-target content is a still image and an invalidation instruction for invalidating the still image is received while the still image is being displayed, the still image may be continuously displayed until the user terminates the display of the still image. Subsequently, when the display of the still image is terminated by a user operation being made, the invalidation of the still image may be performed.

For instance, when the invalidation-target content is a moving image composed of a plurality of scenes and an invalidation instruction for invalidating the moving image is received while the moving image is being played back, playback of the moving image may be continued until the playback of a current scene finishes. Subsequently, when the playback of the current scene is finished and the playback of the moving image is stopped, the invalidation of the moving image may be performed.

In addition, the use of an invalidation-target content may be stopped at a timing when an application program for viewing the content is launched once again after being terminated once. In such a case, after invalidation of the content is performed, a notification may be made to the user indicating that the content has been invalidated so as to ensure user convenience.

The invalidation response transmission unit 502 receives, from the content management control unit 221, the invalidation response indicating that the invalidation of the content has been completed. When receiving the invalidation response, the invalidation response transmission unit 502 transmits the invalidation response received to the content management server 400.

3.4 Operations of Content Distribution System 20

In the following, description is provided on operations of the content distribution system 20.

(1) Operations of Content Management Server 400

Figure 33:
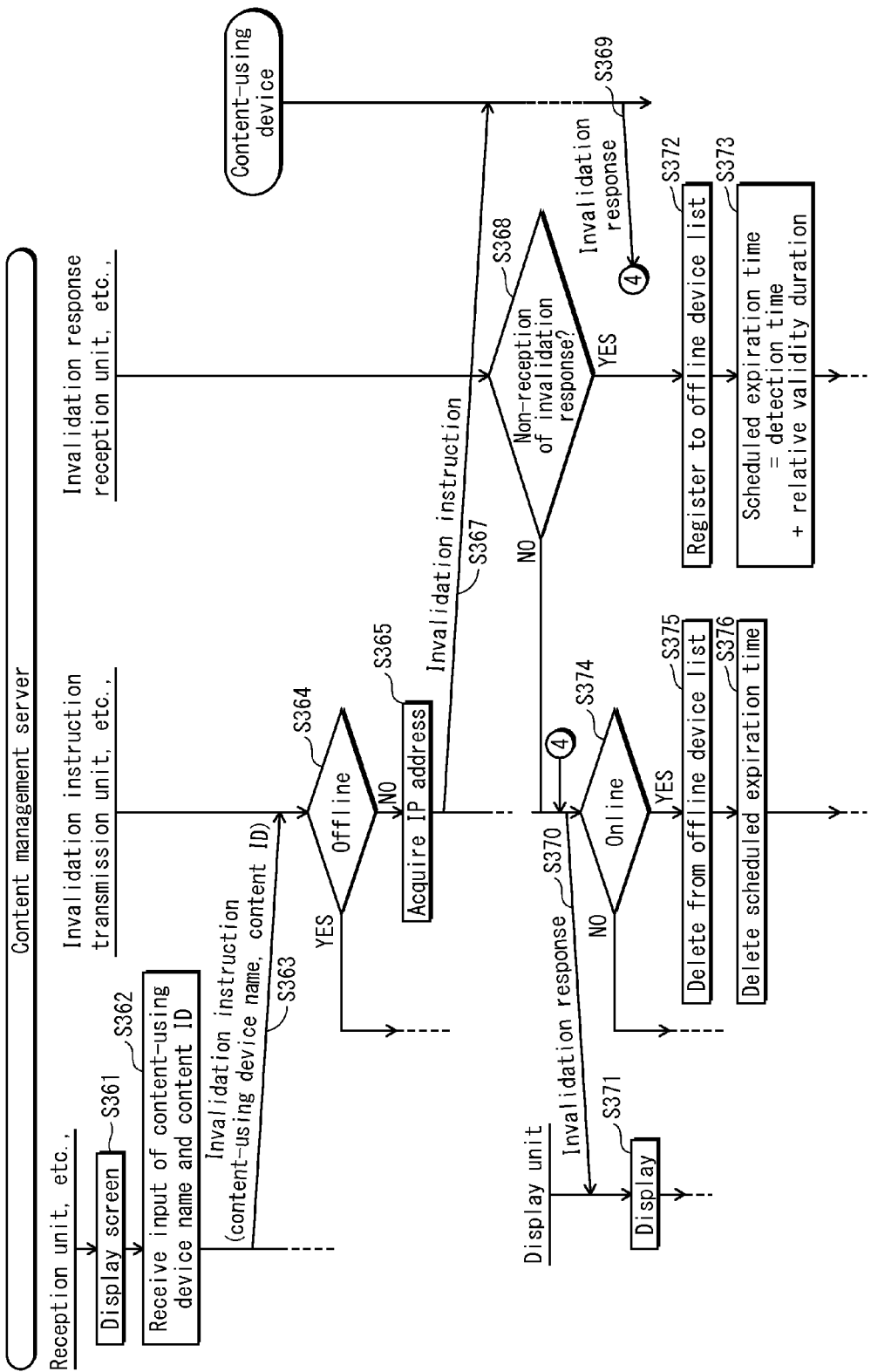
FIG. 33 is the first part of a sequence diagram illustrating operations of the content distribution system 20.

In the following, description is provided on operations of the content management server 400, with reference to the sequence diagram illustrated in FIG. 33.

The display unit 404 displays the screen 411, which is for receiving an invalidation instruction (Step S361). Subsequently, the reception unit 401 receives input of a content-using device name and a content ID (Step S362). The reception unit 401 outputs the invalidation instruction, which includes the content-using device name and the content ID, to the invalidation instruction transmission unit 402 (Step S363).

Subsequently, the online/offline control determination unit 112 determines whether the content-using device specified is offline (Step S364).

When the content-using device specified is online ("NO" in Step S364), the device management control unit 120 acquires an IP address corresponding to the content-using device from the content-using device list 121. The device management control unit 120 outputs the IP address acquired to the invalidation instruction transmission unit 402 (Step S365).

The invalidation instruction transmission unit 402 outputs the invalidation instruction received to the IP address received (Step S367). As such, the invalidation instruction is transmitted to the content-using device specified.

When the invalidation response reception unit 403 does not receive an invalidation response from the content-using device within a predetermined interval ("YES" in Step S368), the device management control unit 120 writes, to the offline device list 122, an offline device information piece corresponding to the content-using device (Step S372). In specific, the offline device information piece includes a content-using device name indicating the content-using device as the offline device name and the current time point as the offline detection time (Step S372). In addition, the content management control unit 130 performs the calculation of: scheduled expiration time=detection time+relative validity duration. Subsequently, the content management control unit 130 writes, to the content management list 131, the scheduled expiration time calculated, in association with the content ID and the content-using device name (Step S373).

When the invalidation response reception unit 403 receives an invalidation response from the content-using device within a predetermined interval ("NO" in Step S368), the invalidation response reception unit 403 outputs the invalidation response to the display unit 404 (Step S370). The display unit 404 displays a screen 411 corresponding to the invalidation response (Step S371).

Subsequently, the online/offline control determination unit 112 determines whether the content-using device having transmitted the invalidation response is online (Step S374).

When the content-using device is online ("YES" in Step S374), the device management control unit 120 deletes, from the offline device list 122, an offline device information piece including a content-using device name indicating the content-using device as an offline device name (Step S375). In addition, the content management control unit 130 deletes, from the content management list 131, a scheduled expiration time (Step S376). Here, the scheduled expiration time corresponds to the content ID and the content-using device name indicating the content-using device.

(2) Operations of Content-Using Device 500

Figure 34:
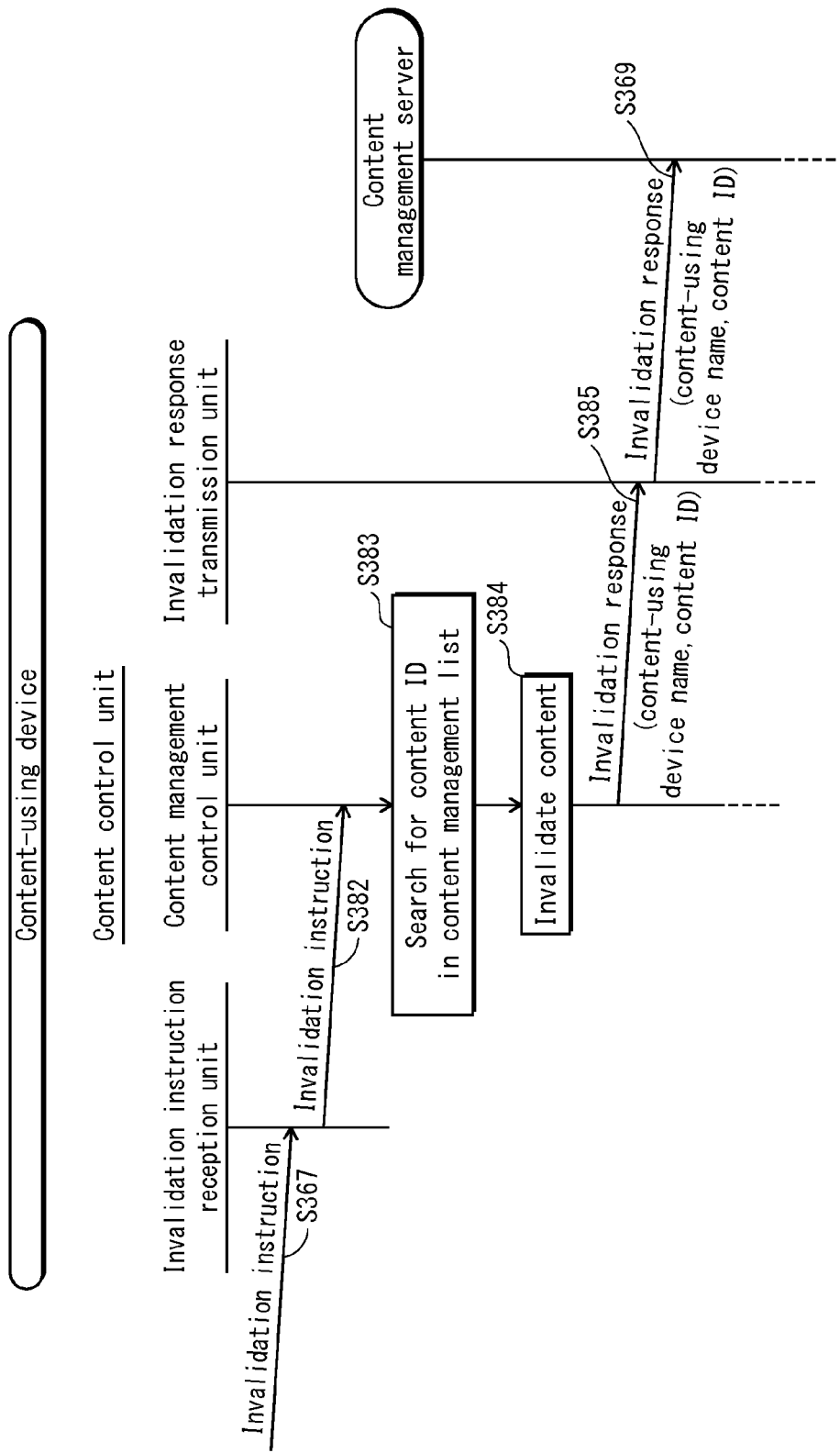
FIG. 34 is the second part of the sequence diagram illustrating the operations of the content distribution system 20.

In the following, description is provided on operations of the content-using device 500, with reference to the sequence diagram illustrated in FIG. 34.

The invalidation instruction reception unit 501 receives an invalidation instruction from the content management server 400 (Step S367). Subsequently, the content management control unit 221 receives the invalidation instruction from the invalidation instruction reception unit 501 (Step S382). The content management control unit 221 searches, in the content management list 222, for the content ID included in the invalidation instruction (Step S383).

The content management control unit 221 invalidates the corresponding content (Step S384). Subsequently, the content management control unit 221 outputs an invalidation response to the invalidation response transmission unit 502 (Step S385).

Subsequently, the invalidation response transmission unit 502 outputs the invalidation response to the content management server 400 (Step S369).

3.5 Example of Invalidation Instruction in Content Distribution System 20

In the following, description is provided on an example of the invalidation instruction in the content distribution system 20, with reference to FIGS. 35 through 38.

FIGS. 35, 36, 37, and 38 respectively illustrate a configuration of content distribution systems 20a, 20b, 20c, and 20d, which are examples of the content distribution system 20. In the examples illustrated in FIGS. 35 through 38, each of the content distribution systems 20a, 20b, 20c, and 20d includes two content management servers and three content-using devices. More specifically, each of the content distribution systems 20a through 20d includes: a content management server 400a (also referred to as a "content management server S1"); a content management server 400b (also referred to as a "content management server S2"); a content-using device 500a (also referred to as a "content-using device C1"); a content-using device 500b (also referred to as a "content-using device C2"); and a content-using device 500c (also referred to as a "content-using device C3").

In each of the content distribution systems 20a, 20b, 20c, and 20d, the content management server 400a provides a content identified by a content name "Cont1" and a content identified by a content name "Cont2". The content management server 400b provides a content identified by a content name "Cont3".

The content-using device 500a is provided, by the content management server 400a, with the contents "Cont1" and "Cont2". The content-using device 500a is also provided, by the content management server 400b, with the content "Cont3".

The content-using device 500b is provided, by the content management server 400a, with the content "Cont1".

The content-using device 500c is provided, by the content management server 400a, with contents "Cont1" and "Cont2".

Figure 35:
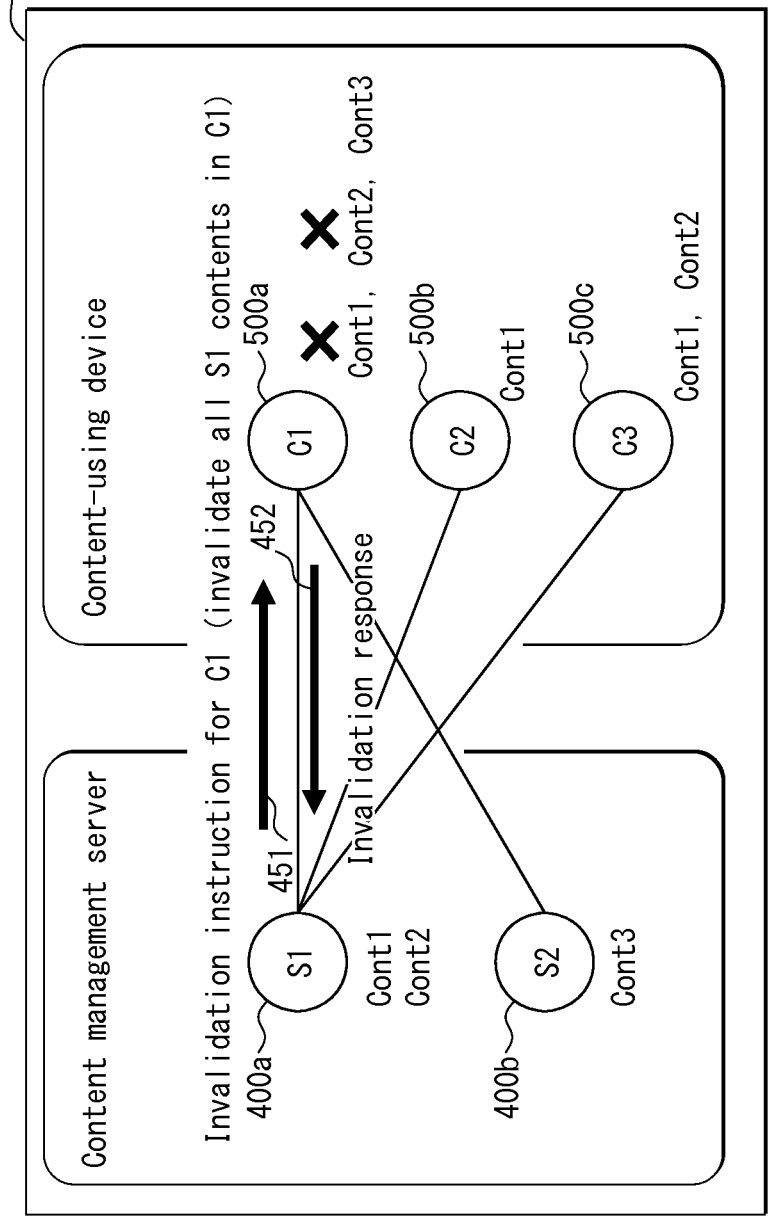
FIG. 35 illustrates operations in a case where, among contents held by one content-using device that is online, invalidation is performed of all contents having been provided from one content management server.

(a) A Case where, Among Contents Held by One Content-Using Device that is Online, Each Content Provided from One Content Management Server is Invalidated FIG. 35 illustrates a case where, among contents held by the content-using device 500a, each content provided from the content management server 400a is invalidated in accordance with an invalidation instruction from the content management server 400a. The reception of the invalidation instruction by the content management server 400a is performed as illustrated in FIG. 26. In addition, in the content distribution system 20a, the content-using device 500a is online.

The content management server 400a acquires, from the content-using device list 121, an IP address corresponding to the content-using device 500a. Subsequently, the content management server 400a outputs an invalidation instruction 451 to the IP address acquired. The invalidation instruction 451 is an instruction for instructing the content-using device 500a to invalidate, among contents held by the content-using device 500a, each content provided from the content management server 400a.

When receiving the invalidation instruction 451, the content-using device 500a reads out, from the content management list 222 illustrated in FIG. 12, a content management information piece including a content management server name "S1". Subsequently, the content-using device 500a extracts contents IDs "Cont1" and "Cont2" from the content management information piece read out. As such, the content-using device 500a specifies contents identified by the content IDs "Cont1" and "Cont2" as being the invalidation-target contents indicated by the invalidation instruction 451. Subsequently, the content-using device 500a invalidates the contents specified. Following the invalidation of the contents, the content-using device 500a returns an invalidation response 452 indicating the invalidation results to the content management server 400a.

The content management server 51 receives the invalidation response 452 and displays, for instance, the screen 441a illustrated in FIG. 29.

Figure 36:
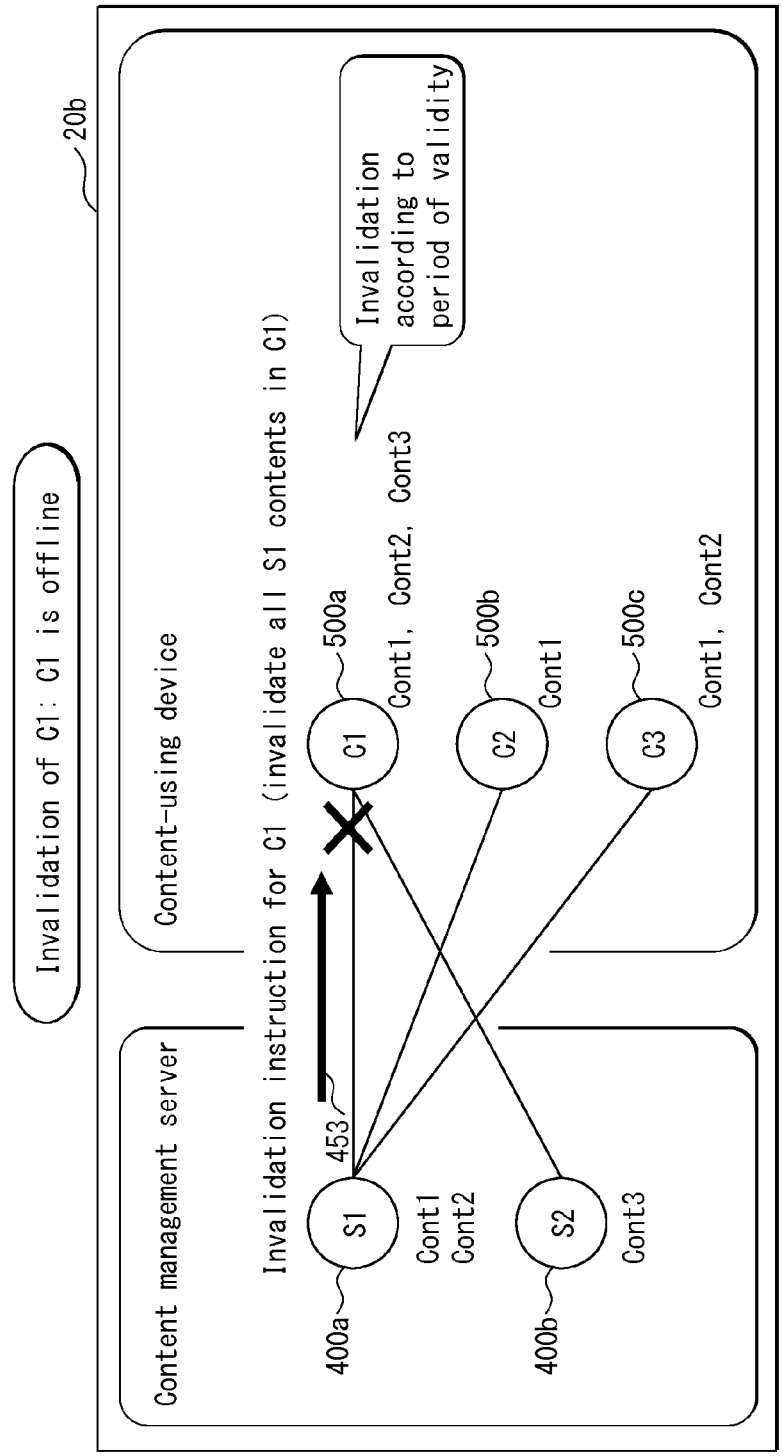
FIG. 36 illustrates operations in a case where, among contents held by one content-using device that is offline, invalidation is performed of all contents having been provided from one content management server.

(b) A Case where, Among Contents Held by One Content-Using Device that is Offline, Each Content Provided from One Content Management Server is Invalidated FIG. 36 illustrates a case where, among contents held by the content-using device 500a, each content provided from the content management server 400a is invalidated in accordance with an invalidation instruction from the content management server 400a. The reception of the invalidation instruction by the content management server 400a is performed as illustrated in FIG. 26. In addition, in the content distribution system 20b, the content-using device 500a is offline.

The content management server 400a acquires, from the content-using device list 121, an IP address corresponding to the content-using device 500a. Subsequently, the content management server 400a outputs an invalidation instruction 453 to the IP address acquired. The invalidation instruction 453 is an instruction for instructing the content-using device 500a to invalidate, among contents held by the content-using device 500a, each content provided from the content management server 400a.

In this case, since the content-using device 500a is offline, the content management server 400a does not receive a response from the content-using device 500a in response to the invalidation instruction 453. As such, after elapse of a predetermined interval, the content management server 400a determines that the content-using device 500a is offline. Subsequently, the content management server 400a displays, for instance, the screen 441b illustrated in FIG. 30 by referring to the content management list 131 illustrated in FIG. 8.

Figure 37:
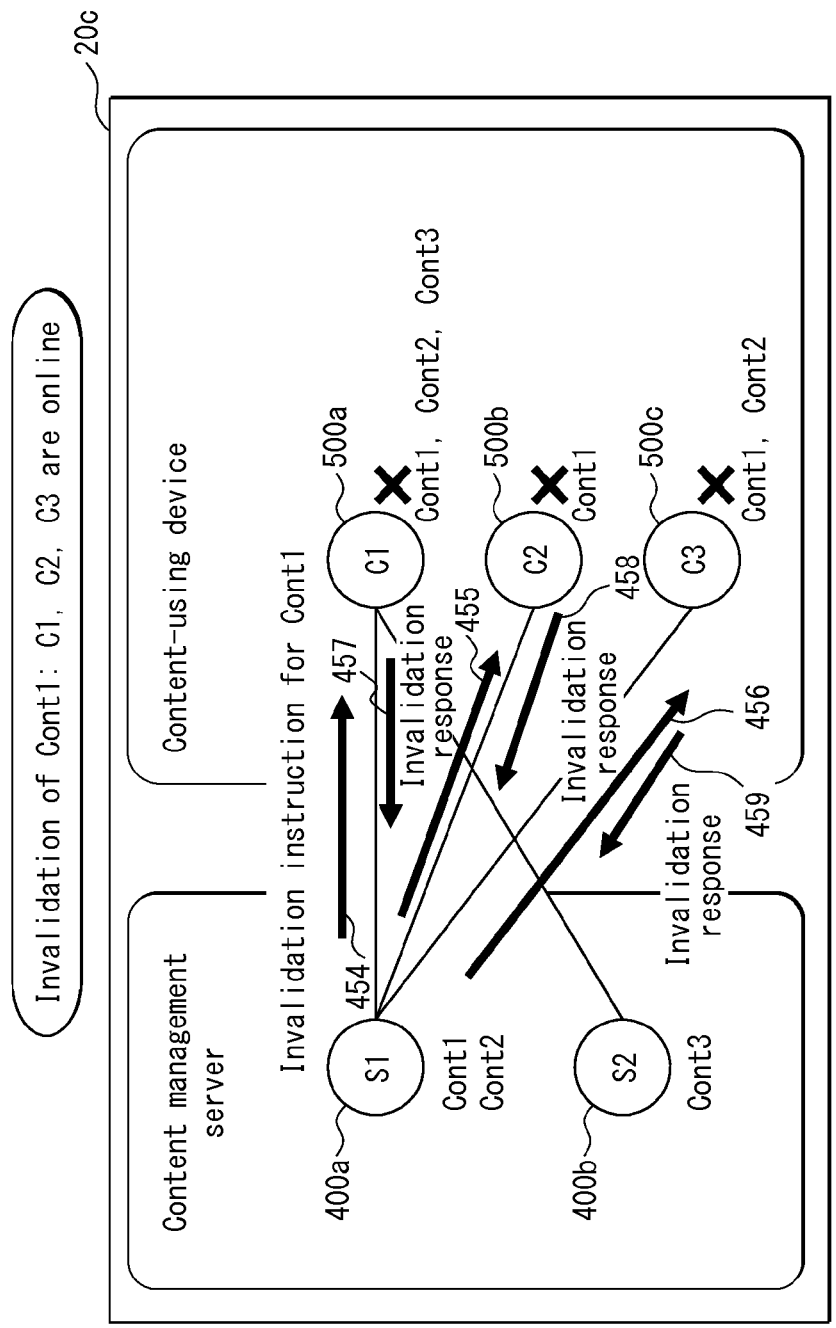
FIG. 37 illustrates operations in a case where invalidation of one content is performed with respect to multiple content-using devices that are online.

(c) A Case where One Content Similarly Held by Multiple Content-Using Devices that are Offline is Invalidated FIG. 37 illustrates a case where a content identified by a content ID "Cont1", which is similarly held by the content-using devices 500a, 500b, and 500c, is invalidated in accordance with an invalidation instruction from the content management server 400a. The reception of the invalidation instruction by the content management server 400a is performed as illustrated in FIG. 27. In addition, in the content distribution system 20c, each of the content-using devices 500a, 500b, and 500c is online.

In a similar manner as described above, the content management server 400a respectively outputs invalidation instructions 454, 455, and 456 to the IP addresses corresponding to the content-using devices 500a, 500b, and 500c. Each of the invalidation instructions 454, 455, and 456 is an instruction for instructing the corresponding one of the content-using devices 500a, 500b, and 500c to invalidate, among contents held by the corresponding one of the content-using devices 500a, 500b, and 500c, a content identified by the content ID "Cont1".

Each of the content-using devices 500a, 500b, and 500c, when receiving the corresponding one of the invalidation instructions 454, 455, and 456, invalidates the content identified by the content ID "Cont1". Subsequently, the content-using devices 500a, 500b, and 500c respectively return invalidation responses 457, 458, and 459, which indicate the completion of the invalidation, to the content management server 400a. The content management server 400a, when receiving the invalidation responses 457, 458, and 459, displays, for instance, the screen 441c illustrated in FIG. 31.

Figure 38:
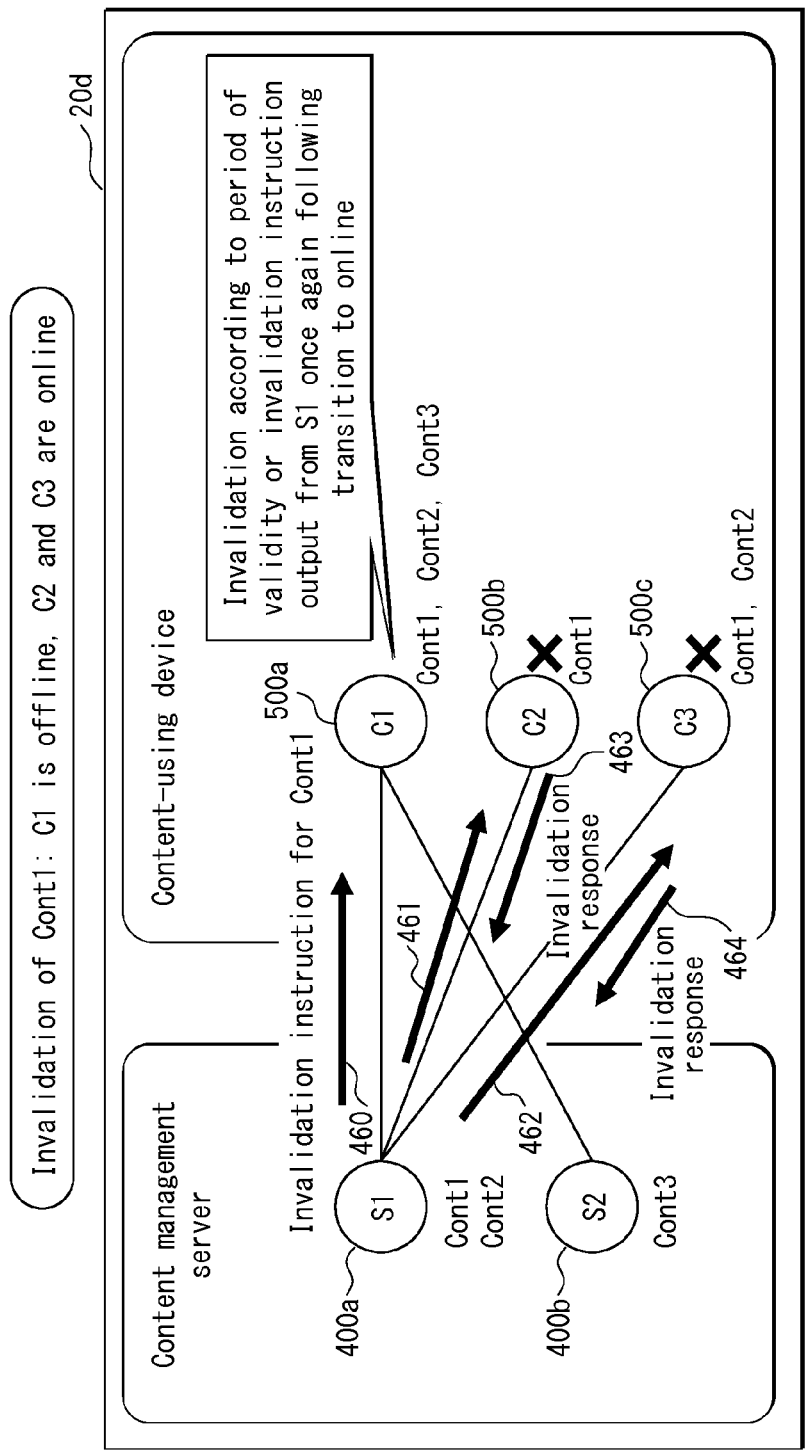
FIG. 38 illustrates operations in a case where invalidation of one content is performed with respect to multiple content-using devices, some of which being offline and the others being online.

(d) A Case where a Content Similarly Held by Multiple Content-Using Devices, Some of which being Online and the Rest being Offline, is Invalidated FIG. 38 illustrates a case where a content identified by a content ID "Cont1", which is similarly held by the content-using devices 500a, 500b, and 500c, is invalidated in accordance with an invalidation instruction from the content management server 400a. The reception of the invalidation instruction by the content management server 400a is performed as illustrated in FIG. 27. In addition, in the content distribution system 20d, the content-using device 500a is online, whereas the content-using devices 500b and 500c are offline.

In a similar manner as described above, the content management server 400a respectively outputs invalidation instructions 460, 461, and 462 to the IP addresses corresponding to the content-using devices 500a, 500b, and 500c. Each of the invalidation instructions 460, 461, and 462 is an instruction for instructing the corresponding one of the content-using devices 500a, 500b, and 500c to invalidate, among contents held by the corresponding one of the content-using devices 500a, 500b, and 500c, a content identified by the content ID "Cont1".

In this case, since the content-using device 500a is offline, the content management server 400a does not receive a response from the content-using device 500a in response to the invalidation instruction 460. As such, after elapse of a predetermined interval, the content management server 400a determines that the content-using device 500a is offline.

In the meantime, each of the content-using devices 500b and 500c invalidates the content identified by the content ID "Cont1". Subsequently, the content-using devices 500b and 500c respectively return invalidation responses 463 and 464, which indicate the completion of the invalidation, to the content management server 400a.

Subsequently, since the content-using device 500a is offline, the content management server 400a refers, for instance, to the content management list 131 illustrated in FIG. 8 and reads out a scheduled expiration time indicating the period of validity of the content identified by the content ID "Cont1". Subsequently, the content management server 400a displays, for instance, a screen 44d as illustrated in FIG. 32.

Note that playback of the content identified by the content name of "Cont1" in the content-using device 500a is automatically disabled when the time point indicated by the scheduled expiration time is reached. Further, when the content-using device 500a transitions from offline to online before the scheduled expiration time is reached, the content-using device 500a makes a notification of the transition from offline to online to the content management server 400a. As such, the content management server 400a need only issue an invalidation instruction once again with respect to the content-using device 500a when such a notification indicating the transition from offline to online is received from the content-using device 500a.

3.6. Effects Achieved by Embodiment 3

In embodiment 3, when a corresponding content-using device is online when an invalidation instruction for invalidating a content is received from a user, immediate invalidation of the content is performed by the content-using device. On the other hand, when a corresponding content-using device is offline when an invalidation instruction for invalidating a content is received from a user, the user is notified of when the content will be invalidated in the content-using device.

As such, when a user provides contents to a content-using device corresponding to another user and later invalidates all of the contents he/she has provided to the content-using device corresponding to the other user due to reasons such as a change in the relationship with the other user, the user is able to know when the invalidation of the contents will be completed. As such, the user is able to perform the invalidation of the contents free of concerns.

In addition, when a user desires to invalidate a content which has been distributed to an unidentified number of content-using devices due to he/she having made an operational mistake, the user is able to know the total number of content-using devices to which the content has been distributed. Further, in such a case, the user is able to know in how many of the content-using devices the content will be immediately invalidated online. Further in addition, the user is able to know when a specific content will be invalidated from all existing content-using devices, including offline devices, to which the content has been provided. As such, the user is able to perform the invalidation of contents free of concerns.

4. Embodiment 4

In the following, description is provided on a content distribution system 30 pertaining to embodiment 4 of the present invention, with reference to the accompanying drawings.

The content distribution system 30 differs from the content distribution system 10 in that a content-using device in the content distribution system 30 performs polling at regular intervals with respect to a content management server in the content distribution system 30. Due to this, the content management server is able to determine only the content-using device performing polling with respect to the content management server as being online while the other content-using devices, which do not perform polling, are determined as being offline.

4.1 Overall Configuration of Content Distribution System 30

Figure 39:
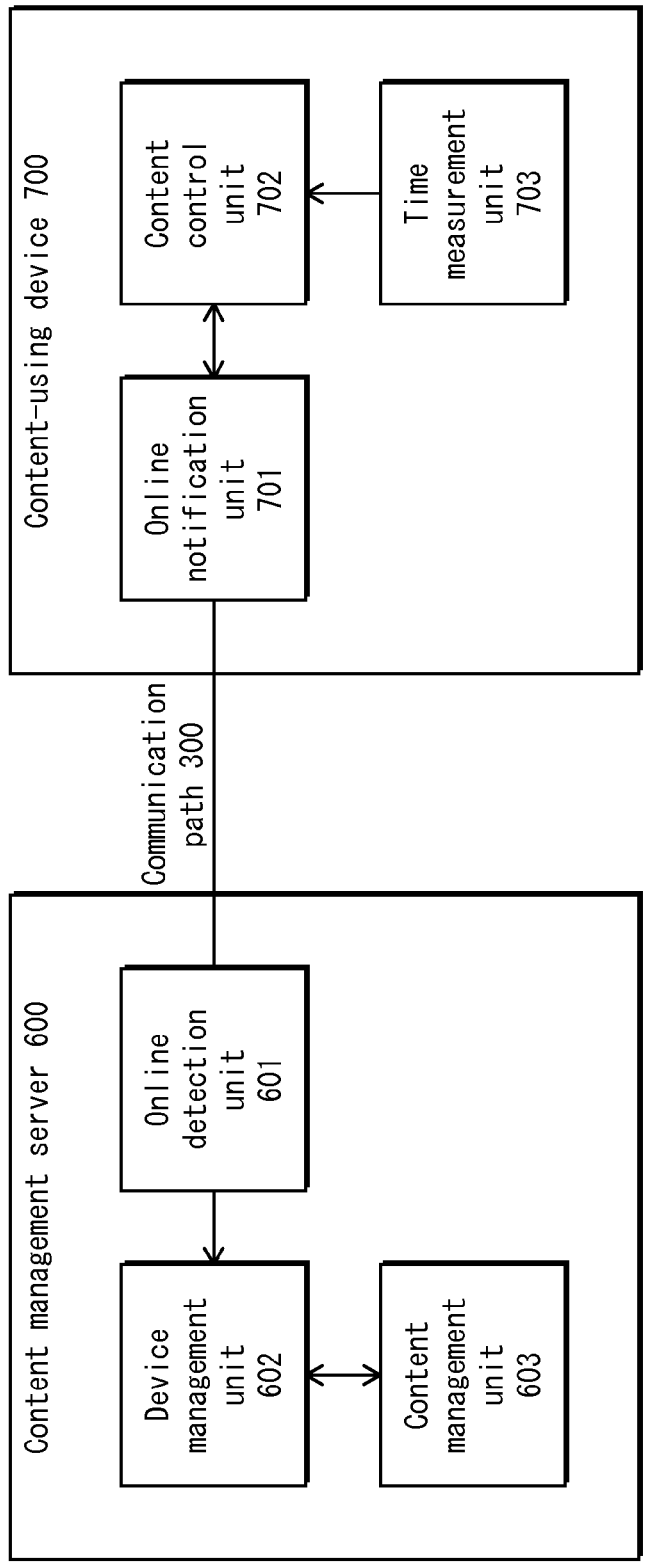
FIG. 39 illustrates an overall configuration of a content distribution system 30 in embodiment 4, including a configuration of a content management server 600 and a configuration of a content-using device 700.

FIG. 39 illustrates an overall configuration of the content distribution system 30. The content distribution system 30 includes: a content management server 600; a content-using device 700; and the communication path 300 between the content management server 600 and the content-using device 700.

Note that in the content distribution system 30, constituent elements provided with the same reference signs as in the content distribution system 10 indicate the same constituent elements as those in the content distribution system 10.

Further, similar as the content distribution system 10, the content distribution system 30 may include two or more content management servers and two or more content-using devices. Further, when multiple content management servers and multiple content-using devices are included in the content distribution system 20, the content management servers and the content-using devices may be interconnected via a network.

4.2 Configuration of Content Management Server 600

FIG. 39 also illustrates a configuration of the content management server 600. The content management server 600 includes: an online detection unit 601; a device management unit 602; and a content management unit 603.

4.2.1 Configuration of Online Detection Unit 601

Figure 40:
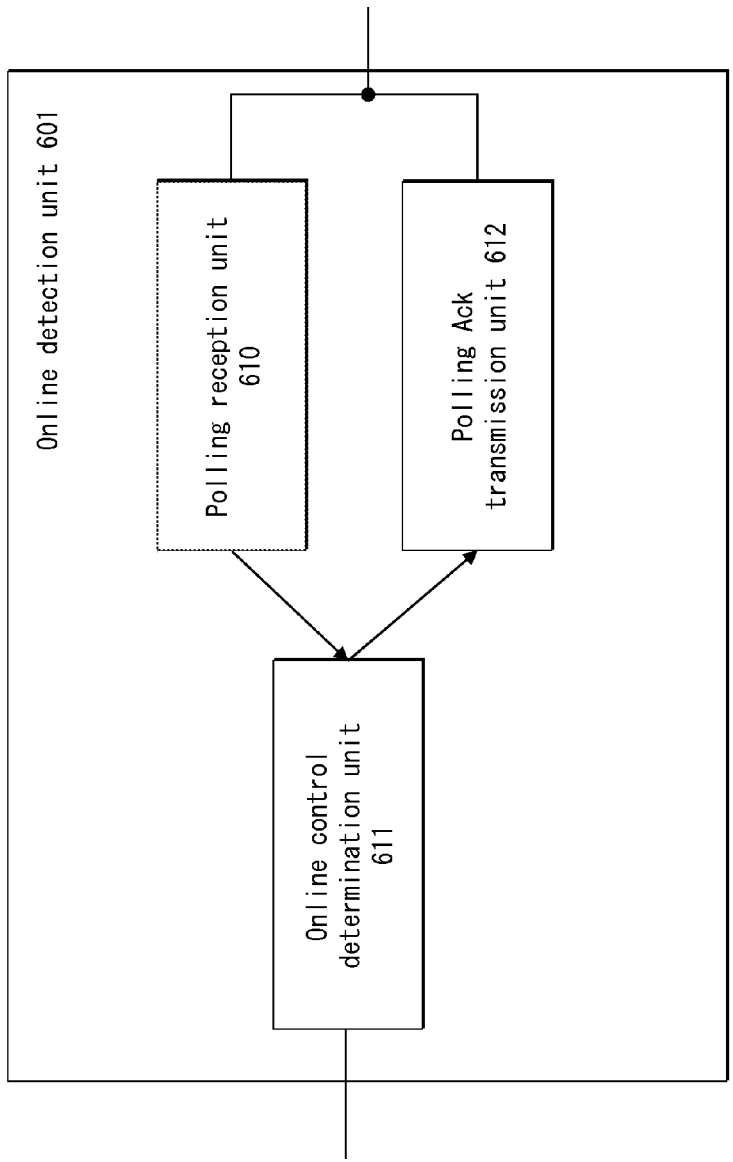
FIG. 40 illustrates a configuration of an online detection unit 601.

FIG. 40 illustrates a configuration of the online detection unit 601. The online detection unit 601 includes: a polling reception unit 610; an online control determination unit 611; and a polling Ack transmission unit 612.

(Polling Reception Unit 610)

The polling reception unit 610 receives a polling command from the content-using device 700. The polling reception unit 610 outputs information included in the polling command received to the online control determination unit 611.

(Online Control Determination Unit 611)

The online control determination unit 611 determines a content-using device that is online according to the information included in the polling command (e.g., an IP address) received from the polling reception unit 610. Further, the online control determination unit 611 instructs the polling Ack transmission unit 612 to transmit a polling Ack.

The online control determination unit 611 transmits information pertaining to the content-using device having transmitted the polling command, along with the time point at which the polling command has been received, to the device management unit 602. Here, the information pertaining to the content-using device is, for instance, an IP address.

(Polling Ack Transmission Unit 612)

The polling Ack transmission unit 612, when receiving the instruction for transmitting a polling Ack from the online control determination unit 611, generates a polling Ack. Subsequently, the polling Ack transmission unit 612 transmits the polling Ack to the content-using device from which the polling command has been transmitted.

4.2.2 Device Management Unit 602

Figure 41:
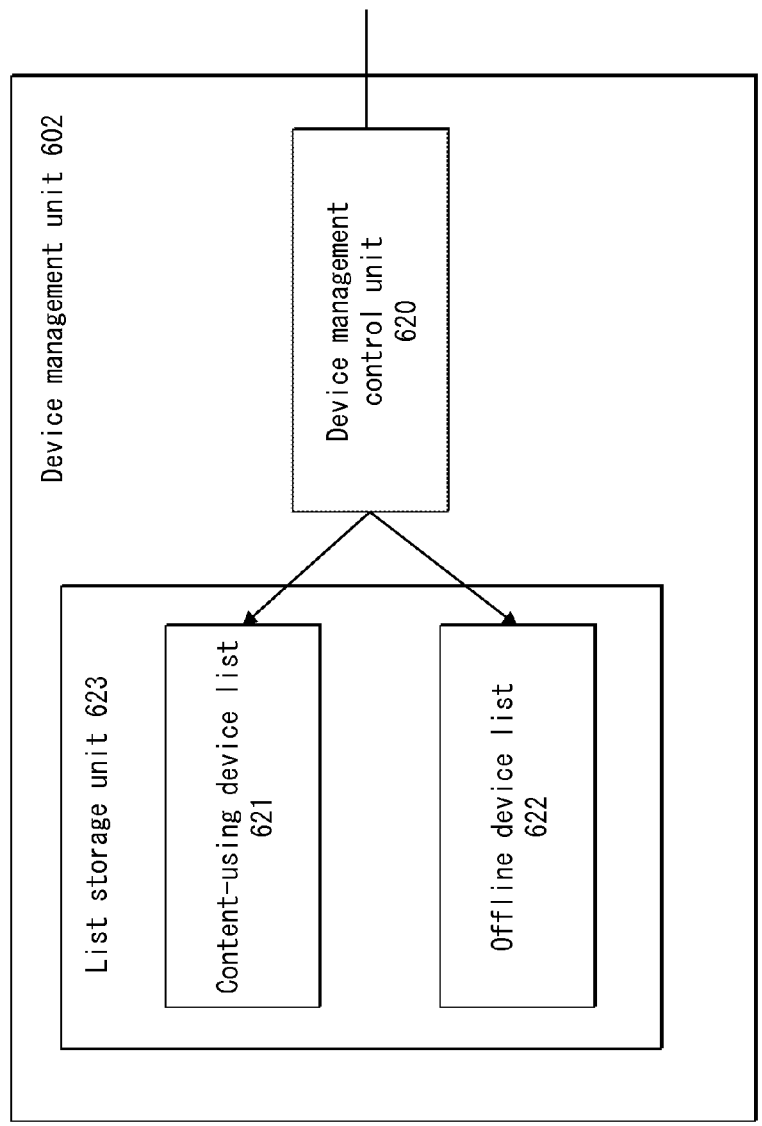
FIG. 41 illustrates a configuration of a device management unit 602.

FIG. 41 illustrates a configuration of the device management unit 602. The device management unit 602 includes: a device management control unit 620; and a list storage unit 623. The list storage unit 623 holds a content-using device list 621 and an online device list 622.

(Content-Using Device List 621)

FIG. 42 is a chart indicating one example of a data configuration of the content-using device list 621. The content-using device list 621 stores, in an associated state, each content-using device receiving a content from the content management server 600 and a corresponding connection destination. Here, the connection destination of a content-using device is, for instance, an IP address.

In specific, the content-using device list 621 is provided with areas for storing multiple content-using device information pieces. Each content-using device information piece includes a content-using device name and an IP address. A content-using device name is a name identifying a content-using device, and an IP address indicates a location on an IP network at which the content-using device is located.

(Online Device List 622)

FIG. 43 is a chart indicating one example of a data configuration of the online device list 622. The online device list 622 is provided with areas for storing multiple online device information pieces. Each online device information piece includes an online device name and a final access time. An online device name is a name identifying a content-using device determined as being online. A final access time indicates a time point at which the content-using device most recently accessed the content management server 600. More specifically, a final access time includes indication of the month, the day, and the time corresponding to the last time the content-using device accessed the content management server 600.

The online device list 622 includes, for instance, an online device information piece including "C1" in an online device name field 624 and "1/21, 23:00" in a final access time field 625. This online device information piece indicates that the content management server 600 most recently received a polling command from the content-using device indicated by "C1" in the online device name field 624 at 23:00, January $21^{st}$ as indicated in the final access time field 625. The storing of the final access time and the content-using device name as the online device name in the online device list 622 was performed at 23:00, January $21^{st}$. The indication in the final access time field 625 indicates the time point at which the content-using device "C1" most recently accessed the content management server 600. In other words, according to the online device list 622, the content-using device "C1" has not accessed the content management server 600 since 23:00, January $21^{st}$.

(Device Management Control Unit 620)

The device management control unit 620 controls the writing, the reading out, and the updating of content-using device information with respect to the content-using device list 621. The device management control unit 620 also controls the writing, the reading out, and the updating of online device information with respect to the online device list 622. The device management control unit 620 receives, from the online detection unit 601, information pertaining to a content-using device (e.g., an IP address of the content-using device), and reads out, from the content-using device list 621, a corresponding content-using device name.

In addition, the device management control unit 620, when updating the online device list 622, transmits an updated online device name and an updated final access time to the content management unit 603.

4.2.3 Content Management Unit 603

Figure 44:
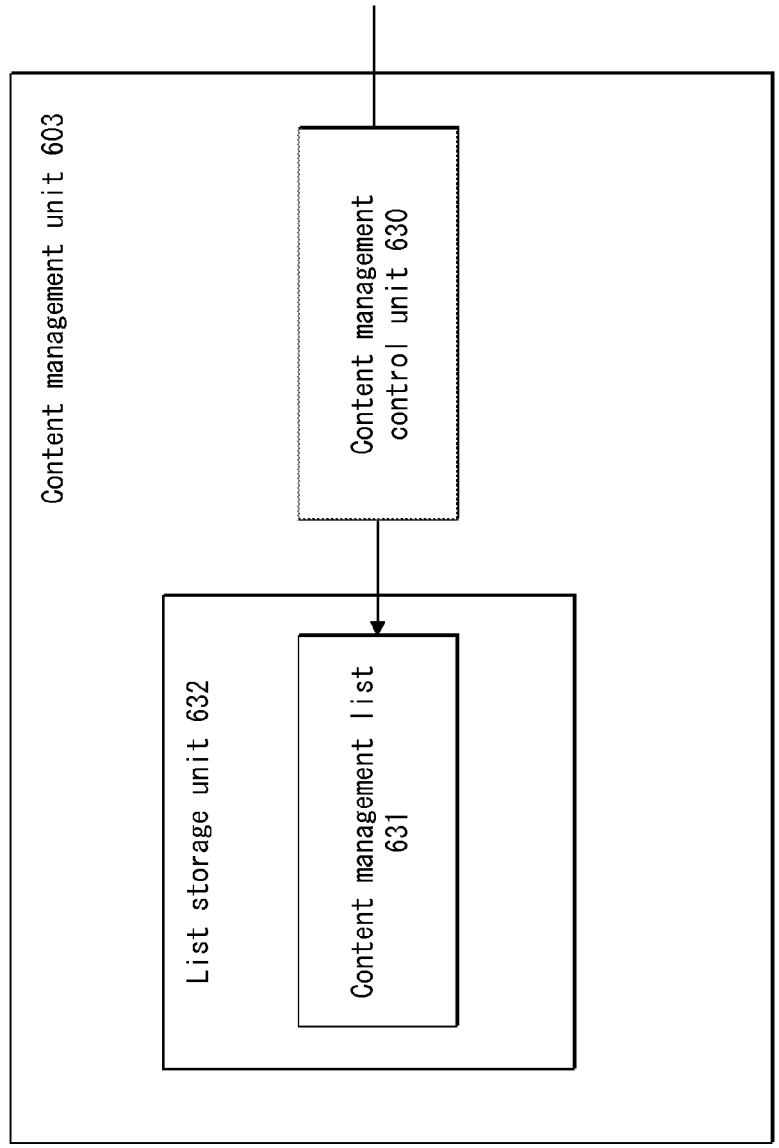
FIG. 44 illustrates a configuration of a content management unit 603.

FIG. 44 illustrates a configuration of the content management unit 603. The content management unit 603 includes: a content management control unit 630; and a list storage unit 632. The list storage unit 632 holds a content management list 631.

(Content Management List 631)

FIG. 45 is a chart indicating one example of a data configuration of the content management list 631.

The content management list 631 is provided with areas for storing multiple management information pieces. Each management information piece includes: one content ID; one validity duration; and zero, one, or multiple usage device information pieces. That is, a management information piece includes either (i) a combination of one content ID and one validity duration or (ii) a combination of one content ID, one validity duration, and one or more usage device information pieces. A management information piece including a combination of one content ID and one validity duration indicates an initial state. When a management information piece is in the initial state, one or more usage device information pieces may be added thereto. Further, when a management information piece includes one or more usage device information pieces, one or more usage device information pieces may further be added to the management information piece.

A content ID is identification information uniquely identifying a content. A validity duration is in correspondence with a content ID and indicates a time period (a duration) from the point at which the content identified by the content ID is distributed, during which the use of the content by content-using devices is permitted. A content-using device name identifies a content-using device. The content-using device identified by the content-using device name uses the content identified by the corresponding content ID. A scheduled expiration time is calculated from the point at which the corresponding content has been distributed to the corresponding content-using device and indicates a time point at which the period of validity of use of the content by the content-using device expires.

(Content Management Control Unit 630)

The content management control unit 630 controls the writing, the reading out, and the updating of management information with respect to the content management list 631.

In specific, when a content is provided to a content-using device, the content management control unit 630 receives a content ID identifying the content, a content-using device name identifying the content-using device, and a distribution time at which the content has been distributed to the content-using device. Subsequently, the content management control unit 630 uses the content ID identifying the distributed content and thereby reads out, from the content management list 631, a management information piece including the content ID. Subsequently, the content management control unit 630 extracts a validity duration from the management information piece read out. Subsequently, the content management control unit 630 sets a scheduled expiration time by adding the validity duration to the distribution time.

Scheduled Expiration Time=Distribution Time+Validity Duration

Subsequently, the content management control unit 630 writes and thereby adds a usage device information piece including the content-using device name and the scheduled expiration time to the management information piece read out from the content management list 631.

In addition, when receiving a content-using device name and a final access time from the device management control unit 620, the content management control unit 630 updates the scheduled expiration time set with respect to the content-using device identified by the content-using device name received by adding the validity duration to the final access time.

More specifically, the content management control unit 630 reads out, from the content management list 631, a management information piece including a content-using device name of a content-using device that is online. Subsequently, the content management control unit 630 extracts a validity duration from the management information piece read out, and extracts a usage device information piece including the content-using device name from the management information piece read out. Subsequently, the content management control unit 630 adds the validity duration extracted to the final access time received and sets the time obtained as a result of the addition as the scheduled expiration time.

Scheduled Expiration Time=Final Access Time+Validity Duration

Subsequently, the content management control unit 630 overwrites the scheduled expiration time included in the usage device information piece having been extracted by using the scheduled expiration time obtained as a result of the calculation. Subsequently, the content management control unit 630 writes back the usage device information piece including an overwritten scheduled expiration time to the content management list 631.

(Content Management List 631)

The content management list 631 includes a management information piece 639 as illustrated in FIG. 45. The management information piece 639 includes: "Cont1" in a content ID field 633; "24H" in a validity duration field 634; "C1" in a content-using device name field 635; "1/21, 00:00" in a scheduled expiration time field 636; "C2" in a content-using device name field 637; and "1/21, 00:00" in a scheduled expiration time field 638.

The management information piece 639 indicates, for instance, that the content identified by "Cont1" in the content ID field 633 has been distributed at 00:00, January 20th to the content-using devices identified by "C1" in the content-using device name field 635 and "C2" in the content-using device name field 637. Further, the management information piece 639 indicates that "24H" is the validity duration of the content identified by "Cont1" in the content ID field 633. As such, the scheduled expiration time of the content "Cont1" with respect to each of the content-using devices identified by "C1" in the content-using device name field 635 and "C2" in the content-using device name field 637 is calculated as "1/21, 00:00" as indicated in the scheduled expiration time fields 636 and 638, which is later by "24H" in the validity duration field 634 than the distribution time "1/20, 00:00".

(Content Management List 631a)

FIG. 46 is a chart indicating one example of a data configuration of a content management list 631a, which is another example of the content management list 631.

The content management list 631a includes a management information piece 639a and a management information piece 646a as illustrated in FIG. 46. The management information piece 639a includes: "Cont1" in the content ID field 633; "24H" in the validity duration field 634; "C1" in the content-using device name field 635; "1/21, 23:00" in a scheduled expiration time field 636a; "C2" in the content-using device name field 637; and "1/21, 00:00" in the scheduled expiration time field 638. The management information piece 646a includes: "Cont2" in a content ID field 640; "48H" in a validity duration field 641; "C1" in a content-using device name field 642; "1/22, 23:00" in a scheduled expiration time field 643a; "C3" in a content-using device name field 644; and "1/22, 00:00" in a scheduled expiration time field 645.

For instance, when an online device name "C1" and a final access time "1/20, 23:00" are received from the device management control unit 620, first, the management information piece 639 including the device name "C1" as the content-using device name is read out from the content management list 631, and then, extraction is performed of "24H" in the validity duration field 634 in the management information piece 639 and the usage device information piece including the device name "C1" as the content-using device name. Subsequently, the time point "1/21, 23:00" is calculated by adding "24H" in the validity duration field 634 extracted to the final access time "1/20, 23:00". Subsequently, overwriting is performed of "1/21, 00:00" in the scheduled expiration time field 636 in the usage device information piece extracted by setting the time point "1/21, 23:00" obtained as a result of the calculation as the scheduled expiration time. Subsequently, the usage device information piece including the overwritten scheduled expiration time of "1/21, 23:00" is written back to the management information piece 639 in the content management list 631. As such, the management information piece 639a includes "1/21, 23:00" in the scheduled expiration time field 636a as in the content management list 631a illustrated in FIG. 46.

In addition, similar as in the above, the management information piece 646 including the device name "C1" as the content-using device name is read out from the content management list 631. Then, extraction is performed of "48H" in the validity duration field 641 in the management information piece 646 and the usage device information piece including the device name "C1" as the content-using device name. Subsequently, the time point "1/22, 23:00" is calculated by adding "48H" in the validity duration field 641 extracted to the final access time "1/20, 23:00". Subsequently, overwriting is performed of "1/22, 00:00" in the scheduled expiration time field 643 in the usage device information piece extracted by setting the time point "1/22, 23:00" obtained as a result of the calculation as the scheduled expiration time. Subsequently, the usage device information piece including the overwritten scheduled expiration time of "1/22, 23:00" is written back to the management information piece 646 in the content management list 631. As such, the management information piece 646a includes "1/22, 23:00" in the scheduled expiration time field 643a as in the content management list 631a illustrated in FIG. 46.

The updating of the content management list 631 illustrated in FIG. 45 is performed in such a manner as described above, whereby the content management list 631a illustrated in FIG. 46 is obtained. Compared with the content management list 631, the content management list 631a includes updated scheduled expiration times in the scheduled expiration time fields 636a and 643a.

4.3 Content-Using Device 700

FIG. 39 illustrates a configuration of the content-using device 700. The content-using device 700 includes: an online notification unit 701; a content control unit 702; and a time measurement unit 703.

4.3.1 Online Notification Unit 701

Figure 47:
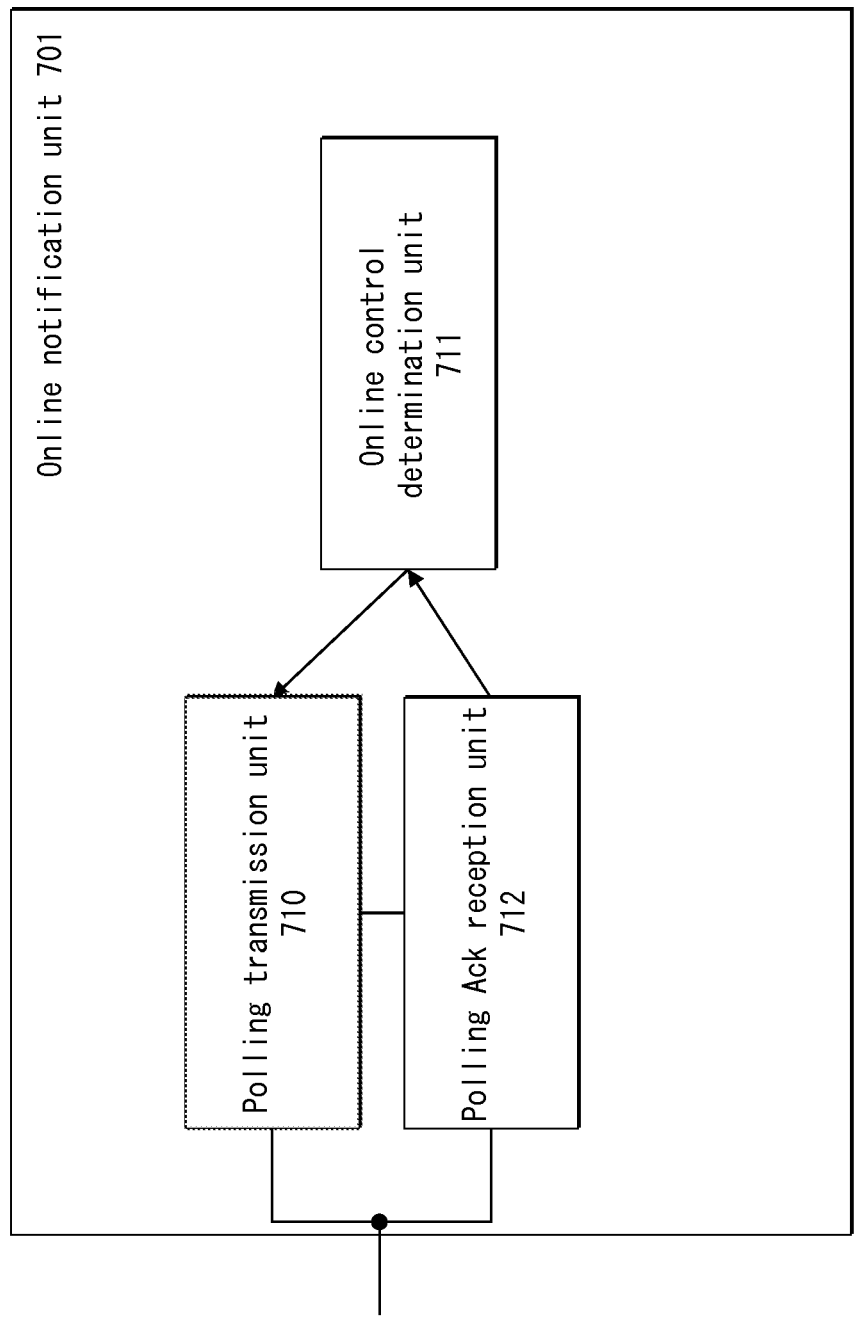
FIG. 47 illustrates a configuration of an online notification unit 701.

FIG. 47 illustrates a configuration of the online notification unit 701. The online notification unit 701 includes: a polling transmission unit 710; an online control determination unit 711; and a polling Ack reception unit 712.

(Polling Transmission Unit 710)

The polling transmission unit 701 receives a polling transmission instruction and information pertaining to an address to which a polling command is to be transmitted from the online control determination unit 711. When receiving the polling transmission instruction and the information pertaining to the address, the polling transmission unit 701 transmits a polling command to the content management server 600. Following the transmission of the polling command, the polling transmission unit 701 transmits information pertaining to the transmission destination and a transmission time at which the polling command has been transmitted to the polling Ack reception unit 712.

(Online Control Determination Unit 711)

The online control determination unit 711 determines whether the content-using device 700 is online or offline. For instance, the online control determination unit 711 determines whether the content-using device 700 is online or offline by determining whether or not a polling Ack is received from the content management server 600 in response to a polling command having been transmitted. That is, the online control determination unit 711 determines that the content-using device 700 is online when a polling Ack is received from the content management server 600. On the other hand, the online control determination unit 711 determines that the content-using device 700 is offline when a polling Ack is not received from the content management server 600.

Alternatively, the online control determination unit 711 may determine whether the content-using device 700 is online or offline by determining whether or not a communication module in the content-using device 700 is activated or not.

Alternatively, when the content-using device 700 performs wireless communication, the online control determination unit 711 may determine whether or not the content-using device 700 is online or offline by determining whether or not the content-using device 700 is located within a distance from an access point within which radio signals transmitted from the content-using device 700 reach the access point.

In addition, the online control determination 711 may determine that the content-using device 700 is not online when a transmission error is received from a router when performing polling.

When determining that the content-using device 700 is online, the online control determination unit 711 transmits, to the polling transmission unit 710, the polling transmission instruction along with the information pertaining to the address of the content management server 600. In addition, the content-using device 700, when receiving a notification of a scheduled expiration time of a content from the content control unit 702, outputs a polling transmission instruction to the polling transmission unit 710 before the scheduled expiration time is reached. The online control determination unit 711 receives, from the polling Ack reception unit 712, a polling Ack transmitted from the content management server 600. Subsequently, the online control determination unit 711 outputs, to the content control unit 702, a content management server name and a transmission time indicating the time point at which the polling has been performed.

(Polling Ack Reception Unit 712)

The polling Ack reception unit 712 receives a polling Ack from the content management server 600. By receiving the polling Ack from the content management server 600, the polling Ack reception unit 712 determines that a notification has been made to the content management server 600 that the content-using device 700 is online. Subsequently, the polling Ack reception unit 712 notifies the online control determination unit 711 that a notification has been made to the content management server 600 that the content-using device 700 is online.

4.3.2 Content Control Unit 702

Figure 48:
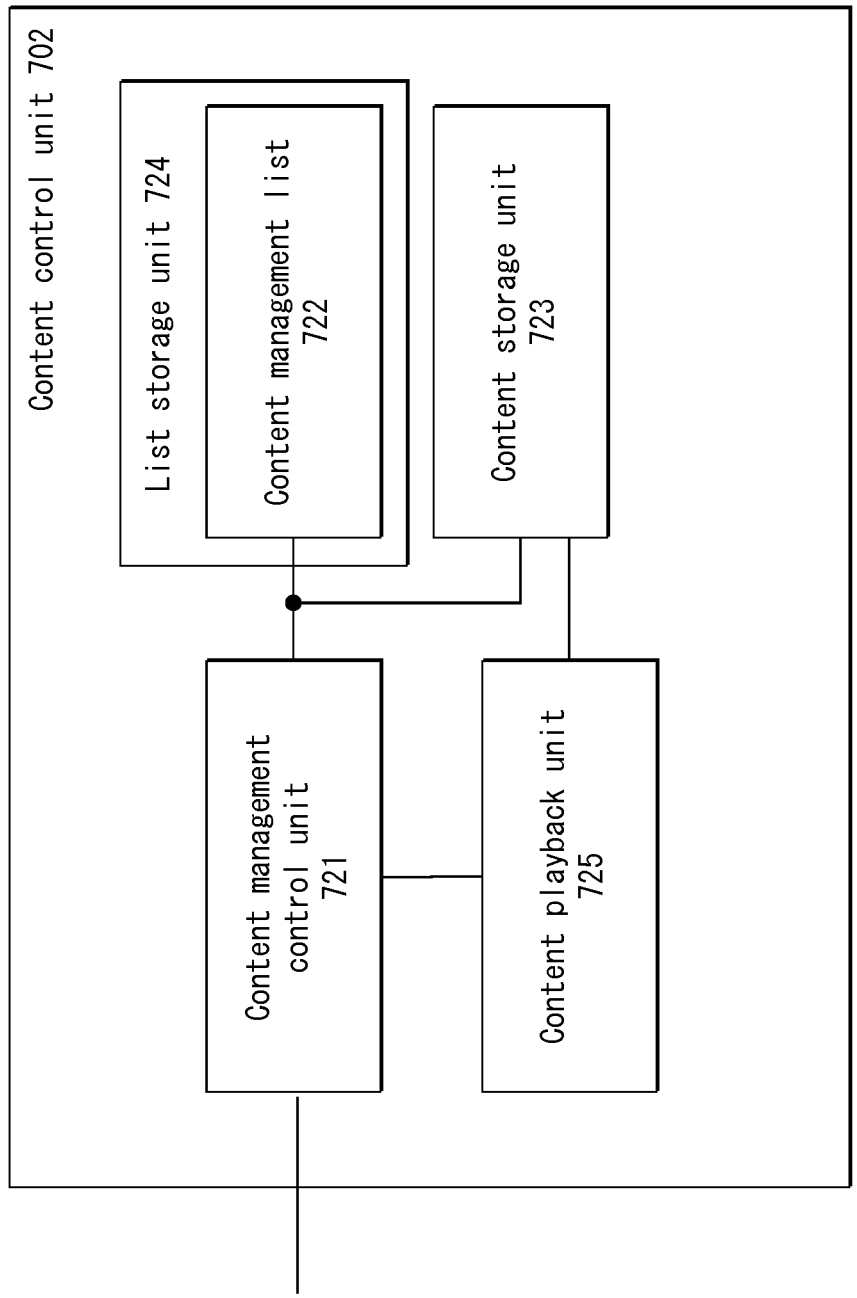
FIG. 48 illustrates a configuration of a content control unit 702.

FIG. 48 illustrates a configuration of the content control unit 702. The content control unit 702 includes: a content management control unit 721; a list storage unit 724; a content storage unit 723; and a content playback unit 725. The list storage unit 724 holds a content management list 722.

(Content Management Control Unit 721)

The content management control unit 721 manages a content stored in the content-using device 700 by using the content management list 722, detailed description of which is provided in the following. The content management control unit 721 refers to a scheduled expiration time included in the content management list 722, and when the scheduled expiration time indicates that the use of a corresponding content is permitted, controls the content playback unit 725 such that the use of the corresponding content stored in the content storage unit 723 is enabled. In contrast, when the scheduled expiration time included in the content management list 722 has already passed, the content management control unit 721 controls the content playback unit 725 so as to stop the use of the corresponding content stored in the content storage unit 723. In addition, when referring to a scheduled expiration time included in the content management list 722, the content management control unit 721 makes a notification to the online control determination unit 711. In addition, when receiving the content management server name and the polling transmission time from the online control determination unit 711, the content management control unit 721 updates a scheduled expiration time included in the content management list 722 as described in the following.

(Content Management List 722)

The content management list 722 is a list for managing contents received from the content management server 600. FIG. 49 is a chart indicating one example of a data configuration of the content management list 722. The content management list 722 is provided with areas for storing multiple management information pieces. Each management information piece includes a content ID, a validity duration, a content management server name, and a scheduled expiration time. A content ID is identification information uniquely identifying a content. A validity duration is in correspondence with a content ID and indicates a duration during which the use of the content by content-using devices is permitted. A content management server name is a name identifying a content management server that has transmitted the corresponding content. A scheduled expiration indicates a time point at which a period of validity, during which the content-using device 700 is permitted to use the content, expires.

The content management list 722 includes, for instance, a management information piece 731, a management information piece 732, and a management information piece 733, as illustrated in FIG. 49.

The management information piece 731 includes: "Cont1" in a content ID field 734; "24H" in a validity duration field 735; "S1" in a content management server name field 736; and "1/21, 00:00" in a scheduled expiration time field 737.

The management information piece 731 indicates a situation as follows. The content identified by "Cont1" in the content ID field 734 has been supplied from the content management server identified by "S1" in the content management server name field 736. Further, the period during which the content-using device 700 is permitted to use the content "Cont1" is "24H" as indicated in the validity duration field 735. In addition, the period during which the content-using device 700 is permitted to use the content "Cont1" ends at "1/21, 00:00" as indicated in the scheduled expiration time field 737. Here, "1/21, 00:00" in the scheduled expiration time field 737 is calculated by adding "24H" in the validity duration field 733 to a time point at which the content "Cont1" has been received from the content management server "S1".

The management information piece 732 includes: "Cont2" in a content ID field 738; "48H" in a validity duration field 739; "S1" in a content management server name field 740; and "1/22, 00:00" in a scheduled expiration time field 741. The management information piece 732 indicates a situation as follows. The content identified by "Cont2" in the content ID field 738 has been supplied from the content management server identified by "S1" in the content management server name field 740. Further, the period during which the content-using device 700 is permitted to use the content "Cont2" is "48H" as indicated in the validity duration field 739. In addition, the period during which the content-using device 700 is permitted to use the content "Cont2" ends at "1/22, 00:00" as indicated in the scheduled expiration time field 741. Here, "1/22, 00:00" in the scheduled expiration time field 741 is calculated by adding "48H" in the validity duration field 739 to a time point at which the content "Cont2" has been received from the content management server "S1".

The management information piece 733 includes: "Cont3" in a content ID field 742; "24H" in a validity duration field 743; "S2" in a content management server name field 744; and "1/21, 23:30" in a scheduled expiration time field 745. Since the situation indicated by the management information piece 733 is obvious when referring to the above, description thereon is omitted herein.

(Content Management List 722a)

FIG. 50 is a chart indicating one example of a data configuration of a content management list 722a, which is another example of the content management list 722. The content management control unit 721, when receiving a content management server name and a polling transmission time from the online control determination unit 711, updates a scheduled expiration time in the content management list 722.

For instance, in the example of the case indicated by the content management list 722a illustrated in FIG. 50, the content management control unit 721 has received a content management server name "S1" and a polling transmission time "1/20, 23:00" from the online control determination unit 711. In such a case, the content management control unit 721 updates a scheduled expiration time for each content corresponding to the content management server "S1" such that each scheduled expiration time indicates a time point calculated by adding the corresponding validity duration to the polling transmission time "1/20, 23:00". For instance, when taking as an example the content "Cont1", updating of the scheduled expiration time is performed such that the updated scheduled expiration time indicates "1/21, 23:00", which is calculated by adding the corresponding validity duration of "24H" to the polling transmission time "1/20, 23:00". Further, when taking as an example the content "Cont2", updating of the scheduled expiration time is performed such that the updated scheduled expiration time indicates "1/22, 23:00", which is calculated by adding the corresponding validity duration of "48H" to the polling transmission time "1/20, 23:00". As a result, the content management list 722a illustrated in FIG. 50 includes "1/21, 23:00" in a scheduled expiration time field 737a instead of "1/21, 00:00" in the scheduled expiration time 737 included in the content management list 722, and includes "1/22, 23:00" in a scheduled expiration time field 741a instead of "1/22, 00:00" in the scheduled expiration time field 741 included in the content management list 722.

4.4 Operations of Content Distribution System 30 (Part 1)

In the following, description is provided on operations of the content distribution system 30.

Figure 51:
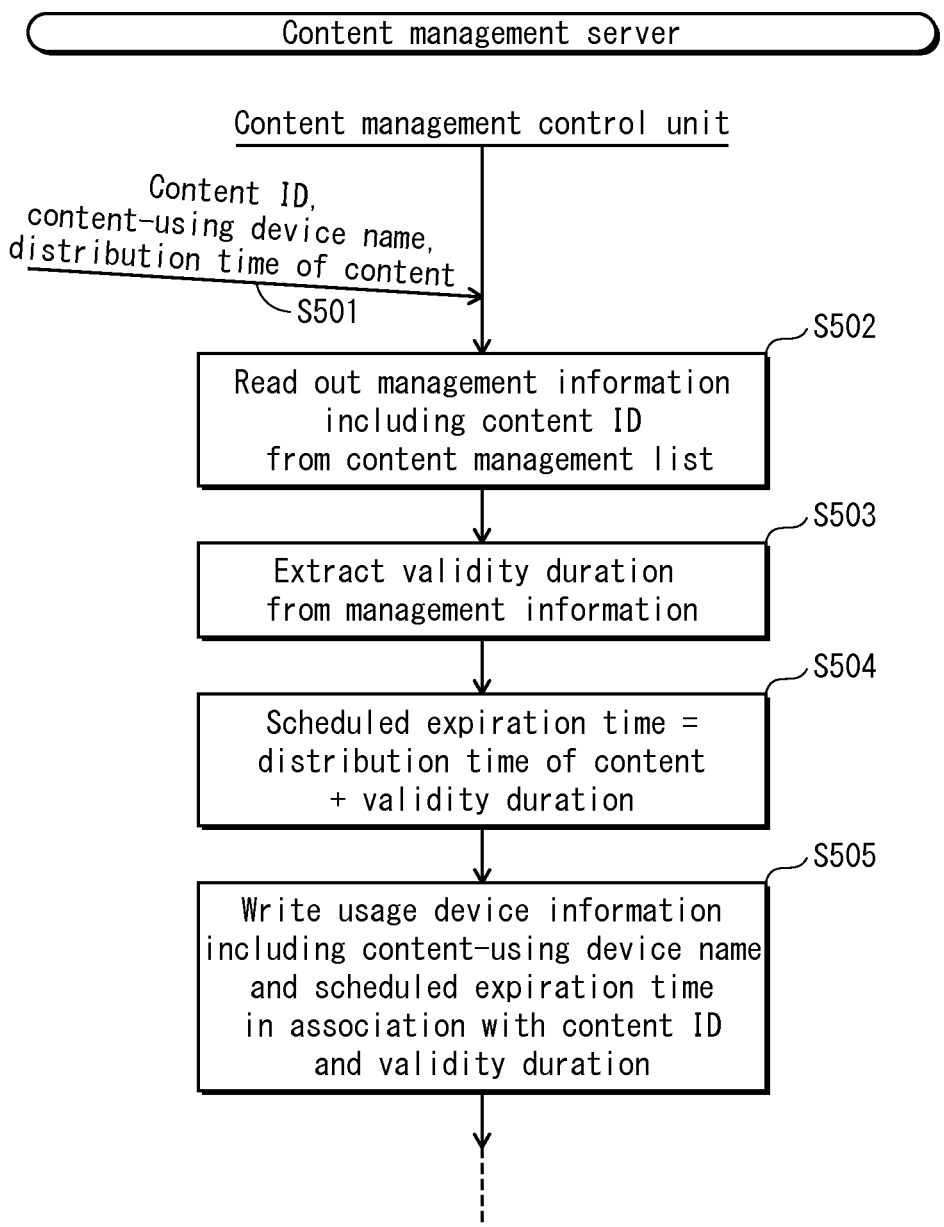
FIG. 51 is a flowchart illustrating operations involved in updating of the content management list 631 by a content management control unit 630.

(1) Operations of Content Management Server 600 when a Contents is Provided to a Content-Using Device In the following, description is provided on operations involved in the updating of the content management list 631 by the content management control unit 630 when a content is provided from the content management server 600 to a content-using device, with reference to the flowchart illustrated in FIG. 51.

When a content is provided to a content-using device, the content management control unit 630 receives a content ID identifying the content, a content-using device name identifying the content-using device, and a distribution time at which the content has been distributed (Step S501).

Subsequently, the content management control unit 630, reads out, from the content management list 631, a management information piece including the content ID and the content-using device name received (Step S502). Subsequently, the content management control unit 630 extracts a validity duration from the management information piece read out (Step S503). Subsequently, the content management control unit 630 adds the validity duration read out to the distribution time received, and sets the time point obtained as a result of the calculation as a scheduled expiration time (Step S504). Subsequently, the content management control unit 630 generates a usage device information piece including the content-using device name and the scheduled expiration time. Further, the content management control unit 630 writes, to the content management list 631, the usage device information piece so generated in association with the content ID and the validity duration (Step S505).

Figure 52:
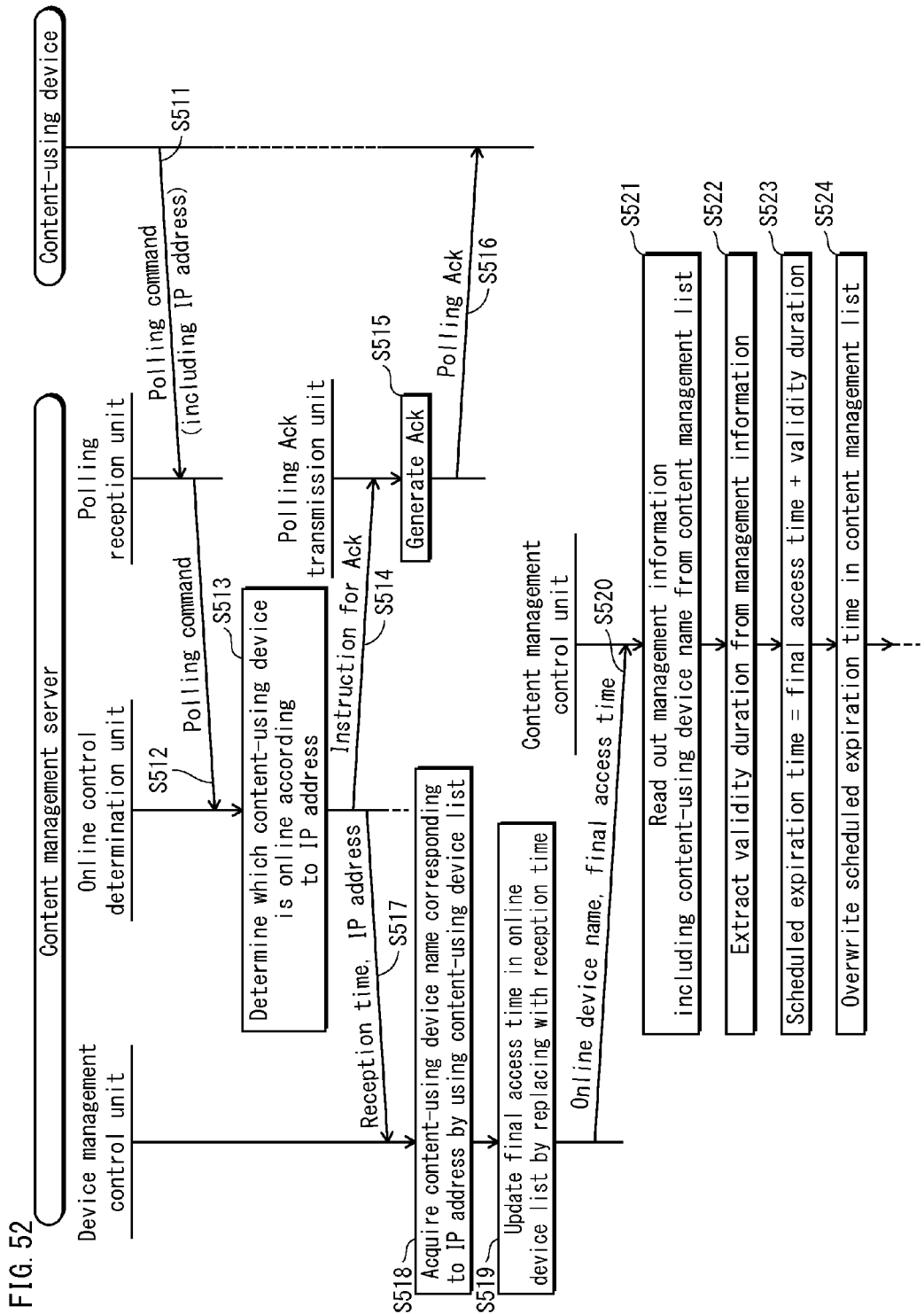
FIG. 52 is a sequence diagram illustrating operations of the content-using device 600 when receiving a polling command from the content-using device 700.

(2) Operations of Content Management Server 600 when Receiving a Polling Command In the following, description is provided on operations of the content management server 600 when receiving a polling command from the content-using device 700, with reference to the sequence diagram illustrated in FIG. 52.

The polling reception unit 610 receives a polling command including an IP address from the content-using device 700 (Step S511). Subsequently, the polling reception unit 611 outputs the polling command received to the online control determination unit 611 (Step S512).

The online control determination unit 611 determines a content-using device that is online by using the IP address included in the polling command (Step S513). The online control determination unit 611 also outputs an instruction for generating a polling Ack to the polling Ack transmission unit 612 (Step S514).

The polling Ack transmission unit 612 generates a polling Ack (Step S515), and transmits the polling Ack generated to the content-using device 700, from which the polling command has been received (Step S516).

Subsequently, the online control determination unit 611 outputs, to the device management control unit 620, a reception time at which the polling command has been received and the IP address included in the polling command (Step S517).

The device management control unit 620 acquires, by using the content-using device list 621, a content-using device name corresponding to the IP address (Step S518). Subsequently, the device management control unit 620 reads out, from the online device list 622, an online device information piece including the content-using device name acquired. Subsequently, the device management control unit 620 overwrites a final access time included in the online device information piece read out with the reception time, and writes back, to the online device list 622, the online device information piece including the overwritten final access time (Step S519). Then, the device management control unit 620 transmits the online device name and the final access time to the content management control unit 630 (Step S520).

The content management control unit 630, reads out, from the content management list 631, a management information piece including the device name received as a content-using device name (Step S521). Subsequently, the content management control unit 630 extracts a validity duration from the management information piece read out (Step S522). Subsequently, the content management control unit 630 performs the calculation of: scheduled expiration time=final access time+validity duration (Step S523). Subsequently, the content management control unit 630 overwrites the scheduled expiration time corresponding to the content-using device name in the management information piece read out with the scheduled expiration time so calculated. Subsequently, the content management control unit 630 writes back, to the content management list 631, the management information piece including the overwritten scheduled expiration time (Step S524).

Figure 53:
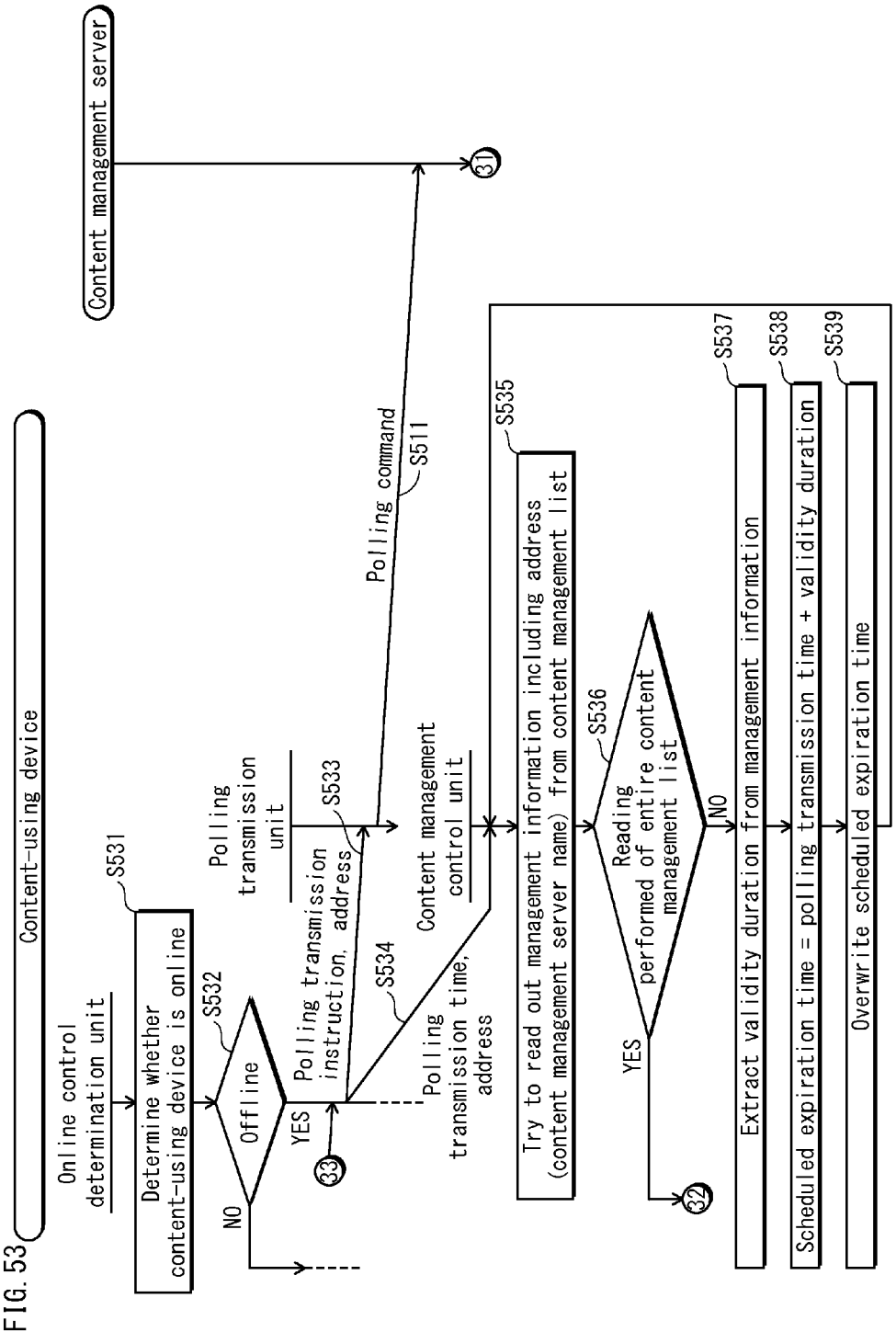
FIG. 53 is the first part of a sequence diagram illustrating operations of the content-using device 700 when outputting a polling command, a following part of which illustrated in FIG. 54.
Figure 54:
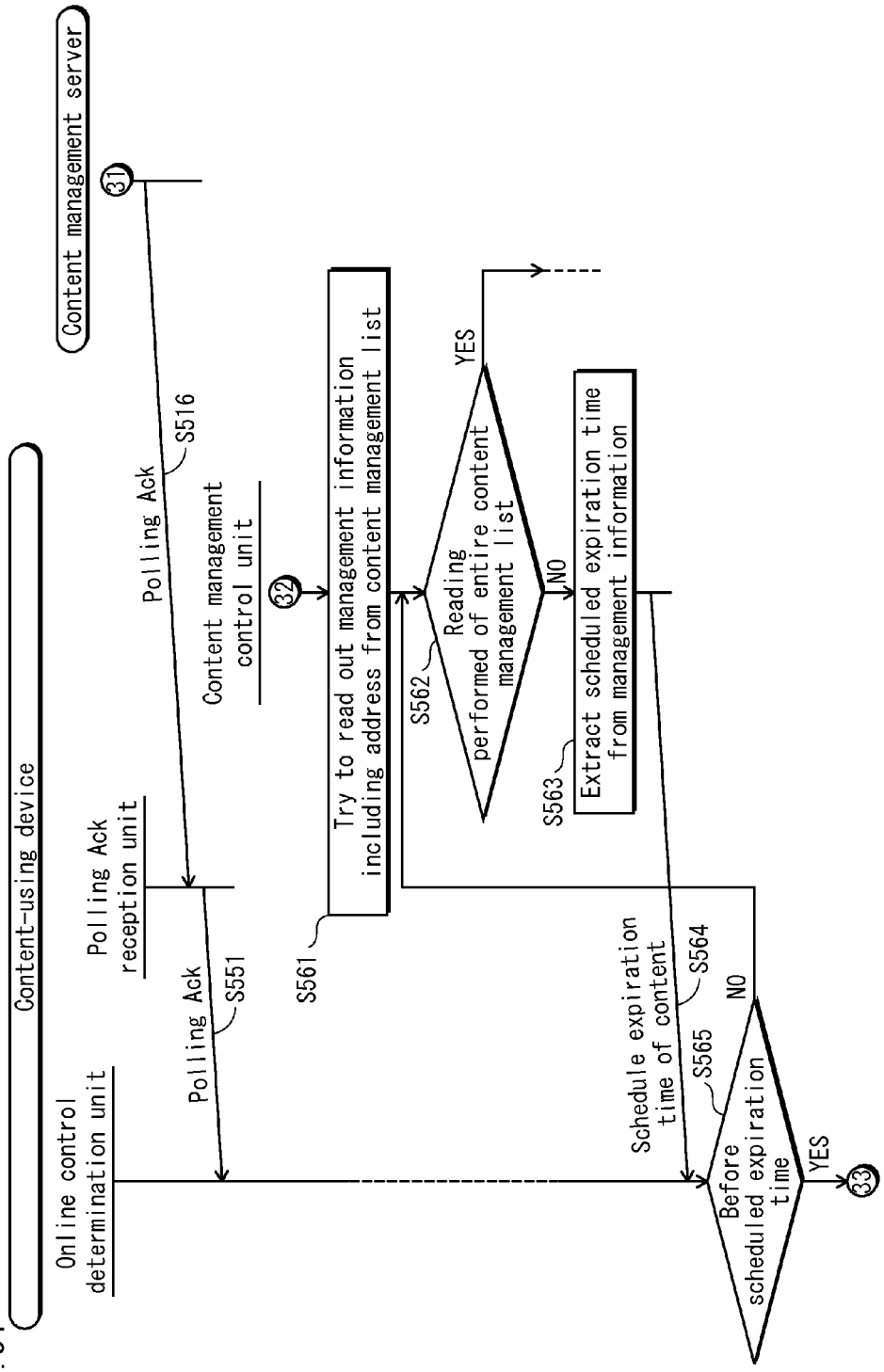
FIG. 54 is the second part of the sequence diagram illustrating the operations of the content-using device 700 when outputting the polling command.

(3) Operations of Content-Using Device 700 when Outputting a Polling Command In the following, description is provided on operations of the content-using device 700 when outputting a polling command, with reference to the sequence diagrams illustrated in FIGS. 53 and 54.

The online control determination unit 711 determines whether the content-using device 700 is online (Step S531). When the content-using device is online ("YES" in Step S532), the online control determination unit 711 outputs a polling transmission instruction and an address to which a polling command is to be transmitted to the polling transmission unit 710 (Step S533). The online control determination unit 711 also outputs a polling transmission time and the address to the content management control unit 721 (Step S534).

The polling transmission unit 710 generates a polling command and outputs the polling command to the address received (Step S511).

The content management control unit 721 tries to read out, from the content management list 722, a management information piece including the address (i.e., a specific content management server name) (Step S535). When the reading out of the management information piece is completed without reading being performed of the entire content management list 722 ("NO" in Step S536), the content management control unit 721 extracts a validity duration from the management information piece read out (Step S537). Subsequently, the content management control unit 721 performs the calculation of: scheduled expiration time=polling transmission time+validity duration (Step S538). Subsequently, the content management control unit 721 overwrites the scheduled expiration time included in the management information piece read out with the scheduled expiration time so calculated. Subsequently, the content management control unit 721 writes back, to the content management list 722, the management information piece including the overwritten scheduled expiration time (Step S539). Then, the content management control unit 721 returns to Step S535 and performs processing once again from Step S535.

The polling Ack reception unit 712 receives a polling Ack from the content management server 600 (Step S516). When receiving the polling Ack, the polling Ack reception unit 712 outputs the polling Ack received to the online control determination unit 711 (Step S551).

When the reading out of the management information piece is not completed even when reading has been performed of the entire content management list 722 ("YES" in Step S536), the content management control unit 721 tries to read out, from the content management list 722, a management information piece including the address (i.e., a specific content management server name) (Step S561). When the reading out of the management information piece is completed without reading being performed of the entire content management list 722 ("NO" in Step S562), the content management control unit 721 extracts a scheduled expiration time from the management information piece read out (Step S563). Subsequently, the content management control unit 721 outputs the scheduled expiration time extracted to the online control determination unit 711 (Step S564).

The online control determination unit 711 determines whether the current time point precedes the scheduled expiration time (Step S565). When the current time point does not precede the scheduled expiration time ("NO" in Step S564), the online control determination unit 711 returns to Step S562 and performs processing once again from Step S562. When the current time point precedes the scheduled expiration time ("YES" in Step S564), the online control determination unit 711 proceeds to the processing following Step S532.

Figure 55:
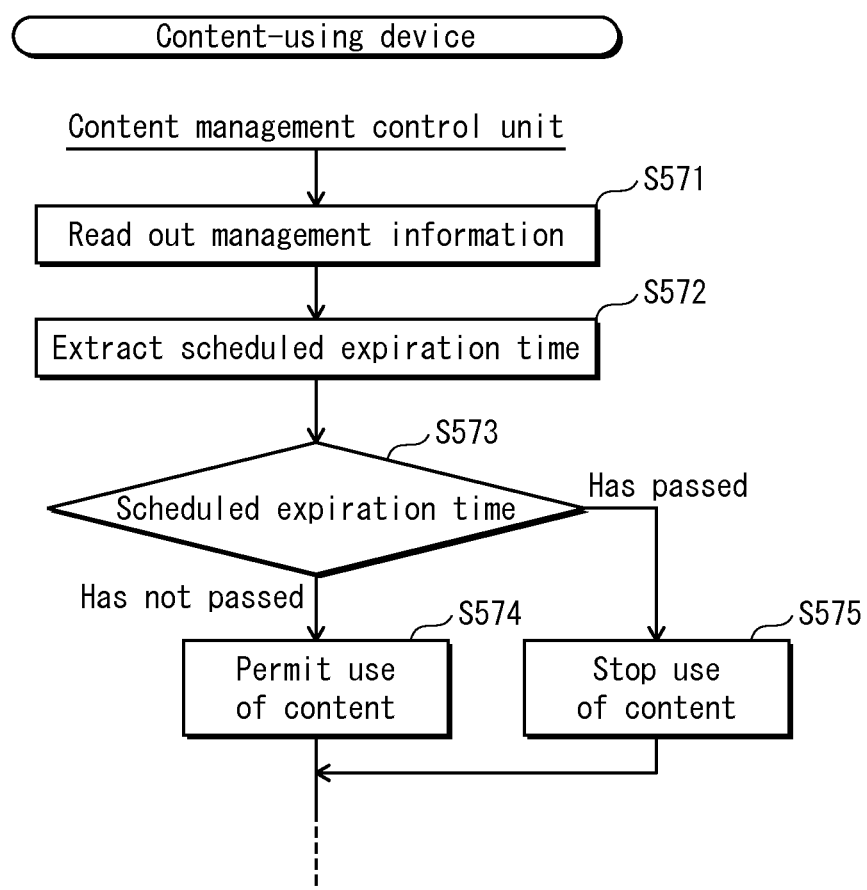
FIG. 55 is a sequence diagram illustrating operations of the content-using device 700 when determining how a content is to be used.

(4) Operations of Content-Using Device 700 when Determining Control of a Content being Used In the following, description is provided on operations of the content-using device 700 when determining control of a content being used, with reference to the sequence diagram illustrated in FIG. 55.

The content management control unit 721 reads out, from the content management list 722, a management information piece pertaining to a content being used (Step S571). Subsequently, the content management control unit 721 extracts a scheduled expiration time from the management information piece read out (Step S572). Subsequently, the content management control unit 721 determines whether the current time point succeeds the scheduled expiration time (Step S573). When the current time point succeeds the scheduled expiration time ("Has passed" in Step S573), the content management control unit 721 stops the use of the content (Step S575). When the current time point does not succeed the scheduled expiration time ("Has not passed" in Step S573), the content management control unit 721 permits the use of the content (Step S574).

4.5 Configuration of Content Distribution System 30

Figure 56:
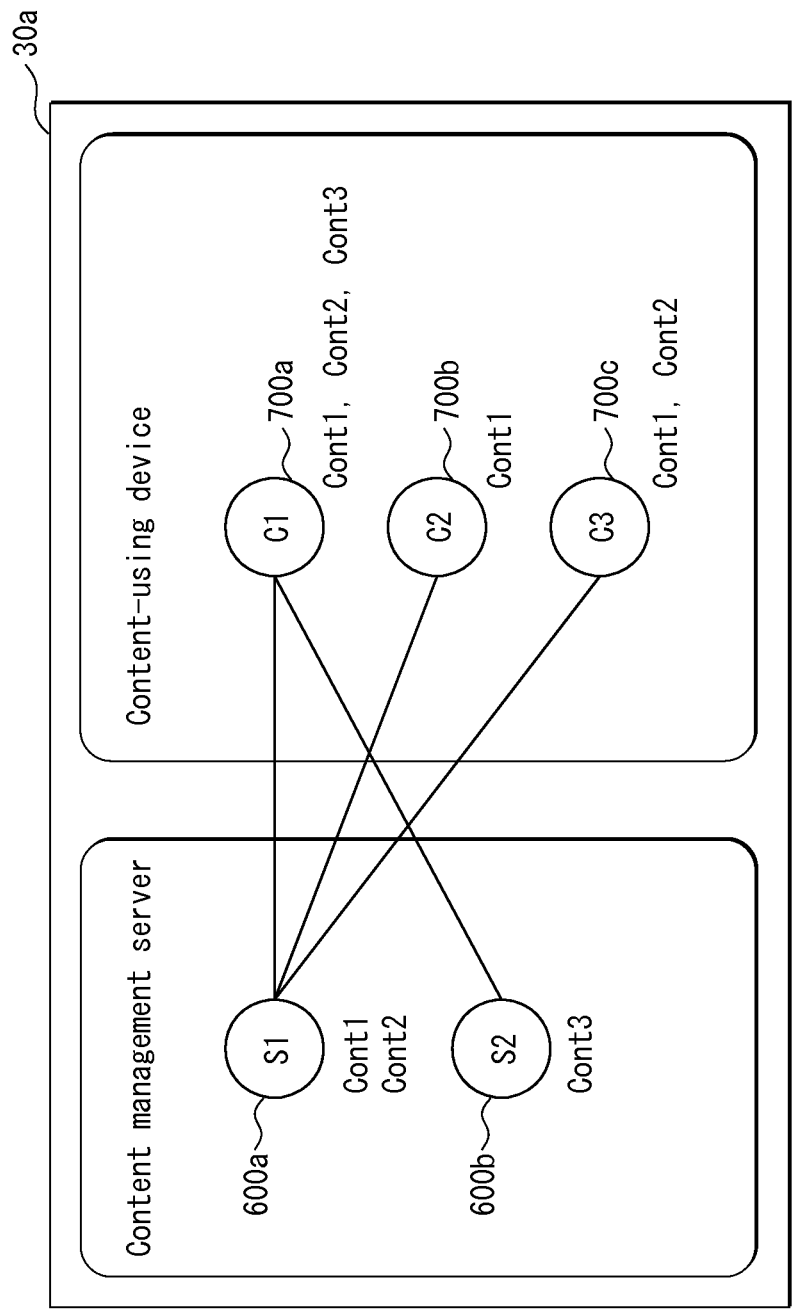

FIG. 56 is a diagram illustrating a configuration of a content distribution system 30a, which is one example of the content distribution system 30. In the example illustrated in FIG. 56, the content distribution system 30a includes two content management servers and three content-using devices.

More specifically, the content distribution system 30a includes: a content management server 600a (also referred to as a "content distribution server S1"); a content management server 600b (also referred to as a "content distribution server S2"); a content-using device 700a (also referred to as a "content-using device C1"); a content-using device 700b (also referred to as a "content-using device C2"); and a content-using device 700c (also referred to as a "content-using device C3").

FIG. 56 illustrates how contents are shared between the content management servers and the content-using devices. Further, FIG. 56 also illustrates connections between the content management servers and the content-using devices.

The content management server 600a provides a content identified by a content name "Cont1" and a content identified by a content name "Cont2". In addition, the content management server 600b provides a content identified by a content name "Cont3".

The content-using device 700a is provided, by the content management server 600a, with the contents "Cont1" and "Cont2". The content-using device 700a is also provided, by the content management server 600b, with the content "Cont3".

The content-using device 700b is provided, by the content management server 600a, with the content "Cont1".

The content-using device 700c is provided, by the content management server 600a, with the contents "Cont1" and "Cont2".

As such, the contents "Cont1" and "Cont2" are shared between the content management server 600a and the content-using device 700a. That is, the contents "Cont1" and "Cont2" possessed by the content management server 600a are provided for use to the content-using device 700a.

Similarly, the content "Cont1" is shared between the content management server 600a and the content-using device 700b. That is, the content "Cont1" possessed by the content management server 600a is provided for use to the content-using device 700b.

Further, the contents "Cont1" and "Cont2" are shared between the content management server 600a and the content-using device 700c. That is, the contents "Cont1" and "Cont2" possessed by the content management server 600a are provided for use to the content-using device 700c.

In addition to the above, the content "Cont3" is shared between the content management server 600b and the content-using device 700a. That is, the content "Cont3" possessed by the content management server 600b is provided for use to the content-using device 700a.

Here, the content possessed by the content management server 600b is not used by the content-using device 700b. That is, as illustrated in FIG. 56, the content management server 600b and the content-using device 700b are not connected with each other. The same applies to the content management server 600b and the content-using device 700c.

4.6 Operations of Content Distribution System 30 (Part 2)

Figure 57:
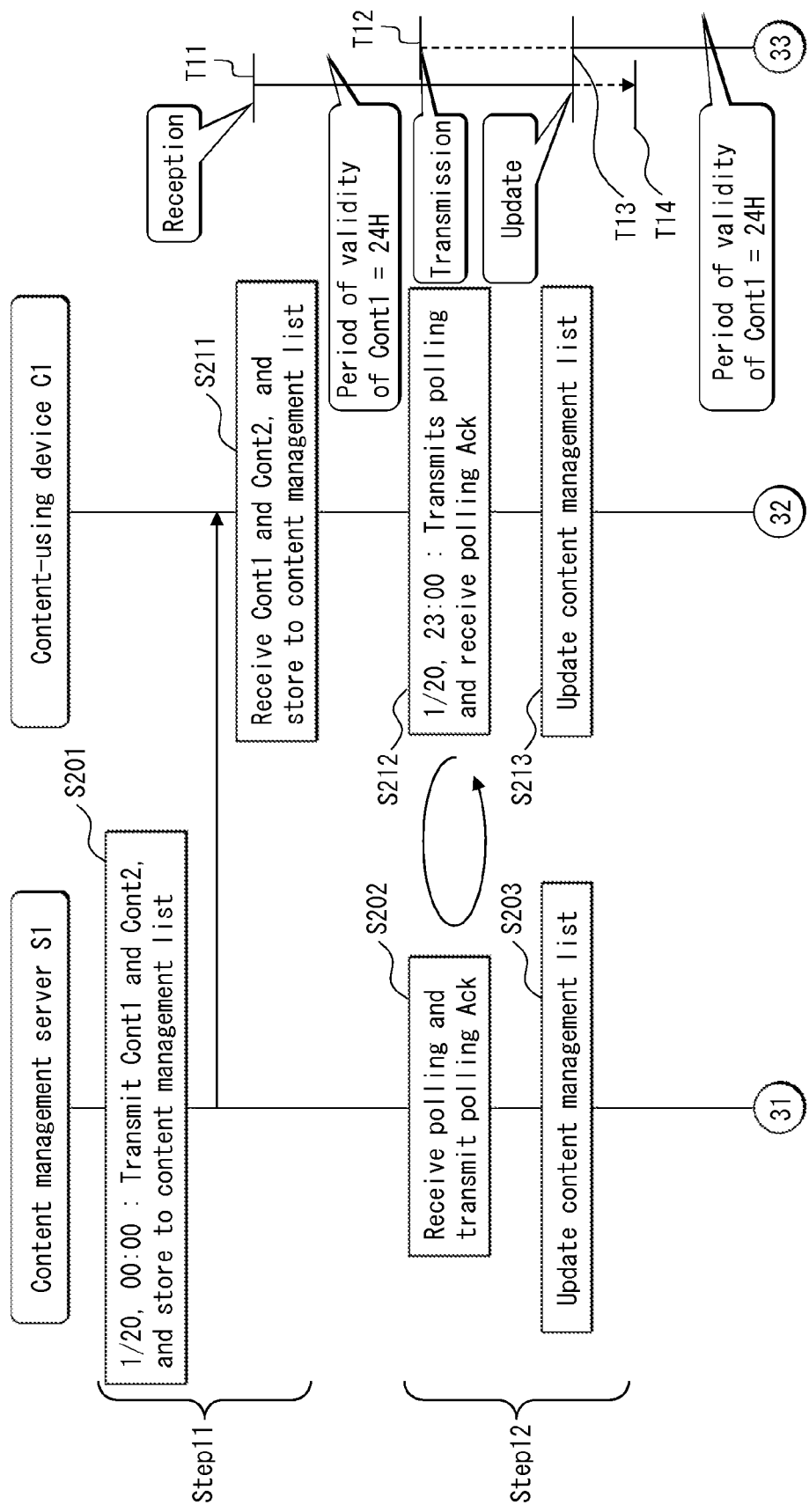
FIG. 57 is the first part of a sequence diagram illustrating interaction between a content management server 600a and a content-using device 700a, a following part of which illustrated in FIG. 58.
Figure 58:
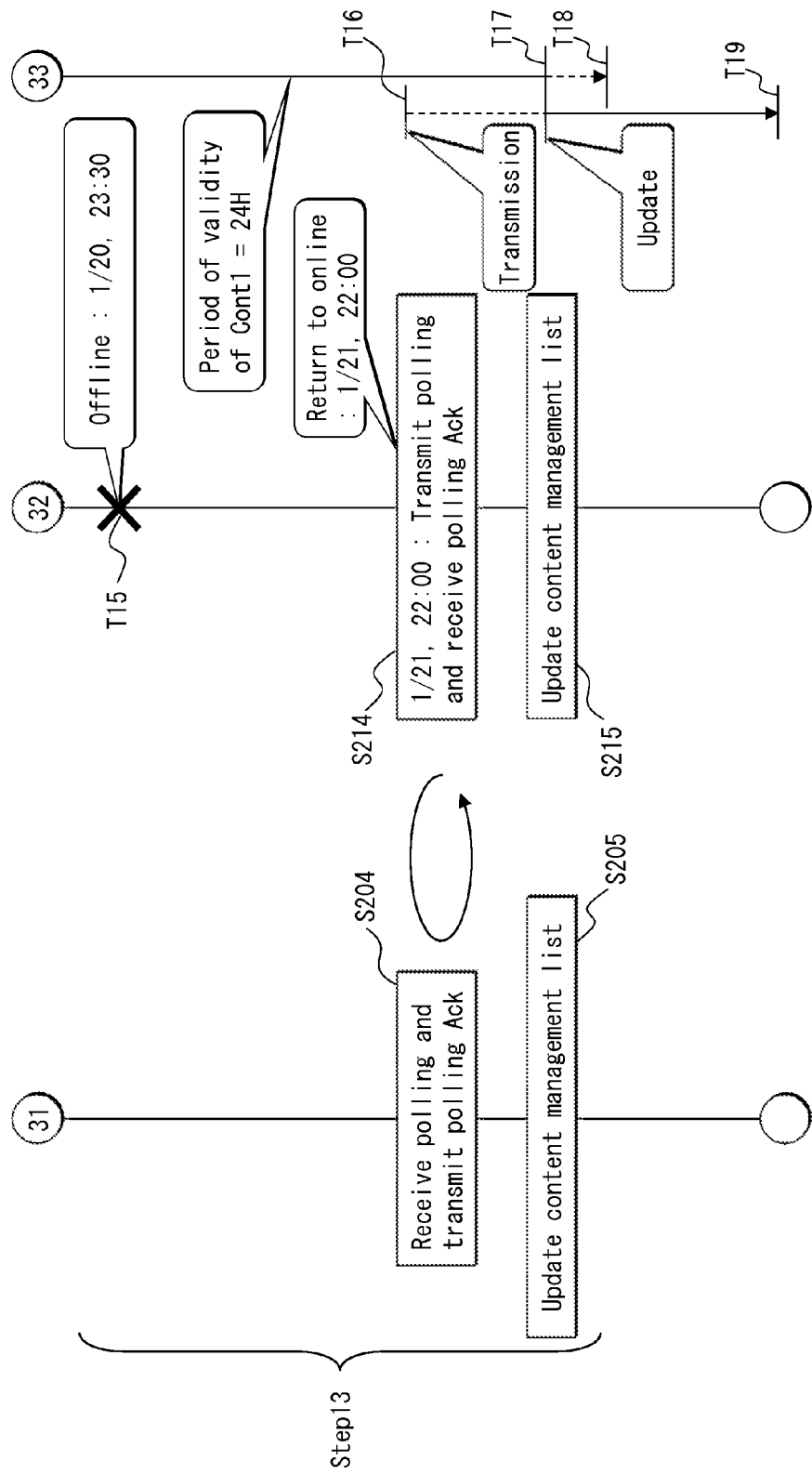

Note that in the following, based on the configuration illustrated in FIG. 56, description is provided on the interaction between the content management server 600a and the content-using device 700a, with reference to FIGS. 57 and 58.

Step 11) At 00:00, January 20$^{th}$, the content management server 600a transmits, to the content-using device 700a, the contents identified by the respective content IDs "Cont1" and "Cont2" in response to a request made from the content-using device 700a. In addition, the content management server S1 stores a usage device information piece corresponding to the content-using device 700a to the content management list 631 (Step S201). The content management list 631 at this point is as illustrated in FIG. 45. Subsequently, at time point T11, the content-using device 700a receives the contents "Cont1" and "Cont2" and stores management information pieces corresponding to the contents to the content management list 722 (Step S211). The content management list 722 at time point T11 is as illustrated in FIG. 49. Here, for instance, the validity duration of the content "Cont1" is "24H", and hence, the scheduled expiration time for the content "Cont1" is time point T14, which is calculated by adding "24H" to time point T11. In other words, the content "Cont1" is available for use from time point T11 to time point T14.

Step 12) At 23:00, January 20$^{th}$ (time point T12), the content-using device 700a transmits a polling command to the content management server 600a (Step S212). The content management server 600a receives the polling command from the content-using device 700a, and generates and transmits a polling Ack within a predetermined interval from the reception of the polling command (Step S202). The content management server 600a, at this point, determines that the content-using device 700a is online and updates the content management list 631 (Step S203). The content management list 631a, which corresponds to the content management list 631 following the update, is as illustrated in FIG. 46. The content-using device 700a receives a polling Ack from the content management server 600a (Step S212). By receiving the polling Ack from the content management server 600a, the content-using device 700a determines that a notification has been made to the content management server 600a that the content-using device 700a is online (Step S212). The content-using device 700a updates the content management list 722 at time point T13 (Step S213). The content management list 722a, which corresponds to the content management list 722 following the update, is as illustrated in FIG. 50. Here, for instance, the validity duration of the content "Cont1" is "24H", and hence, the scheduled expiration time for the content "Cont1" is time point T18, which is calculated by adding "24H" to time point T12. In other words, the content "Cont1" is available for use from time point T12 to time point T18.

Step 13) The content-using device 700a transitions from online to offline at 23:30, January 20$^{th}$ (time point T15). Even after transitioning from online to offline, the content-using device 700a is able to continue the use of the content "Cont1" since the scheduled expiration time of the content "Cont1" is "1/21, 23:00". Subsequently, the content-using device 700a transitions to online once again as the scheduled expiration time "1/21, 23:00" of the content "Cont1" approaches. In the example illustrated in FIG. 58, the content-using device 700a transitions from offline to online at 22:00, January 21$^{st}$, which is one hour before the scheduled expiration time. At time point T16 immediately following 22:00, January 21$^{st}$, which is the time point at which the content-using device 700a transitions from offline to online, the content-using device 700a transmits a polling command to the content management server 600a (Step S214). The content management server 600a receives the polling Ack from the content-using device 700a (Step S204). Then, within a predetermined interval from the reception of the polling command, the content management server 600a transmits a polling Ack to the content-using device 700a (Step S204). The content management server 600a, at this point, determines that the content-using device 700a is online and updates the content management list 631a (Step S205). A content management list 631b, which corresponds to the content management list 631a following the update, is as illustrated in FIG. 59. In the content management list 631b, which corresponds to the content management list 631a following the update, "1/22, 22:00" is set in a scheduled expiration time field 636b, and "1/23, 22:00" is set in a scheduled expiration time field 643b. The content-using device 700a receives a polling Ack from the content management server 600a (Step S214). By receiving the polling Ack from the content management server 600a, the content-using device 700a determines that a notification has been made to the content management server 600a that the content-using device 700a is online. Subsequently, the content-using device 700a updates the content management list 722a at time point T17 (Step S215). A content management list 722b, which corresponds to the content management list 722a following the update, is as illustrated in FIG. 60. In the content management list 722b, which corresponds to the content management list 722a following the update, "1/22, 22:00" is set in a scheduled expiration time field 737b, and "1/23, 22:00" is set in a scheduled expiration time field 741b.

Here, for instance, the validity duration of the content "Cont1" is "24H", and hence, the scheduled expiration time for the content "Cont1" is time point T19, which is calculated by adding "24H" to time point T16. In other words, the content "Cont1" is available for use, following time point T17, from time point T16 to time point T19.

In the description provided above, the content-using device 700a returns to online once again at 22:00, January $21^{st}$. However, when the content-using device 700a does not return to online once again by 23:00, January $21^{st}$, which corresponds to the scheduled expiration time of the content "Cont1", the content-using device 700a is unable to use the content "Cont1" following 23:00, January $21^{st}$ even when transmitting a polling command to the content management server 600a at a given point following 23:00, January $21^{st}$. This is since the scheduled expiration time of the content "Cont1" has already passed.

4.7. Effects Achieved by Embodiment 4

In embodiment 4, the content-using device performs polling with respect to the content management server at regular intervals. When receiving a polling command transmitted from the content-using device, the content management server determines that the content-using device having transmitted the polling command is online. When the content-using device requests for continuous use of a content even after a period of validity of the content has expired, the content-using device needs to perform polling with respect to the content management server, which is realized by the present embodiment. On the other hand, the content management server need not perform polling with respect to the content-using device in such a case. In addition, a content-using device that does not request for continuous use of a content whose scheduled expiration time has already passed does not perform polling. As such, traffic on the communication path can be reduced according to the present embodiment.

Further, according to the present embodiment, even when the content-using device transitions from online to offline during use of a content, the content-using device can extend the scheduled expiration time set to the content by performing polling with respect to the content management server within the period of validity of the content. As such, the content-using device need not be kept in an online state at all times.

5. Other Modifications

In the above, description has been provided on the present invention with reference to exemplary embodiments thereof. However, and as a matter of course, the present invention should not be construed as being limited to the embodiments above. For instance, at least the modifications such as presented in the following are included within the spirit and scope of the present invention.

(1) In embodiments 2, 3, and 4, the content management server, once determining that the content-using device is offline, no longer performs the online/offline detection, which involves performing polling at hourly intervals, with respect to the content-using device. However, the present invention is not limited to this.

That is, so as to simplify control to be performed by the content management server, the content management server may be configured to perform processing as described in the following.

The content management server performs polling at uniform intervals with respect to all content-using devices registered to the content-using device list, regardless of whether or not each of the content-using devices is online.

In addition, so as to reduce network traffic, the frequency at which the content management server performs polling with respect to content-using devices may be decreased to some degree.

(2) In embodiments 2, 3, and 4, the content management server/the content-using device may append signature data to polling commands, polling Ack signals, and online control signals transmitted therebetween. The provision of signature data to such signals serves as a countermeasure for preventing unauthorized copying of the signals. Note that, as already described above, an online control signal is a notification signal transmitted by the content-using device to the content management server when the content-using device self-detects an online state thereof.

In specific, the content management server/the content-using device generates signature data for each of the polling command, the polling Ack signal, and the online control signal by performing digital signature. Here, the generation of signature data is performed by using, for instance, a private key that is stored only to authentic devices. Subsequently, the signature data so generated are appended to each of the polling command, the polling Ack signal, and the online control signal. Subsequently, the polling command, the polling Ack signal, and the online control signal having signature data appended thereto are transmitted to the content management server/the content-using device.

The content management server/the content-using device receives the polling command, the polling Ack signal, and the online control signal having signature data appended thereto. Subsequently, verification of the signature data provided to the polling command, the polling Ack signal, and the online control signal so received is performed by using a public key corresponding to the private key. Only when the verification is successful, the content management server/the content-using devices use the polling command, the polling Ack signal, and the online control signal so received.

Here, the RSA signature method may be used as one example of a method for providing a digital signature to a command or a signal.

(3) In embodiment 3, each of a signal indicating the invalidation instruction and a signal indicating the invalidation response may have signature data identifying the content management server/the content-using device appended thereto for the purpose of preventing unauthorized copying thereof.

The generation of the signature data to be appended to such signals is performed in the above-described manner, by using a private key that is stored only to authentic devices and by performing digital signature with respect to the signals. Here, the RSA signature method may be used as one example of a method for providing a digital signature to a command or a signal.

On the side of the content-using device, verification is performed of whether signature data appended to such signals corresponds to an authentic content management server, and invalidation of an invalidation-target content is performed when the verification is successful. Note that the content-using device performs invalidation of an invalidation-target content by deleting the content, controlling operations of an application (i.e., by prohibiting playback upon recognition of playback of the content or the like), or deleting a key corresponding to the content.

Figure 61:
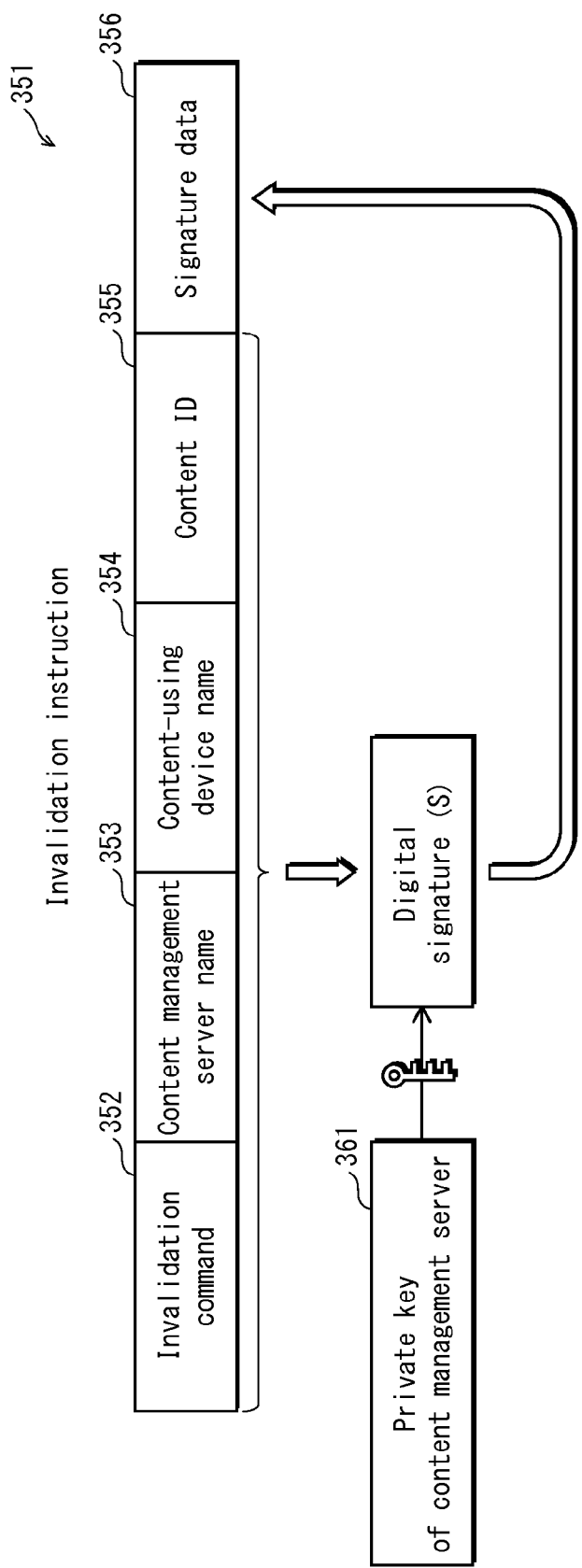
FIG. 61 illustrates one example of a data configuration of an invalidation instruction 351.

FIG. 61 illustrates one example of a data configuration of an invalidation instruction. As illustrated in FIG. 61, an invalidation instruction 351 includes an invalidation command 352, a content management server name 353, a content-using device name 354, a content ID 355, and signature data 356.

The content management server generates a concatenated data by concatenating the invalidation command 352, the content management server name 353, the content-using device name 354, and the content ID 355. Subsequently, the content management server generates the signature data 356 by performing digital signature (S) with respect to the concatenated data so generated. Here, when performing the digital signature (S), the content management server uses a private key 361 held therein. Subsequently, the content management server generates the invalidation instruction 351 by appending the signature data 356 to the concatenated data.

Subsequently, the content management server transmits the invalidation instruction 351 to the content-using device.

The content-using device, when receiving the invalidation instruction 351, checks whether or not a content-using device name corresponding thereto is included in the invalidation instruction 351 so received. When a content-using device name that corresponds to the content-using device is not included in the invalidation instruction 351, the content-using device determines that the invalidation instruction is addressed thereto and discards the invalidation instruction 351 received.

When a content-using device name that corresponds to the content-using device is included in the invalidation instruction 351, the content-using device verifies the authenticity of the signature data 356 included in the invalidation instruction 351 by using a public key corresponding to the private key 361. When the authenticity of the signature data 356 cannot be determined, the content-using device discards the invalidation instruction 351 received. Further, the content-using device may be further configured so as to transmit, to the content management server, a notification indicating that the authenticity of the signature data 356 could not be determined in such a case.

When the authenticity of the signature data 356 is determined, the content-using device invalidates a content that has been provided from the content management server and that corresponds to the content ID 355 according to the invalidation command 352 included in the invalidation instruction 351 received.

An invalidation response may have the same data configuration as the invalidation instruction described above.

(4) In embodiments 2, 3, and 4, the content management sever manages the content-using device list and the offline device list as separate lists. However, the present invention is not limited to the management of lists being performed in such a manner.

That is, the content-using device list and the offline device list may be combined into a single content-using device list. In such a case, in the combined content-using device list, offline content-using devices may be indicated by providing, only to device information pieces corresponding to offline content-using devices, indication in the form of ticks or checks. In addition to this, the management of offline content-using devices may also be performed by providing, to each device information piece corresponding to an offline content-using device, an indication of a time point at which the corresponding content-using device has been detected as being offline.

(5) In embodiments 2, 3, and 4, polling is performed by the content management server at hourly intervals. However, the present invention is not limited to this.

That is, the polling may be performed once every two hours, once every six hours, once every twelve hours, etc., provided that the polling is performed at regular intervals. Further, polling may be performed with longer intervals therebetween during the nighttime compared to during the day time. Further, the frequency at which polling is performed may be determined depending upon load exerted upon applications and communication traffic.

Alternatively, the frequency at which polling is performed may be determined depending upon relative validity durations of contents. For instance, when a relative validity duration of a given content is ten hours, the polling may be performed once every two hours. By polling being performed in such a manner, even when a content-using device transitions from online to offline immediately before an invalidation instruction is transmitted thereto for invalidating a given content, the content is invalidated in twelve-hours' time, if not sooner, by the period of validity of the content expiring.

Alternatively, when a relative validity duration of a given content is ten days, polling may be performed once every two days. By polling being performed in such a manner, even when a content-using device transitions from online to offline immediately before an invalidation instruction is transmitted thereto for invalidating a given content, the content is invalidated in twelve days, if not sooner, by the period of validity of the content expiring.

In addition, it can be assumed that a relative validity duration of a given content is set in relation to the value of the given content. Due to this, a content having high value may be provided with a short relative validity duration. Further, in such a case, polling intervals may be determined in accordance with the relative validity duration of the content. By setting the relative validity duration for a content having high value so as to be shorter than a relative validity duration for a content of less value, the management of the timing at which invalidation of the content is performed when invalidation of the content is desired can be performed with an increase degree of accuracy.

(6) In embodiments 2, 3, and 4, the same relative validity duration is set with respect to one content regardless of the different content-using devices to which the content is provided. However, the present invention is not limited to this.

That is, different relative validity durations may be set with respect to a single content so as to correspond to the different content-using devices to which the content is provided. For instance, when a single content is shared by different users, when the reliability of a specific one of the users is high, the relative validity duration corresponding to the specific user may be set so as to be longer than those for other users.

(7) In embodiments 2, 3, and 4, when the content-using device transitions from offline to online, the content-using device notifies the content management server of the transition from offline to online. However, the present invention is not limited to this, and the content-using device need not make such a notification provided that the content management server performs polling continuously.

(8) In embodiment 3, description has been provided that displaying is performed of the state of invalidation. However, the present invention is not limited to this, and such displaying need not be performed. That is, accumulation may be performed of invalidation states, and reference may be made to such invalidation states only when necessary.

(9) In embodiments 2, 3, and 4, when the content-using device self-detects an online state, the content-using device makes a notification indicating an online state thereof to the content management server in the form of the online control signal. However, there may be cases where, even when a content-using device transmits an online control signal, the content management server cannot receive the online control signal for reasons such as the content management server being powered-off.

In such cases, the content-using device may repeatedly transmit the online control signal to the content management server until a response is received from the content management server indicating that the online control signal has been received.

Alternatively, a supplementary server may be separately provided. When a supplementary server is provided, the content-using device transmits the online control signal to the supplementary server. The supplementary server, when receiving the online control signal, stores the online control signal. Subsequently, the supplementary server reads out the online control signal stored therein. Following the reading of the online control signal, the supplementary server repeatedly transmits the online control signal to the content management server until a response is received from the content management server indicating that the online control signal has been received.

In the above-described case where a supplementary server is provided, the content management server, upon recovery, may first refer to the supplementary server and thereby obtain the online control signal from the supplementary server. Subsequently, the content management server performs processing such as the deletion, from the offline device list, of the content-using device having issued the online control signal and the updating of the content management list by using the online control signal obtained from the supplementary server. Further, when having output, to a content-using device, an invalidation instruction for invalidating the playback of a content by the content-using device, the content management server may, upon recovery, refer to the supplementary server. Subsequently, the content management server tries to acquire an online control signal. When an online control signal is successfully acquired from the supplementary server, the content management server transmits the invalidation instruction once again to the content-using device, which has now become online.

Alternatively, the content distribution system may be configured as described in the following.

Figure 62:
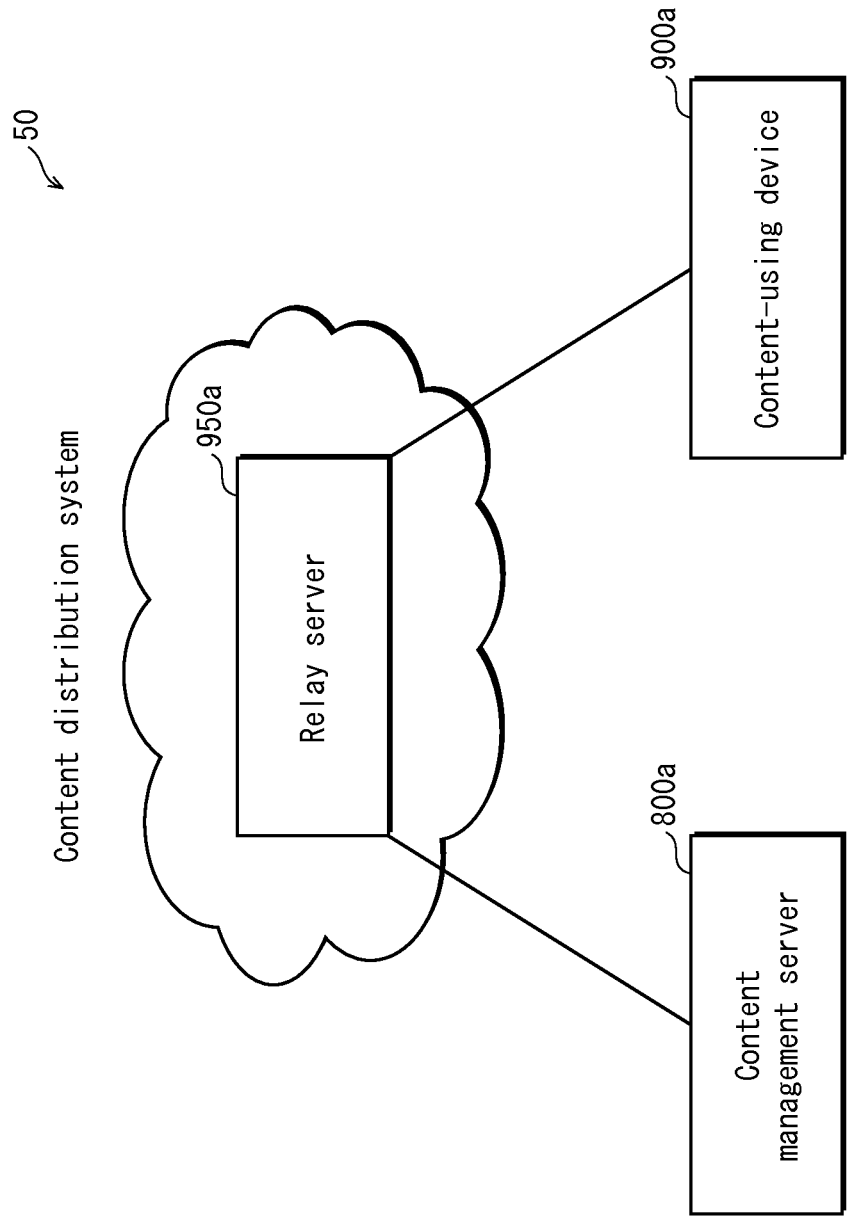
FIG. 62 illustrates an overall configuration of a content distribution system 50 pertaining to a modification.

As illustrated in FIG. 62, a content distribution system 50 pertaining to one aspect of the present invention includes: a content management sever 800*a*; a content-using device 900*a*; and a relay server 950*a*. In the content distribution system 50, the content management server 800*a* and the relay server 950*a* are connected via a network. Further, the content-using device 900*a* and the relay server 950*a* are also connected via a network.

The following explains purposes as to why the relay server 950*a* is incorporated in the content distribution system 50.

The relay server 950*a* substitutes for the content management server 800*a*. The content management server 800*a*, after making a request for substitution to the relay server 950*a*, may be powered-off. Subsequently, when the content management server 800*a* is later powered-on, the relay server 950*a* transmits information accumulated therein to the content management server 800*a*.

(9-1) Operations of Content Distribution System 50 (Part 1)

Figure 63:
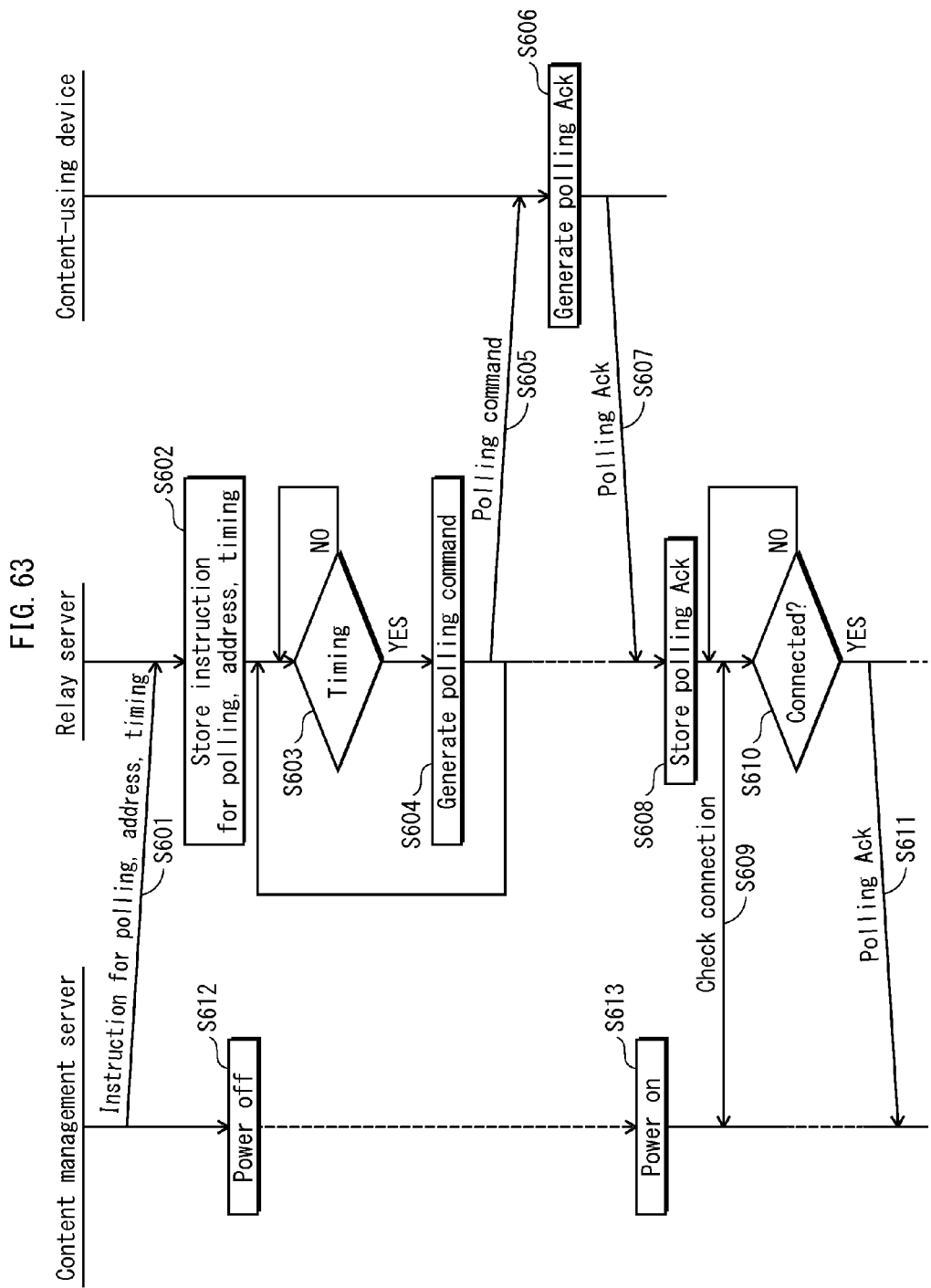

In the following, description is provided on operations (part 1) of the content distribution system 50, with reference to the sequence diagram illustrated in FIG. 63.

The content management server 800*a* transmits, to the relay server 950*a*, an instruction for polling, an address, and a timing for performing polling (Step S601).

The content management server 800*a* transitions to a power-off state (Step S612).

The relay server 950*a* receives, from the content management server 800*a*, the instruction for polling, the address, and the timing for performing polling (Step S601). Subsequently, the relay server 950*a* stores therein the instruction for polling, the address, and the timing for performing polling received from the content management sever 800*a* (Step S602). Then, the relay server 950*a* makes a comparison between the current time point and the timing stored therein, and determines whether the current time point matches the timing stored therein (Step S603). When the current time point does not match the timing stored therein ("NO" in Step S603), the relay server 950*a* returns to the processing in Step S603 and performs processing once again from Step S603.

When the current time point matches the timing stored therein ("YES" in Step S603), the relay server 950*a* generates a polling command by using the polling instruction and the address stored therein (Step S604). Subsequently, the relay server 950*a* transmits the polling command so generated to the content-using device 900*a* (Step S605).

The content-using device 900*a* receives the polling command from the relay server 950*a* (Step S605). Subsequently, the content-using device 900*a* generates a polling Ack (Step S606), and transmits the polling Ack so generated to the relay server 950*a* (Step S607).

The relay server 950*a* receives the polling Ack from the content-using device 900*a* (Step S607). Subsequently, the relay server 950*a* stores therein the polling Ack so received (Step S608).

At this point, the content management server 800*a* transitions to a power-on state (Step S613).

Subsequently, the relay server 950*a* checks whether a connection is established with the content management server 800*a* (Step S609). When determining that the content management server 800*a* is not connected therewith ("NO" in Step S610), the relay server 950*a* returns to Step S609 and performs processing from Step S609 once again. When determining that the content management server 800*a* is connected therewith ("YES" in Step S610), the relay server 950*a* reads out the polling Ack stored therein. Subsequently, the relay server 950*a* transmits the polling Ack so read out to the content management server 800*a* (Step S611).

(9-2) Operations of Content Distribution System 50 (Part 2)

Figure 64:
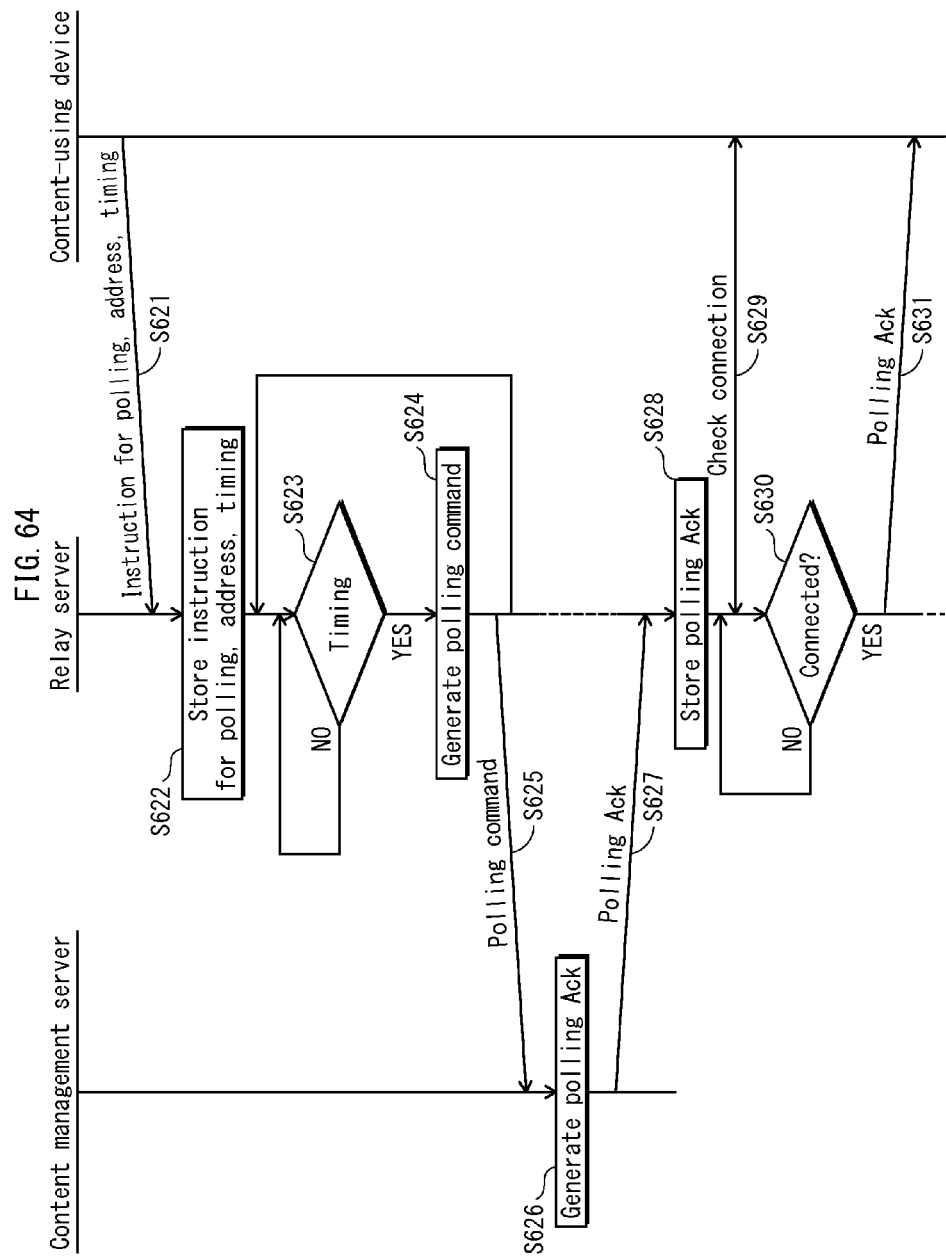

In the following, description is provided on operations (part 2) of the content distribution system 50, with reference to the sequence diagram illustrated in FIG. 64.

The content-using device 900*a* transmits, to the relay server 950*a*, an instruction for polling, an address, and a timing for performing polling (Step S621).

The relay server 950*a* receives, from the content-using device 900*a*, the instruction for polling, the address, and the timing for performing polling (Step S621). Subsequently, the relay server 950*a* stores therein the instruction for polling, the address, and the timing for performing polling received from the content-using device 900a (Step S622). Subsequently, the relay server 950a makes a comparison between the current time point and the timing stored therein, and determines whether the current time point matches the timing stored therein (Step S623). When the current time point does not match the timing stored therein ("NO" in Step S623), the relay server 950a returns to Step S623 and performs processing from Step S623 once again.

When the current time point matches the timing stored therein ("YES" in Step S623), the relay server 950a generates a polling command by using the polling instruction and the address stored therein (Step S624). Subsequently, the relay server 950a transmits the polling command generated to the content management server 800a (Step S625).

The content management server 800a receives the polling command from the relay server 950a (Step S625). Subsequently, the content management server 800a generates a polling Ack (Step S626), and transmits the polling Ack so generated to the relay server 950a (Step S627).

The relay server 950a receives the polling Ack from the content management server 800a (Step S627). Subsequently, the relay server 950a stores therein the polling Ack so received (Step S628). Subsequently, the relay server 950a checks whether a connection is established with the content-using device 900a (Step S629). When determining that the content-using device 900a is not connected therewith ("NO" in Step S630), the relay server 950a returns to Step S629 and performs processing from Step S629 once again. When determining that the content-using device 900a is connected therewith ("YES" in Step S630), the relay server 950a reads out the polling Ack stored therein. Subsequently, the relay server 950a transmits the polling Ack read out to the content-using device 900a (Step S631).

(9-3) Operations of Content Distribution System 50 (Part 3)

Figure 65:
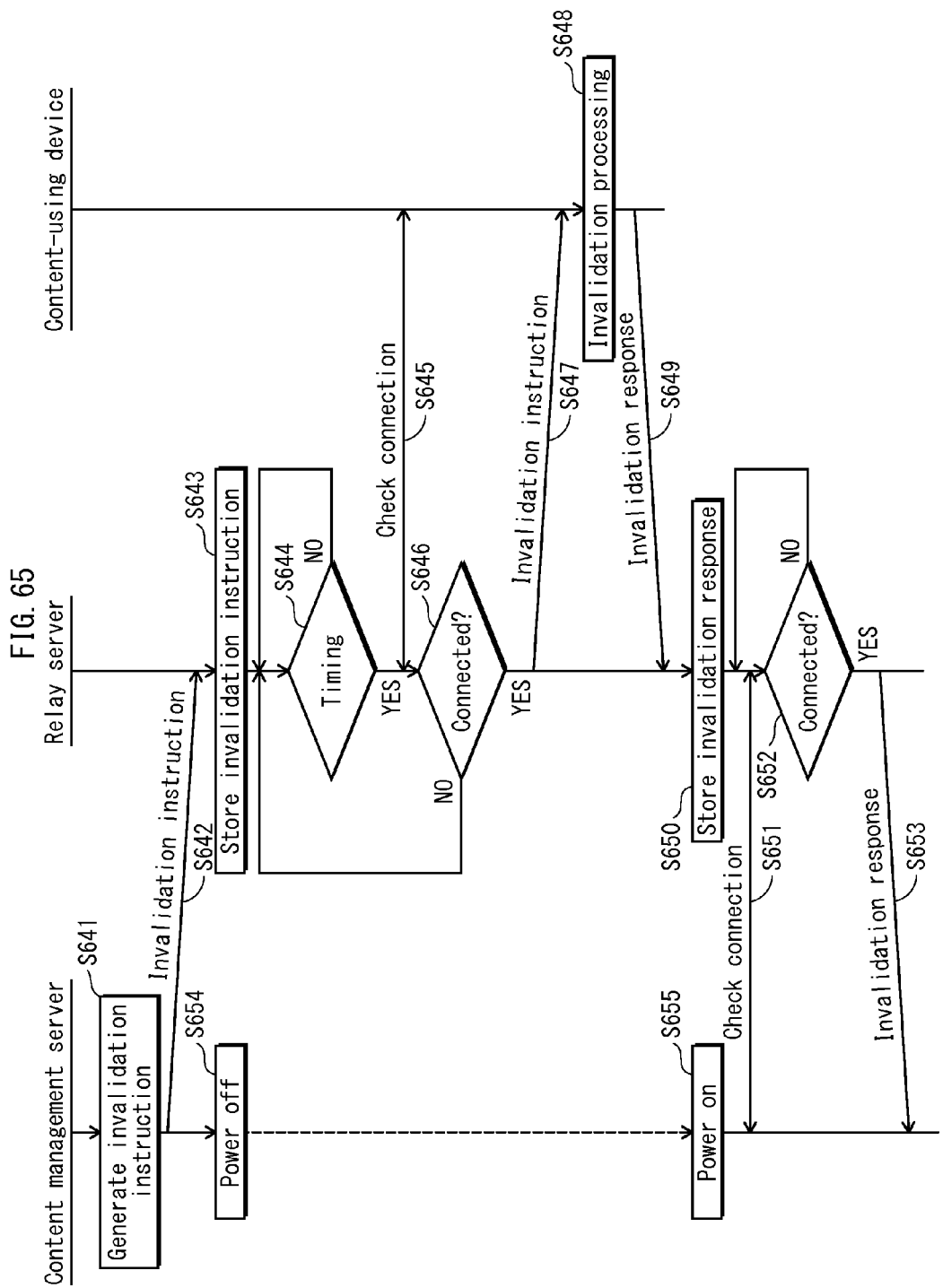

In the following, description is provided on operations (part 3) of the content distribution system 50, with reference to the sequence diagram illustrated in FIG. 65.

The content management server 800a generates an invalidation instruction for invalidating a given content (Step S641). Subsequently, the content management server 800a transmits the invalidation instruction generated to the relay server 950a (Step S642).

The content management server 800a transitions to a power-off state (Step S654).

The relay server 950a receives the invalidation instruction from the content management server 800a (Step S642). Subsequently, the relay server 950a stores therein the invalidation instruction received from the content management server 800a (Step S643). Then, the relay server 950a makes a comparison between the current time point and a timing stored therein. Here, the timing stored in the relay server 950a indicates a time point at which the invalidation instruction is to be transmitted to the content-using device 900a. The relay server 950a determines whether the current time point matches the timing stored therein (Step S644). When the current time point does not match the timing stored therein ("NO" in Step S644), the relay server 950a returns to Step S644 and performs processing from Step S644 once again.

When the current time point matches the timing stored therein ("YES" in Step S644), the relay server 950a checks whether a connection is established with the content-using device 900a (Step S645). When determining that the content-using device 900a is not connected therewith ("NO" in Step S646), the relay server 950a returns to Step S644 and performs processing from Step S644 once again. When determining that the content-using device 900a is connected therewith ("YES" in Step S646), the relay server 950a reads out the invalidation instruction stored therein. Subsequently, the relay server 950a transmits the invalidation instruction read out to the content-using device 900a (Step S647).

The content-using device 900a receives the invalidation instruction from the relay server 950a (Step S647). Upon receiving the invalidation instruction, the content-using device 900a performs invalidation processing (Step S648). Subsequently, the content-using device 900a generates an invalidation response indicating that the invalidation processing has been completed, and transmits the invalidation response generated to the relay server 950a (Step S649).

The relay server 950a receives the invalidation instruction from the content-using device 900a (Step S649). Subsequently, the relay server 950 stores therein the invalidation response received (Step S649).

At this point, the content management server 800a transitions to a power-on state (Step S655).

Subsequently, the relay server 950a checks whether a connection is established with the content management server 800a (Step S651). When determining that the content management server 800a is not connected therewith ("NO" in Step S652), the relay server 950a returns to Step S651 and performs processing from Step S651 once again. When determining that the content management server 800a is connected therewith ("YES" in Step S652), the relay server 950a reads out the invalidation response stored therein. Subsequently, the relay server 950a transmits the invalidation response read out to the content management server 800a (Step S653).

(9-4) Operations of Content Distribution System 50 (Part 4)

Figure 66:
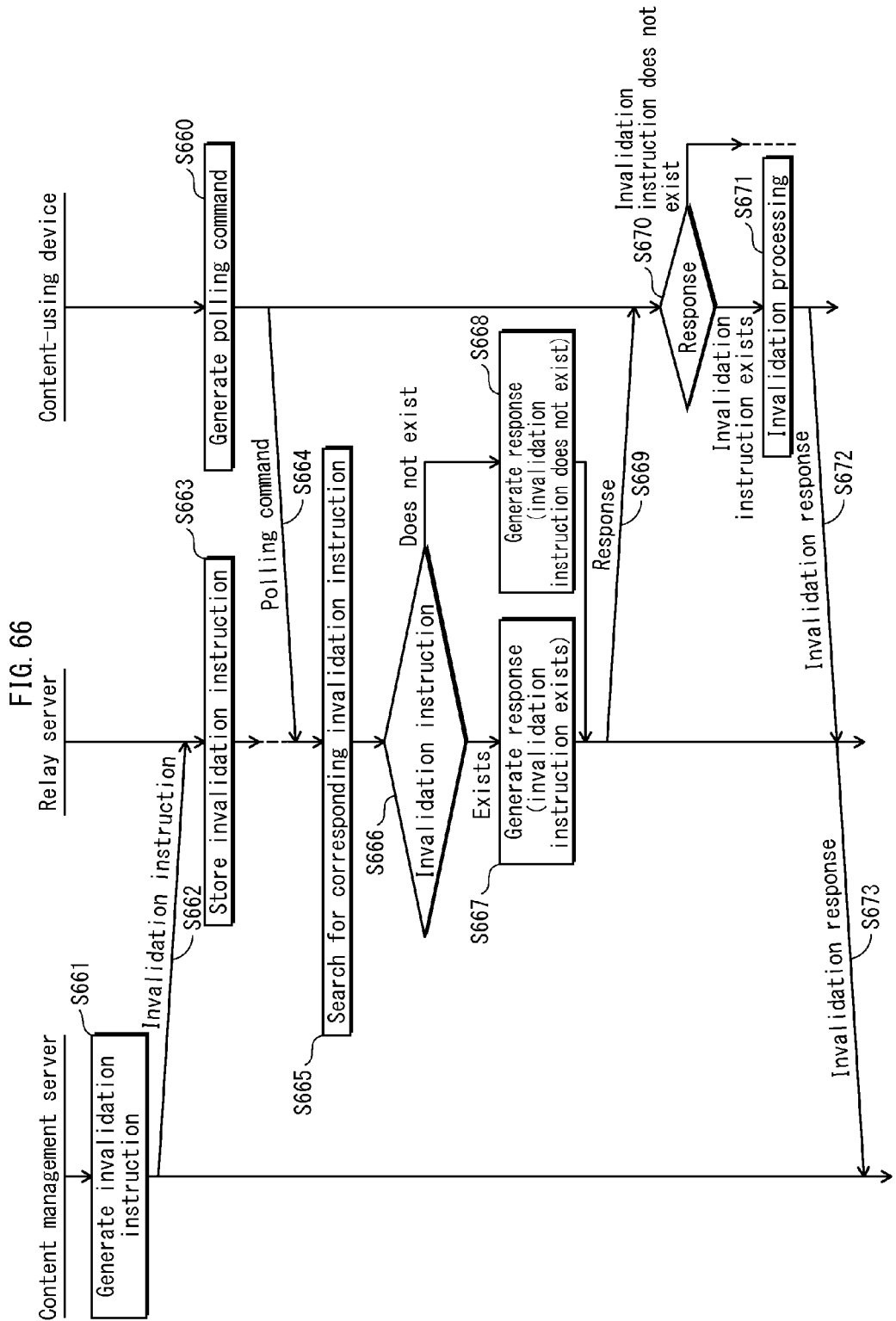

In the following, description is provided on operations (part 4) of the content distribution system 50 which differ from the operations described above, with reference to the sequence diagram illustrated in FIG. 66.

The content management server 800a generates an invalidation instruction for invalidating a given content with respect to the content-using device 900a (Step S661). The invalidation instruction includes a content-using device name identifying the content-using device 900a. Subsequently, the content management server 800a transmits the invalidation instruction so generated to the relay server 950a (Step S662).

The relay server 950a receives the invalidation instruction from the content management server 800a (Step S662). Subsequently, the relay server 950a stores therein the invalidation instruction received from the content management server 800a (Step S663).

The content-using device 900a generates a polling command (Step S660). The polling command includes a content-using device name identifying the content-using device 900a. Subsequently, the content-using device 900a transmits the polling command generated to the relay server 950a (Step S664).

The relay server 950a receives the polling command from the content-using device 900a (Step S664). Subsequently, the relay server 950a extracts the content-using device name from the polling command received. Then, the relay server 950a searches, among invalidation instructions stored therein, for an invalidation instruction including the same content-using device name as the content-using device name extracted (Step S665). When an invalidation instruction including the same content-using device name exists ("Exists" in Step S666), the relay server 950a generates a response that includes the invalidation instruction including the same content-using device name and that includes indication that an invalidation instruction including the same content-using device name exists (Step S667). On the other hand, when an invalidation instruction including the same content-using device name does not exist ("Does not exist" in Step S666), the relay server 950*a* generates a response that includes indication that an invalidation instruction including the same content-using device name does not exist (Step S668). Subsequently, the relay server 950*a* transmits the response generated to the content-using device 900*a* (Step S669).

The content-using device 900*a* receives a response from the relay server 950*a* (Step S669). Subsequently, the content-using device 900*a* determines whether or not an invalidation instruction exists according to the response received (Step S670). When an invalidation instruction does not exist ("Invalidation instruction does not exist" in Step S670), the content-using device 900*a* does not perform any processing. When an invalidation instruction exists ("Invalidation instruction exists" in Step S670), the content-using device 900*a* performs invalidation processing according to the invalidation instruction included in the response (Step S671). Subsequently, the content-using device 900*a* generates an invalidation response indicating that the invalidation processing has been completed, and transmits the invalidation response generated to the relay server 950*a* (Step S672).

The relay server 950*a* receives the invalidation instruction from the content-using device 900*a* (Step S672). Subsequently, the relay server 950*a* transmits the invalidation response received to the content management server 800*a* (Step S673).

(10) In embodiment 4, the content-using device may transmit polling commands at regular intervals. In addition, the time point at which polling is to be performed may set in view of a schedule expiration time. For instance, the content-using device may transmit a polling command at a time point that precedes the scheduled expiration time by a predetermined period of time.

By configuring the content-using device so as to perform the transmission of the polling command at regular intervals, the content management server is able to perform the determination of whether or not the content-using device is online or offline at regular intervals.

In addition, by configuring the content-using device so as to transmit the polling command at time points set taking into consideration a scheduled expiration time, traffic load can be decreased.

(11) In embodiment 3, the content management server transmits an invalidation instruction to the content-using device. However, the present invention is not limited to this.

That is, the content management server may transmit an instruction for changing conditions of use of a content to the content-using device instead of transmitting an invalidation instruction. The content-using device, when receiving the instruction for changing conditions of use of a content from the content management server, changes the conditions of use applied to the content immediately.

Note that here, the conditions of use of a given content may include conditions pertaining to playback of the content, conditions pertaining to the copying and the redistribution of the content, conditions pertaining to secondary use of the content, etc. In specific, the conditions pertaining to playback of the content are, for instance, the number of times the content can be played back, the resolution applied to the content when played back, and the length of the validity duration of the content. Further, conditions pertaining to the copying and the redistribution of the content are, for instance, the number of times the content can be copied, and a range of users to which the content can be redistributed. Finally, the conditions pertaining to secondary use of the content are, for instance, whether or not partial use of the content is permitted, etc.

The content-using device, when receiving the instruction for changing conditions of use of the content from the content management server, is able to immediately change the conditions of use applied to the content.

Further, when the content-using device is offline when the content management server has transmitted the instruction for changing conditions of use of the content thereto, processing is performed as described in the following.

When the content-using device, which was previously offline, transitions from offline to online, makes an inquiry to the content management server. In response to the inquiry made from the content-using device, the content management server transmits new conditions of use of the content along with the content or a key. The content-using device, when receiving the new conditions of use of the content, updates the conditions of use of the content with the new conditions of use of the content so received.

In addition, in embodiment 3, the content-using device stops the use of a content or invalidates the content when the validity duration of the content expires. However, the present invention is not limited to this. That is, the content-using device may determine in advance and hold default conditions of use of the content, and when the validity duration of the content expires, may refer to the default conditions of use of the content.

(12) The content-using device may delete a content stored thereby as described in the following. Note that the deletion of the content by the content-using device as described in the following is referred to hereinafter as "self-deletion" of the content.

In embodiment 2, when a user performs user operations with respect to the content-using device 200 before the scheduled expiration time of the content is reached, the content-using device 200 may perform self-deletion of the content.

(12-1) The following describes operations involved in self-deletion performed by the content-using device 200 when deleting a content identified by "Cont1" in the content ID field 251 included in the content management list 222 in FIG. 12 before "1/20, 23:30" indicated in the scheduled expiration time field 254. Note that, the content-using device 200 is currently offline when performing the self-deletion in this example.

First, the content management control unit 221 deletes the content "Cont1". Subsequently, the content management control unit 221 additionally writes, to the scheduled expiration time field 254 corresponding to the content ID "Cont1" in the content ID field 251 in the content management list 222, information indicating that "the content has already been deleted".

Here, the content management control unit 221 may additionally write, to the scheduled expiration time field 254, a time point at which the content "Cont1" has been self-deleted by the content-using device 200. In addition, the determination of whether or not to additionally write, to the scheduled expiration time field 254, the time point at which the content has been self-deleted may be made depending upon specifications made with respect to the content-using device 200. In addition, whether or not the time point at which the content "Cont1" has been self-detected is to be written to the scheduled expiration time field 254 in the content management list 222 may be specified by the content management server 100 as one of the rules pertaining to the use of the content "Cont1".

Subsequently, the content-using device 200, when transitioning from offline to online once again, outputs the online control signal indicating the transition from offline to online to the content management server 100. Here, along with the online control signal, the content-using device 200 may notify the content management server 100 of the actual time point at which the content "Cont1" has been self-deleted. When receiving such a notification from the content-using device 200, the content management control unit 130 of the content management server 100 updates the content management list 131 so as to be consistent with the information included in the notification.

Subsequently, the content management control unit 221 of the content-using device 200 deletes the content "Cont1" from the content management list 222.

Figure 67:
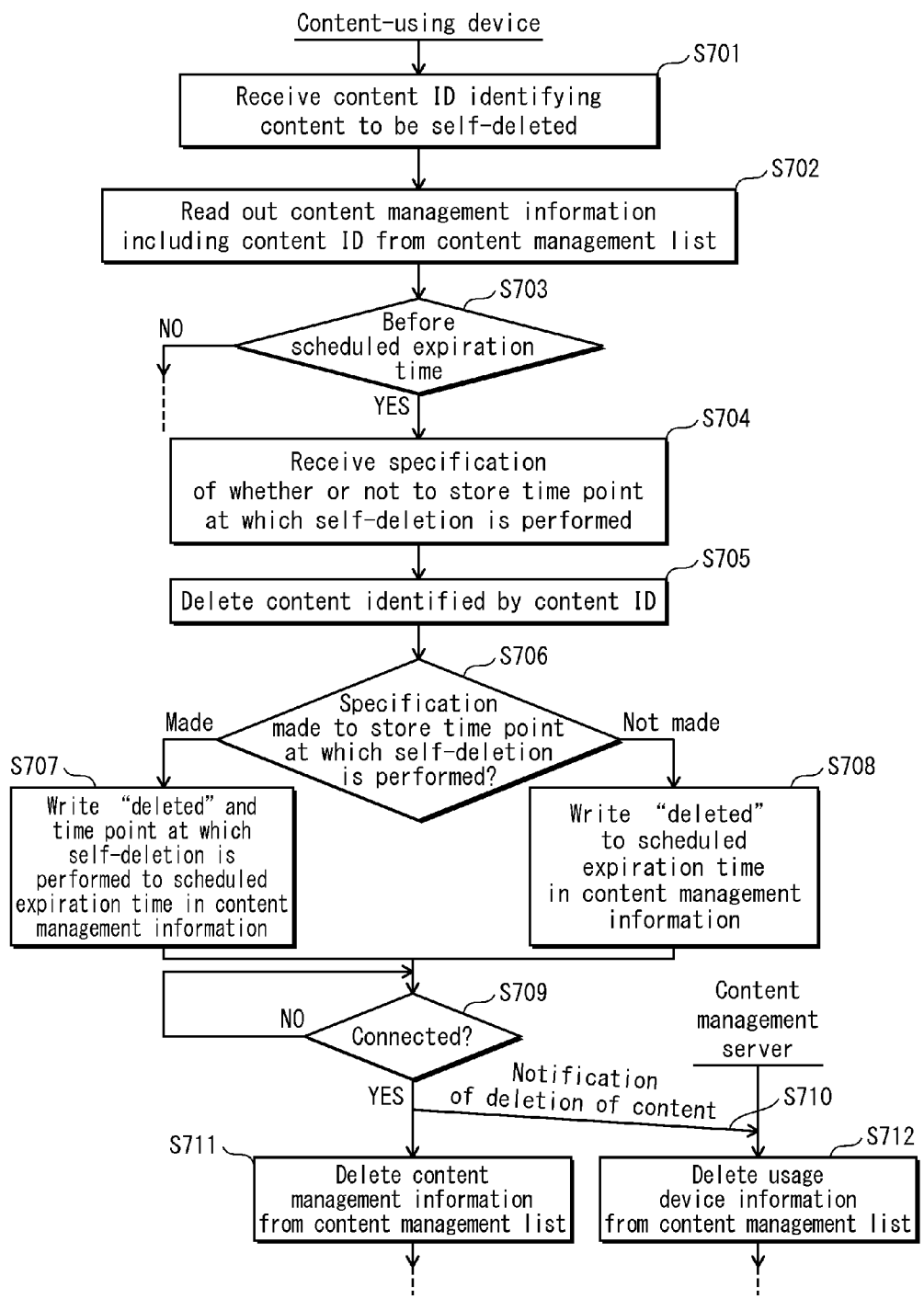
FIG. 67 is a sequence diagram illustrating operations of the content-using device 200, which is offline, when performing self-deletion of a content before a scheduled expiration time.

In the following, description is provided on operations of the content-using device 200 when performing self-deletion of a content before the scheduled expiration time set with respect to the content is reached, with reference to the sequence diagram illustrated in FIG. 67.

The content management control unit 221 of the content-using device 200 receives a content ID identifying a content that is to be self-deleted (Step S701).

Subsequently, the content management control unit 221 reads out, from the content management list 222, a content management information piece including the content ID (Step S702).

Subsequently, the content management control unit 221 determines whether the current time point is before the scheduled expiration time included in the content management information piece read out (Step S703).

When determining that the current time point is before the scheduled expiration time ("YES" in Step S703), the content management control unit 221 receives a specification of whether or not to store a time point at which the self-deletion is performed (Step S704). Subsequently, the content management control unit 221 deletes the content identified by the content ID from the content storage unit 224 (Step S705).

Following the deletion of the content, when a specification has been made for storing the time point at which the self-deletion is performed ("Made" in Step S706), the content management control unit 221 writes, to the scheduled expiration time included in the content management information piece, an indication of "Deleted" and the time point at which the self-deletion has been performed. On the other hand, when a specification has not been made for storing the time point at which the self-deletion is performed ("Not made" in Step S706), the content management control unit 221 writes, to the scheduled time included in the content management information, an indication of "Deleted".

Subsequently, the online/offline notification detection unit 201 of the content-using device 200 checks whether the content-using device 200 is connected with the content management server 100 (Step S709). When the content-using device 200 is not connected with the content management server 100 ("NO" in Step S709), the online/offline notification detection unit 201 returns to Step S709 and performs processing from Step S709 once again.

When the content-using device 200 is connected with the content management server 100 ("YES" in Step S709), the online control transmission unit 213 notifies the content management server 100 that the content has been deleted (Step S710).

Subsequently, the content management control unit 221 of the content-using device 200 deletes the content management information piece from the content management list 222 (Step S711).

The online control reception unit 113 of the content management server 100 receives a notification indicating that the content has been deleted from the content-using device 200 (Step S710). Subsequently, the content management control unit 130 deletes, from the content management list 131, a usage device information piece included in the corresponding management information piece. Here, the corresponding management information piece includes a content ID identifying the content having been deleted. In addition, the usage device information piece includes a usage device name identifying the content-using device having deleted the content (Step S712).

(12-2) The following describes operations involved in self-deletion performed by the content-using device 200 when deleting a content identified by "Cont2" in the content ID field 255 included in the content management list 222a illustrated in FIG. 12 while the content-using device 200 is online.

Note that in the content management list 222a, "---" is stored in the scheduled expiration time field corresponding to the content while the content-using device 200 is online. The indication of "---" as the scheduled expiration time indicates that the viewing of the content can be performed whenever desired and for an unlimited period of time as long as the content-using device 200 is online.

The content-using device 200 deletes the content. Subsequently, the content-using device 200 notifies the content management server 100 that the content has been deleted.

The content management server 100 immediately updates the content management list 131 so as to be consistent with the deletion of the content.

In addition, the content-using device 200 deletes, from the content management list 222, a content management information piece including the content ID "Cont2".

Here, note that the content management server 100 may be configured to keep a record of the deletion of the content. That is, the content management server 100 may keep a record indicating that the content was once shared with the content-using device but later deleted by the content-using device. By configuring the content management server 100 in such a manner, the content management server 100, when issuing an invalidation instruction, may display the following message, for example, by referring to the record.

"Cont1 was used by C1, C2, and C3. Cont1 provided to each of C1, C2, and C3 has been invalidated immediately. Cont1 provided to C1 was deleted before the instruction for invalidation was made."

As a matter of course, the above message may be replaced by the following message: "Cont1 was used by C1, C2, and C3. Cont1 provided to each of C1, C2, and C3 has been invalidated immediately."

Figure 68:
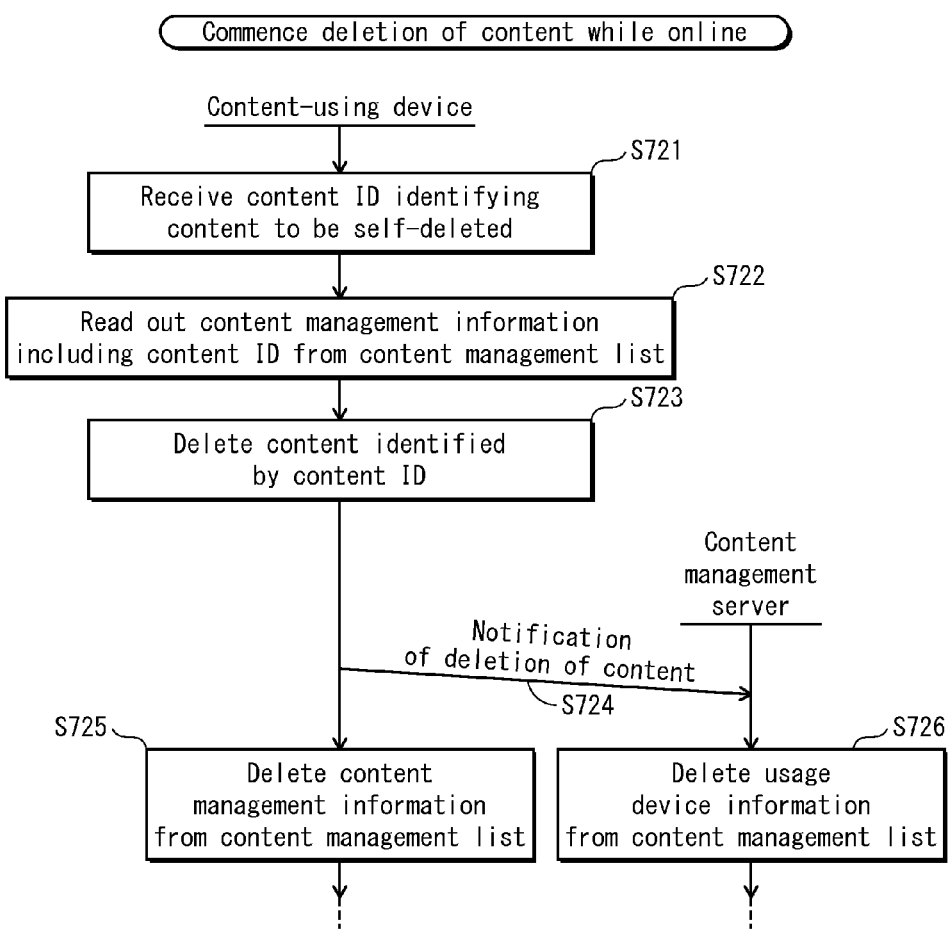
FIG. 68 is a sequence diagram illustrating operations of the content-using device 200, which is online, when performing self-deletion of a content before a scheduled expiration time.

In the following, description is provided on operations of the content-using device 200 when performing self-detection of a content before the scheduled expiration time set with respect to the content is reached, with reference to the sequence diagram illustrated in FIG. 68.

The content management control unit 221 of the content-using device 200 receives a content ID identifying a content to be self-deleted (Step S721).

Subsequently, the content management control unit 221 reads out, from the content management list 222, a content management information piece including the content ID (Step S722).

Subsequently, the content management control unit 221 deletes the content identified by the content ID (Step S723).

The online control transmission unit 213 notifies the content management server 100 that the content has been deleted (Step S724).

Subsequently, the content management control unit 221 of the content-using device 200 deletes the content management information piece from the content management list 222 (Step S725).

The online control reception unit 113 of the content management server 100 receives a notification indicating that the content has been deleted from the content-using device 200 (Step S724). Subsequently, the content management control unit 130 deletes, from the content management list 131, a usage device information piece included in the corresponding management information piece. Here, the corresponding management information piece includes a content ID identifying the content having been deleted. In addition, the usage device information piece includes a usage device name identifying the content-using device having deleted the content (Step S726).

(13) Modification may be performed as described in the following.

For instance, the content-using device 200 includes: the online/offline notification detection unit 201; the content control unit 202; and the time measurement unit 203, as illustrated in FIG. 2. Each of the online/offline notification detection unit 201, the content control unit 202, and the time measurement unit 203 is implemented as a combination of a CPU and an application program stored onto a memory.

As such, in the content-using device 200, a plurality of application programs (hereinafter referred to simply as "applications") are caused to operate. By such applications operating, the online/offline notification detection unit 201, the content control unit 202, and the time measurement unit 203 are each able to realize the respective functions.

When multiple applications are operated in the content-using device 200, each application is either in (a) a state where the application is launched and operating or (b) a state where the application is launched and operating in the background.

In specific, the content control unit 202, which is one of the applications, measures the elapse of a period of validity of a content having a scheduled expiration time set thereto.

At one point in processing, the content control unit 202 may be in either one of the two states (a) and (b) described above.

The content control unit 202, in either one of the two states (a) and (b), measures the elapse of a period of validity of a content having a period of validity set thereto.

The content control unit 202 includes a counter unit and other processing units. The counter unit measures the elapse of the period of validity of the content having a period of validity set thereto. When the content control unit 202 is in state (b), the counter unit, alone, is in state (a) at all times.

The content control unit 202 may be configured to measure the elapse of the period of validity of the content having a period of validity set thereto when in state (a). Alternatively, the content control unit 202 may be configured not to measure the elapse of the period of validity when in state (b).

(14) FIG. 69 illustrates a content management list 222b, which is another example of the content management list 222 illustrated in FIG. 12. The content management list 222b in FIG. 69 includes, for instance, the content management information piece 266, the content management information piece 267, and a content management information piece 268.

The content management information piece 266 includes: "Cont1" in the content ID field 251; "24H" in the relative validity duration field 252; "S1" in the content management server name field 253; and "1/20, 23:30" in the scheduled expiration time field 254. The content management information piece 266 indicates that the content-using device 200 is not connected with the content management server "S1" and that the content-using device 200 is offline.

The content management information piece 267 includes: "Cont2" in the content ID field 255; "48H" in the relative validity duration field 256; "S1" in the content management server name field 257; and "1/21, 23:30" in the scheduled expiration time field 258. The content management information piece 267 also indicates that the content-using device 200 is not connected with the content management server "S1" and that the content-using device is offline.

The content management information piece 268b includes: "Cont3" in the content ID field 259; "24H" in the relative validity duration field 260; "S2" in the content management server name field 261; and "---" in a scheduled expiration time field 262b. The content management information piece 268b indicates that the content "Cont3" has been supplied from the content management server "S1". Further, the content management information piece 268b also indicates that the content-using device 200 is connected with the content management server "S2" and that the content-using device is online.

As such, the content-using device is not connected with a first content management server, and thus, is offline with respect to the first content management server. In contrast, the content-using device is connected with a second content management server, and thus, is offline with respect to the second content management server.

(15) The content management server distributes a personal content to the content-using device. The content-using device uses the content. Later, the content-using device, upon being provided with instructions from the content management server, stops playback of the personal content accumulated therein or invalidates the personal content accumulated therein.

By deletion of a personal content being performed in such a concern-free manner, a person who desires to distribute a content is able to distribute the content without any concerns.

The content management server determines an online/offline state of the content-using device by performing polling with respect to the content-using device. When the content-using device is in online, the content management server transmits an invalidation instruction instructing the content-using device to invalidate playback of a content via the communication path. On the other hand, when the content-using device is offline, the content-using device performs self-detection of the offline state thereof by detecting deactivation of an communication module or the like, and performs control such that playback of a content is automatically invalidated when a period of validity of the content expires. The content management server, when the content-using device is offline, is able to keep track of whether or not the content has been invalidated by managing the period of validity of the content.

(16) Examples of the content as described above include: music data, audio data, a moving image, a still image, movie data constituted of a moving image and audio data, a database, a spreadsheet, text data, and a computer program.

The use/playback of a content as discussed above may refer to playing back music data, audio data, a moving image, a still image, or movie data constituted of a moving image and audio data. In addition, the use/playback of a content as discussed above may refer to performing operations such as reading out, writing into, updating, and displaying with respect to data stored in a database or a spreadsheet, or text data. Further, the use/playback of a content as discussed above may refer to causing a processor to operate in accordance with a computer program.

(17) The present invention may be implemented as described in the following.

Another aspect of the present invention is a content-using device that holds and uses a content distributed thereto from a content management server, comprising: a detection unit that detects whether the content-using device is in an online state of being connected with the content management server or in an offline state of being unconnected with the content management server; a setting unit that sets a period of validity for using the content when the content-using device is detected as being in the offline state; and a control unit that monitors elapse of the period of validity, and permits the use of the content before the elapse of the period of validity and prohibits the use of the content after the elapse of the period of validity.

In the content-using device, the detection unit may output a detection time at which the offline state of the content-using device is detected, and the control unit may hold a relative validity duration during which the use of the content is permitted and may calculate the period of validity by adding the relative validity duration to the detection time when the content-using device is detected as being in the offline state.

In the content-using device, when the detection unit detects that the content-using device is in the online state at a time point after the period of validity is set with respect to the content due to the content-using device being previously detected as being in the offline state and before the elapse of the period of validity, the setting unit may cancel the period of validity set with respect to the content, and when the period of validity is not set with respect to the content, the control unit may permit the use of the content at all times.

In the content-using device, the setting unit may hold a content management list in which a content identifier identifying the content and the relative validity duration are stored in an associated state, and may store the period of validity of the content in association with the content identifier in the content management list when the content-using device is detected as being in the offline state, and the control unit may monitor the elapse of the period of validity stored in the content management list.

In the content-using device, when the detection unit detects that the content-using device is in the online state at a time point after the period of validity is set with respect to the content due to the content-using device being previously detected as being in the offline state and before the elapse of the period of validity, the setting unit may delete the period of validity stored in the content management list.

The content-using device may further comprise a reception unit that receives, from the content management server, an invalidation instruction for invalidating the content, wherein the setting unit may set a second period of validity for using the content when the invalidation instruction is received, and the control unit may monitor elapse of the second period of validity of the content and may permit the use of the content before the elapse of the second period of validity and prohibit the use of the content after the elapse of the second period of validity.

The content-using device may further comprise a transmission/reception unit that performs polling with respect to the content management server and receives a first response to the polling from the content management server, wherein the setting unit may set a third period of validity for use of the content when the first response is received, and the control unit may monitor elapse of the third period of validity of the content and may permit the use of the content before the elapse of the third period of validity and prohibit the use of the content after the elapse of the third period of validity.

In the content-using device, the transmission/reception unit may perform polling with respect to the content management server before the elapse of the third period of validity and may receive a second response to the polling from the content management server, the setting unit may set a fourth period of validity for use of the content when the second response is received, and the control unit may monitor elapse of the fourth period of validity of the content and may permit the use of the content before the elapse of the fourth period of validity and prohibit the use of the content after the elapse of the fourth period of validity.

Another aspect of the present invention is a content-using device that holds and uses a content distributed thereto from a content management server, comprising: a detection circuit that detects whether the content-using device is in an online state of being connected with the content management server or in an offline state of being unconnected with the content management server; a setting circuit that sets a period of validity for using the content when the content-using device is detected as being in the offline state; and a control circuit that monitors elapse of the period of validity, and permits the use of the content before the elapse of the period of validity and prohibits the use of the content after the elapse of the period of validity.

Another aspect of the present invention is an integrated circuit incorporated in a content-using device that holds and uses a content distributed thereto from a content management server, comprising: a detection circuit that detects whether the content-using device is in an online state of being connected with the content management server or in an offline state of being unconnected with the content management server; a setting circuit that sets a period of validity for using the content when the content-using device is detected as being in the offline state; and a control circuit that monitors elapse of the period of validity, and permits the use of the content before the elapse of the period of validity and prohibits the use of the content after the elapse of the period of validity.

Another aspect of the present invention is a content-using device that holds and uses a content distributed thereto from a content management server, comprising: a memory unit that stores a computer program being a combination of a plurality of computer instructions; and a processor that fetches, from the computer program stored in the memory unit, the computer instructions one by one, reads the computer instructions fetched, and operates according to a result of the reading, wherein the computer program causes a computer to: detect whether the content-using device is in an online state of being connected with the content management server or in an offline state of being unconnected with the content management server; set a period of validity for using the content when the content-using device is detected as being in the offline state; and perform control of monitoring elapse of the period of validity, and permitting the use of the content before the elapse of the period of validity and prohibiting the use of the content after the elapse of the period of validity.

Another aspect of the present invention is a computer program used in a content-using device that holds and uses a content distributed thereto from a content management server, comprising: a detection step of detecting whether the content-using device, which is a computer, is in an online state of being connected with the content management server or in an offline state of being unconnected with the content management server; a setting step of setting a period of validity for using the content when the content-using device is detected as being in the offline state; and a controlling step of monitoring elapse of the period of validity, and permitting the use of the content before the elapse of the period of validity and prohibiting the use of the content after the elapse of the period of validity.

Another aspect of the present invention is a computer-readable recording medium that stores thereon a computer program used in a content-using device that holds and uses a content distributed thereto from a content management server, wherein the computer program comprises: a detection step of detecting whether the content-using device, which is a computer, is in an online state of being connected with the content management server or in an offline state of being unconnected with the content management server; a setting step of setting a period of validity for using the content when the content-using device is detected as being in the offline state; and a controlling step of monitoring elapse of the period of validity, and permitting the use of the content before the elapse of the period of validity and prohibiting the use of the content after the elapse of the period of validity.

Another aspect of the present invention is a content distribution system including: a content management server that manages a content; and a content-using device that uses the content, wherein the content management server comprises: a first online/offline detection unit that detects whether the content-using device is online or offline with respect to the content management server; a device management unit that manages an online/offline state of the content-using device; and a content management unit that manages a state of use of the content in the content-using device, and the content-using device comprises: a second online/offline detection unit that detects whether the content-using device is online or offline with respect to the content management server; and a content control unit that manages a period of validity of the content and controls the use of the content according to the detection by the second online/offline control unit. This enables the content-using device to perform the use of the content according to the whether the content-using device is online or offline with respect to the content management server. At the same time, the content management server manages a state of use of the content in the content-using device.

According to the above-described aspect of the present invention, management of the content according to the period of validity of the content is possible after the content-using device becomes offline. In addition, the content management server is able to perform management of the content-using device which involves detecting whether the content-using device is online or offline and determining when the period of validity of the content expires. Further, by reflecting the results obtained through such management to the management of the content, the content management server is able to immediately acknowledge a state of invalidation of the content when an invalidation instruction for instructing the content-using device to invalidate the content is issued with respect to the content-using device. This means that, in a case where a given content has been distributed to several content-using devices, the content management server is able to immediately acknowledge how many of the content-using devices are online and have performed the invalidation of the content. In addition, with regards to the content devices that are offline, the content management server is able to quickly acknowledge when the period of validity of the content expires in each of the content-using devices. This enables a user is able to confirm the invalidation of the content in each of the content-using devices that the content has been distributed to, and therefore, is released from concerns.

In the content distribution system, the content control unit of the content-using device may commence management of the content according to the period of validity of the content when the second online/offline detection unit detects that the content-using device has transitioned from online to offline, and may stop or deny the use of the content when the period of validity of the content expires, and when the first online/offline detection unit detects that the content-using device has transitioned from online to offline, the device management unit may register the content-using device as being offline, and the content management unit may set a period of validity with respect to the content. This enables the content-using device to perform the management of the content according to the period of validity of the content only after becoming offline with respect to the content management server.

In the content distribution system, the content control unit of the content-using device may cancel the period of validity set with respect to the content when the second online/offline detection unit detects that the content-using device has transitioned from offline to online, and when the first online/offline detection unit detects that the content-using device has transitioned from offline to online, the device management unit may cancel the offline registration of the content-using device, and the content management unit may cancel the period of validity set with respect to the content. This enables the content-using device to not perform the management of the content according to the period of validity of the content after the content-using device has become online with respect to the content management server.

In the content distribution system, the content control unit of the content-using device may update the period of validity set with respect to the content when the second online/offline detection unit detects that the content-using device is online, and when the first online/offline detection unit of the content management server detects that the content-using device is online, the content management unit may update the period of validity set with respect to the content. This enables the content-using device to perform the use of the content according to the period of validity of the content and update the period of validity after the content-using device becomes online with respect to the content management server.

In the content distribution system, the content management server may further comprise: an invalidation instruction reception unit that receives an invalidation instruction for invalidation of the content; an invalidation instruction transmission unit that transmits the invalidation instruction to the content-using device; and an invalidation response reception unit that receives an invalidation response from the content-using device as a response to the invalidation instruction, the content-using device may further comprise: an invalidation instruction reception unit that receives the invalidation instruction from the content management server when the content-using device is online; an invalidation unit that invalidates the content according to the invalidation instruction; and an invalidation response transmission unit that generates an invalidation response when the content has been invalidated and transmits the invalidation response to the content management server, the invalidation instruction transmission unit of the content management server transmits the invalidation instruction to the content-using device according to (i) the online/offline state of the content-using device managed by the device management unit or (ii) the state of use of the content in the content-using device managed by the content management unit, the device management unit of the content management server updates the online/offline state of the content-using device when the invalidation response is received from the content-using device, and the content management unit of the content management server updates the state of use of the content in the content-using device when the invalidation response is received from the content-using device. This enables the content management server to immediately instruct the content-using device, when online, to perform the invalidation of the content. On the other hand, this enables the content-using device, when offline, to automatically invalidate the content after the period of validity of the content expires.

Another aspect of the present invention is a content management server in a content distribution system including the content management server, which manages a content, and a content-using device that uses the content, the content management server comprising: a first online/offline detection unit that detects whether the content-using device is online or offline with respect to the content management server; a device management unit that manages an online/offline state of the content-using device; and a content management unit that manages a state of use of the content in the content-using device. This enables the content management server to manage how the content is managed in the content-using device.

In the content management sever, when the first online/offline detection unit detects that the content-using device has transitioned from online to offline, the device management unit may register the content-using device as being offline, and the content management unit may set a period of validity with respect to the content. This enables the content management server to manage, according to the online/offline state of the content-using device, how the content is being managed in the content-using device.

In the content management sever, when the first online/offline detection unit detects that the content-using device has transitioned from offline to online, the device management unit may cancel the offline registration of the content-using device, and the content management unit may cancel the period of validity set with respect to the content. This enables the content management server to not perform the management of the content according to the period of validity of the content after the content-using device has become online with respect to the content management server.

In the content management server, when the first online/offline detection unit detects that the content-using device is online, the content management unit may update the period of validity set with respect to the content. This enables the content management server to permit the content-using device, when online, to update the period of validity set with respect to the content.

In the content management sever, the first online/offline detection unit may perform polling with respect to the content-using device at a predetermined timing, detect that the content-using device is online when receiving a polling response from the content-using device in response to the polling, and detect that the content-using device is offline when the polling response is not received from the content-using device within the predetermined interval. This enables the content management server to detect whether the content-using device is online or offline.

In the content management sever, the first online/offline detection unit may determine the predetermined timing according to a period of validity of the content. This enables the content management server to accurately manage, by using the content management unit, actually when the period of validity of the content expires in the content-using device.

In the content management server, the first online/offline detection unit, when receiving polling from the content-using device at a predetermined timing, may detect that the content-using device is connected with the content management server, and transmit a polling response to the content-using device. This enables the content management server to detect that the content-using device is online, and to permit the content-using device to update the period of validity set with respect to the content.

In the content management server, the first online/offline detection unit may detect that the content-using device is online when receiving a notification from the content-using device that the content-using device is online. This enables the content management server to immediately detect that the content-using device, which was previously offline, has become online.

The content management server further may comprise: an invalidation instruction reception unit that receives an invalidation instruction for invalidation of the content; an invalidation instruction transmission unit that transmits the invalidation instruction to the content-using device; and an invalidation response reception unit that receives an invalidation response from the content-using device as a response to the invalidation instruction, wherein the invalidation instruction transmission unit of the content management server may transmit the invalidation instruction to the content-using device according to (i) the online/offline state of the content-using device managed by the device management unit or (ii) the state of use of the content in the content-using device manages by the content management unit, the device management unit of the content management server may update the online/offline state of the content-using device when the invalidation response is received from the content-using device, and the content management unit of the content management server may update the state of use of the content in the content-using device when the invalidation response is received from the content-using device. This enables the content management server to immediately instruct the content-using device, when online, to perform the invalidation of the content.

The content management server may further comprise an invalidation display unit that displays a status of the invalidation of the content by referring to the invalidation response received from the content-using device, wherein the invalidation display unit, (i) may display invalidation completion information indicating that the invalidation of the content has been completed by the content-using device, when connected with the content management server, and, (ii) may display a period of validity of the content set in the content-using device, when unconnected with the content management server. This enables the content management server to acknowledge the status of the invalidation of the content by the content-using device performed in accordance with the invalidation instruction or the period of validity of the content.

The content management server may further comprise a display unit that displays how the management of the content is being performed. This enables a user of the content management server to acknowledge the online/offline state of the content-using device and the period of validity of the content.

Another aspect of the present invention is a content-using device in a content distribution system including a content management server that manages a content, and the content-using device, which uses the content, the content-using device comprising: a second online/offline detection unit that detects whether the content-using device is online or offline with respect to the content management server; and a content control unit that manages a period of validity of the content and controls the use of the content according to the detection by the second online/offline control unit. This enables the content-using device, when offline, to perform the management of the content according to the period of validity of the content.

In the content-using device, the content control unit may commence management of the content according to the period of validity of the content when the second online/offline detection unit detects that the content-using device has transitioned from online to offline, and may stop or deny the use of the content when the period of validity of the content expires. This enables the content-using device to commence the management of the content according to the period of validity of the content when actually detected as being offline, and hence, to take full advantage of the predetermined period of validity of the content.

In the content-using device, when the second online/offline detection unit detects that the content-using device has transitioned from offline to online, the content control unit may cancel the period of validity set with respect to the content. This enables the content-using device not to perform the management of the content according to the period of validity of the content after the content-using device has become online with respect to the content management server.

In the content-using device, after the second online/offline detection unit detects that the content-using device is online, the content control unit may update the period of validity set with respect to the content at a point when the content-using device is detected as being online. This enables the content-using device to update the period of validity set with respect to the content according to permission from the content management server receivable when connected with the content management server.

In the content-using device, the second online/offline detection unit may receive polling from the content management server at a predetermined timing, generate a polling response as a response to the polling, and transmit the polling response to the content management server, and the second online/offline detection unit may detect that the content-using device is online or offline by using either one of or any combination of: a polling detection unit that detects whether or not the polling is received at the predetermined timing; an activation detection unit that detects activation of a communication module provided to the content-using device; a detection unit that detects whether or not the content-using device is located within a distance, from an access point, within which radio signals from the content-using device reach the access point; and a communication on/off operation detection unit that detects whether or not a user operation of turning on/off communication has been received. This enables the content-using device to detect the online/offline state thereof with respect to the content management device and thereby perform content control in accordance with the online/offline state thereof.

In the content-using device, the second online/offline detection unit, when detecting that the content-using device is online, may perform polling with respect to the content management server and receive a polling response from the content management server as a response to the polling, and the content control unit, when the polling response permits update of a period of validity set with respect to the content, may perform the update of the period of validity set with respect to the content. This enables the content-using device to receive a polling response from the content management server and to update the period of validity for using the content.

In the content-using device, the second online/offline detection unit may determine a timing at which the polling is performed according to the period of validity set with respect to the content. This enables the content-using device to notify the content management server of when the period of validity of the content expires with high accuracy.

In the content-using device, the second online/offline detection unit, when detecting that the content-using device is online, may transmit a notification to the content management server that the content-using device is online, and the second online/offline detection unit may detect that the content-using device is online or offline by using either one of or any combination of: a polling detection unit that detects whether or not the polling is received at the predetermined timing; an activation detection unit that detects activation of a communication module provided to the content-using device; a detection unit that detects whether or not the content-using device is located within a distance, from an access point, within which radio signals from the content-using device reach the access point; and a communication on/off operation detection unit that detects whether or not a user operation of turning on/off communication has been received. This enables the content-using device to immediately notify the content management server of the online state thereof.

The content-using device may further comprise: an invalidation instruction reception unit that receives an invalidation instruction from the content management server; an invalidation unit that invalidates the content according to the invalidation instruction; and an invalidation response transmission unit that generates an invalidation response when the content has been invalidated and transmits the invalidation response to the content management server. This enables the content-using device to immediately invalidate the content according to the invalidation instruction from the content management server.

The content-using device may further comprise an invalidation display unit that displays a record of the invalidation of the content when the invalidation unit has invalidated the content. This enables a user of the content-using device to acknowledge information pertaining to the invalidation of the content.

The content-using device may further comprise a display unit that displays how the control of the use of the content is being performed by the content control unit. This enables a user of the content-using device to acknowledge the period of validity of the content, etc.

Another aspect of the present invention is a content distribution method for use in a content distribution system including: a content management server that manages a content; and a content-using device that uses the content, wherein the content management method comprises: a first online/offline detection step, by the content management server, of detecting whether the content-using device is online or offline with respect to the content management server; a device management step, by the content management server, of managing an online/offline state of the content-using device; a content management step, by the content management server, of managing a state of use of the content in the content-using device; a second online/offline detection step, by the content-using device, of detecting whether the content-using device is online or offline with respect to the content management server; and a content control step, by the content-using device, of managing a period of validity of the content and controlling the use of the content according to the detection in the second online/offline control step.

Another aspect of the present invention is an integrated circuit that forms a content management server in a content distribution system including: the content management server, which manages a content; and a content-using device that uses the content, the integrated circuit comprising: a first online/offline detection unit that detects whether the content-using device is online or offline with respect to the content management server; a device management unit that manages an online/offline state of the content-using device; and a content management unit that manages a state of use of the content in the content-using device.

Another aspect of the present invention is an integrated circuit that forms a content-using device in a content distribution system including: a content management server that manages a content; and the content-using device, which uses the content, the integrated circuit comprising: a second online/offline detection unit that detects whether the content-using device is online or offline with respect to the content management server; and a content control unit that manages a period of validity of the content and controls the use of the content according to the detection in the second online/offline control step.

(18) Specifically, each of the above-described devices is a computer system composed of a microprocessor, ROM, RAM, hard disk unit, display unit, keyboard, mouse, etc. Computer programs are stored on the RAM or the hard disk unit. Each device achieves its functions by the microprocessor operating according to the computer programs. In order to achieve predetermined functions, the computer programs are composed of a combination of multiple operation codes that indicate instructions for the computer.

(19) Part or all of the constituent elements constituting each of the above-described devices may be assembled as one system LSI (Large Scale Integration). A system LSI is an ultra-multifunctional LSI produced by integrating multiple components on one chip and, more specifically, is a computer system including a microprocessor, ROM, RAM, and the like. Computer programs are stored on the RAM. The system LSI achieves its functions by the microprocessor operating according to the computer programs.

Further, each of units of the constituent elements constituting each of the above-described devices may be separately integrated into a single chip, or may be integrated into a single chip including a part or all of the such units.

Further, the method applied for forming integrated circuits is not limited to the LSI, and the present invention may be realized on a dedicated circuit or a general purpose processor. For example, the present invention may be realized on an FPGA (Field Programmable Gate Array) being an LSI which can be programmed after manufacturing, or a reconfigurable processor being a LSI, reconfiguration of which could be made to the connection of internal circuit cells and settings.

Further in addition, if a new technology of circuit integration replacing that of the LSI emerges as a result of the progress made in the field of semiconductor technology or another technology deriving therefrom, the integration of function blocks may be performed applying such technology.

(20) Part or all of the constituent elements constituting each of the above-described devices may be assembled as an IC card or a single module that is attachable to and detachable from each device. The IC card/module is a computer system that includes a microprocessor, ROM, RAM, etc. The IC card/module may include therein the above-mentioned ultra-multifunctional LSI. The IC card/module achieves its functions by the microprocessor operating according to computer programs. The IC card/module may be tamper resistant.

(21) The present invention may be each of the above-described devices or control methods for controlling the above-described systems. The present invention may be computer programs that achieve the methods by a computer, or may be a digital signal comprising the computer programs.

The present invention may also be a computer-readable recording medium having recorded thereon the above-mentioned computer programs or digital signal. Examples of such a recording medium include a flexible disk, hard disk, CD-ROM, MO, DVD, DVD-ROM, DVD-RAM, BD (Blu-ray Disc), and semiconductor memory. The present invention may also be the digital signal recorded on such a recording medium.

The present invention may also be the computer programs or digital signal to be transmitted via networks, of which telecommunications networks, wire/wireless communications networks, and the Internet are representative, or via data broadcasting.

The present invention may also be a computer system comprising a microprocessor and memory, the memory storing the computer programs, and the microprocessor operating in accordance with the computer programs.

Also, another independent computer system may implement the computer programs or digital signal after the computer programs or digital signal is transferred via being recorded on the recording medium. Also, in the present invention, another independent computer system may implement the computer programs or digital signal after the computer programs or digital signal is transferred via one of the above-mentioned networks, etc.

(22) The present invention may be any combination of the above embodiments and modifications.

INDUSTRIAL APPLICABILITY

According to the content distribution system pertaining to the present invention, the management of a content in the content distribution system is performed according to a method for controlling the use of the content which is determined according to whether or not the content-using device is connected with the content management server. As such, protection of the content, which has been provided by a provider, is realized while a user utilizing the content is able to use the content with an enhanced degree of convenience. Due to this, the present invention is useful as a technology for performing management of a content distributed via a network.

REFERENCE SIGNS LIST 10, 20, 30, 40, 50 content distribution system
100, 400, 600, 800, 800a content management server
200, 500, 700, 900, 900a content-using device
950a relay server
300 communication path
101 online/offline detection unit
102 device management unit
103 content management unit
104, 703 time measurement unit
201 online/offline notification detection unit
202 content control unit
203 time measurement unit
401 reception unit
402 invalidation instruction transmission unit
403 invalidation response reception unit
404 display unit
501 invalidation instruction reception unit
502 invalidation response transmission unit
601 online detection unit
602 device management unit
603 content management unit
701 online notification unit
702 content control unit
703 time measurement unit

The invention claimed is:
1. A content distribution system including: a content management server that manages a content; and a content-using device that uses the content, wherein
the content management server comprises:
a first connection detection unit that detects whether or not the content management server is connected with the content-using device;

a content management unit that manages the content according to a result of the detection by the first connection detection unit and holds information on how the content-using device controls the use of the content, and the content-using device comprises:
a second connection detection unit that detects whether or not the content-using device is connected with the content management server;
a second selection unit that specifies a method for controlling the use of the content according to a result of the detection by the second connection detection unit; and
a content control unit that controls the use of the content according to the method specified by the second selection unit.

2. The content distribution system of claim 1, wherein when the second connection detection unit detects that the content-using device has transitioned from being connected with the content management server to being unconnected with the content management server,
the second selection unit specifies, as the method for controlling the use of the content, a method according to a period of validity of the content, and
the content control unit sets a specific period of validity with respect to the content and, when the specific period of validity of the content expires, stops or denies the use of the content, and when the first connection detection unit detects that the content management server has transitioned from being connected with the content-using device to being unconnected with the content-using device,
the content management unit manages the content by using the method according to a period of validity of the content and sets a specific period of validity with respect to the content.

3. The content distribution system of claim 1, wherein when the second connection detection unit detects that the content-using device has transitioned from being unconnected with the content management server to being connected with the content management server,
the second selection unit specifies, as the method for controlling the use of the content, a method independent of a period of validity of the content, and
the content control unit cancels a specific period of validity set with respect to the content, and when the first connection detection unit detects that the content management server has transitioned from being connected with the content-using device to being unconnected with the content-using device,
the content management unit manages the content by using the method independent of a period of validity of the content, and cancels a specific period of validity set with respect to the content.

4. The content distribution system of claim 1, wherein when the second connection detection unit continuously detects that the content-using device is connected with the content management server,
the second selection unit continuously specifies, as the method for controlling the use of the content, a method according to a period of validity of the content, and
the content control unit performs updating of extending a specific period of validity set with respect to the content, and when the first connection detection unit continuously detects that the content management server is connected with the content-using device,
the content management unit continuously manages the content by using the method according to a period of validity of the content and performs updating of extending a specific period of validity set with respect to the content.

5. The content distribution system of claim 1, wherein the content management server further comprises:
an invalidation reception unit that receives an invalidation instruction for invalidation of the content;
an invalidation instruction transmission unit that transmits the invalidation instruction to the content-using device; and
an invalidation response reception unit that receives, from the content-using device, an invalidation response as a response to the invalidation instruction,
the content-using device further comprises:
an invalidation instruction reception unit that receives the invalidation instruction from the content management server when the content-using device is connected with the content management server;
an invalidation unit that invalidates the content according to the invalidation instruction; and
an invalidation response transmission unit that generates an invalidation response when the content has been invalidated and transmits the invalidation response to the content management server,
the second selection unit specifies, as the method for controlling the use of the content, a method according to a period of validity of the content when the content-using device is unconnected with the content management server,
the content control unit sets a specific period of validity with respect to the content, and
the invalidation unit invalidates the content when the specific period of validity of the content expires.

6. The content distribution system of claim 1, wherein the content-using device further comprises
a content deletion unit that deletes the content,
the content control unit further records information indicating deletion of the content when the content deletion unit has deleted the content,
the content-using device further comprises
a notification unit that,
(i) when the content-using device is connected with the content management server and the content deletion unit has deleted the content, immediately notifies the content management server of the deletion of the content and
(ii) when the content-using device is unconnected with the content management server and the content deletion unit has deleted the content, notifies the content management server of the deletion of the content after the content-using device is connected with the content management server, and
the content management unit further records information indicating the deletion of the content.

7. A content management server managing a content and providing the content to a content-using device, comprising:
a first connection detection unit that detects whether or not the content management server is connected with the content-using device; and
a content management unit that manages the content according to a result of the detection by the first connection detection unit and holds information on how the content-using device controls the use of the content, wherein when the first connection detection unit detects that the content management server has transitioned from being connected with the content-using device to being unconnected with the content-using device, the content management unit manages the content by using a method according to a period of validity of the content and sets a specific period of validity with respect to the content.

8. The content management server of claim 7, wherein when the first connection detection unit detects that the content management server has transitioned from being unconnected with the content-using device to being connected with the content-using device, the content management unit manages the content by using a method independent of a period of validity of the content, and cancels a specific period of validity set with respect to the content.

9. The content management server of claim 7, wherein when the first connection detection unit continuously detects that the content management server is connected with the content-using device, the content management unit continuously manages the content by using a method according to a period of validity of the content and performs updating of extending a specific period of validity set with respect to the content.

10. The content management server of claim 7, wherein the first connection detection unit performs polling with respect to the content-using device at a predetermining timing, detects that the content management server is connected with the content-using device when receiving a polling response from the content-using device in response to the polling, and detects that the content management server is unconnected with the content-using device when the polling response is not received from the content-using device within a predetermined interval.

11. The content management server of claim 10, wherein the first connection detection unit determines the predetermined timing according to a period of validity of the content.

12. The content management server of claim 7, wherein the first connection detection unit, when receiving a polling signal from the content-using device at a predetermined timing, detects that the content management server is connected with the content-using device, and transmits a polling response to the content-using device.

13. The content management server of claim 7, wherein the first connection detection unit detects that the content management server is connected with the content-using device when receiving a notification from the content-using device that the content-using device is connected with the content management server.

14. The content management server of claim 7 further comprising:

an invalidation reception unit that receives an invalidation instruction for invalidation of the content;

an invalidation instruction transmission unit that transmits the invalidation instruction to the content-using device; and an invalidation response reception unit that receives, from the content-using device, an invalidation response as a response to the invalidation instruction.

15. The content management server of claim 14 further comprising a display unit that displays a status of the invalidation of the content performed in accordance with the invalidation instruction by referring to the invalidation response received from the content-using device, wherein the display unit, (i) displays invalidation completion information indicating that the invalidation of the content has been completed by the content-using device, when connected with the content management server, and, (ii) displays a period of validity of the content set in the content-using device, when unconnected with the content management server.

16. The content management server of claim 7 further comprising a display unit that displays how the management of the content is being performed.

17. A content-using device that uses a content provided from a content management server managing the content, comprising:

a second connection detection unit that detects whether or not the content-using device is connected with the content management server;

a second selection unit that specifies a method for controlling the use of the content according to a result of the detection by the second connection detection unit; and a content control unit that controls the use of the content according to the method specified by the second selection unit, wherein when the second connection detection unit detects that the content-using device has transitioned from being connected with the content management server to being unconnected with the content management server, the second selection unit specifies, as the method for controlling the use of the content, a method according to a period of validity of the content, and the content control unit sets a specific period of validity with respect to the content and, when the specific period of validity of the content expires, stops or denies the use of the content.

18. The content-using device of claim 17, wherein when the second connection detection unit detects that the content-using device has transitioned from being unconnected with the content management server to being connected with the content management server, the second selection unit specifies, as the method for controlling the use of the content, a method independent of a period of validity of the content, and the content control unit cancels a specific period of validity set with respect to the content.

19. The content-using device of claim 17, wherein when the second connection detection unit continuously detects that the content-using device is connected with the content management server, the second selection unit continuously specifies, as the method for controlling the use of the content, a method according to a period of validity of the content, and the content control unit performs updating of extending a specific period of validity set with respect to the content.

20. The content-using device of claim 17, wherein
the second connection detection unit detects whether or not the content-using device is connected with the content management server by performing either one of or any combination of:
  (i) detecting, at a predetermined timing, whether or not a polling signal is received from the content management server at the predetermining timing;
  (ii) detecting whether or not a communication module provided to the content-using device is activated;
  (iii) detecting whether or not the content-using device is located within a distance, from an access point, within which radio signals from the content-using device reach the access point; and
  (iv) detecting whether a user operation is performed with respect to the content-using device for activating or deactivating communication by the content-using device.

21. The content-using device of claim 17, wherein
the second connection detection unit, when detecting that the content-using device is connected with the content management server, performs polling with respect to the content management server and receives a polling response from the content management server as a response to the polling, and
the content control unit, when the polling response permits extension of a period of validity set with respect to the content, performs updating of extending the period of validity.

22. The content-using device of claim 21, wherein
the second connection detection unit determines a timing at which the polling is performed according to the period of validity.

23. The content-using device of claim 17, wherein
the second connection detection unit, when detecting that the content-using device is connected with the content management server, transmits a notification to the content management server that the content-using device is connected with the content management server, and
the second connection detection unit detects whether or not the content-using device is connected with the content management server by performing either one of or any combination of:
  (i) detecting, at a predetermined timing, whether or not a polling signal is received from the content management server at the predetermining timing;
  (ii) detecting whether or not a communication module provided to the content-using device is activated;
  (iii) detecting whether or not the content-using device is located within a distance, from an access point, within which radio signals from the content-using device reach the access point; and
  (iv) detecting whether a user operation is performed with respect to the content-using device for activating or deactivating communication by the content-using device.

24. The content-using device of claim 17 further comprising:
an invalidation instruction reception unit that receives an invalidation instruction from the content management server when the content-using device is connected with the content management server;
an invalidation unit that invalidates the content according to the invalidation instruction; and
an invalidation response transmission unit that generates an invalidation response when the content has been invalidated and transmits the invalidation response to the content management server.

25. The content-using device of claim 24 further comprising:
a display unit that displays a record of the invalidation of the content performed according to the invalidation instruction when the invalidation unit has invalidated the content.

26. The content-using device of claim 17 further comprising
a display unit that displays how the control of the use of the content is being performed by the content control unit.

27. The content-using device of claim 17 further comprising:
an invalidation instruction reception unit that receives an invalidation instruction from the content management server when the content-using device is connected with the content management server;
an invalidation unit that invalidates the content according to the invalidation instruction;
an invalidation response transmission unit that generates an invalidation response when the content has been invalidated and transmits the invalidation response to the content management server, wherein
the second selection unit specifies, as the method for controlling the use of the content, a method according to a period of validity of the content when the content-using device is unconnected with the content management server,
the content control unit sets a specific period of validity with respect to the content, and
the invalidation unit invalidates the content when the specific period of validity of the content expires.

28. The content-using device of claim 17 further comprising
a content deletion unit that deletes the content, wherein
the content control unit further records information indicating deletion of the content when the content deletion unit has deleted the content,
the content-using device further comprises:
  a notification unit that,
    (i) when the content-using device is connected with the content management server and the content deletion unit has deleted the content, immediately notifies the content management server of the deletion of the content and,
    (ii) when the content-using device is unconnected with the content management server and the content deletion unit has deleted the content, notifies the content management server of the deletion of the content after the content-using device is connected with the content management server.

29. A control method used in a content distribution system including: a content management server that manages a content; and a content-using device that uses the content, comprising:
a first connection detection step, by the content management server, of detecting whether or not the content management server is connected with the content-using device;
a content management step, by the content management server, of managing the content according to a result of the detection in the first connection detection step and of holding information on how the content-using device controls the use of the content;

a second connection detection step, by the content-using device, of detecting whether or not the content-using device is connected with the content management server;

a second selection step, by the content-using device, of specifying a method for controlling the use of the content according to a result of the detection in the second connection detection step; and a content control step, by the content-using device, of controlling the use of the content according to the method specified in the second selection step.

30. An integrated circuit that forms a content management server managing a content and providing the content to a content-using device, comprising:

a first connection detection unit that detects whether or not the content management server is connected with the content-using device; and a content management unit that manages the content according to a result of the detection by the first connection detection unit and holds information on how the content-using device controls the use of the content, wherein when the first connection detection unit detects that the content management server has transitioned from being connected with the content-using device to being unconnected with the content-using device, the content management unit manages the content by using a method according to a period of validity of the content and sets a specific period of validity with respect to the content.

31. An integrated circuit that forms a content-using device that uses a content provided from a content management server managing the content, comprising:

a second connection detection unit that detects whether or not the content-using device is connected with the content management server;

a second selection unit that specifies a method for controlling the use of the content according to a result of the detection by the second connection detection unit; and a content control unit that controls the use of the content according to the method specified by the second selection unit, wherein when the second connection detection unit detects that the content-using device has transitioned from being connected with the content management server to being unconnected with the content management server, the second selection unit specifies, as the method for controlling the use of the content, a method according to a period of validity of the content, and the content control unit sets a specific period of validity with respect to the content and, when the specific period of validity of the content expires, stops or denies the use of the content.

* * * * *